United States Patent
Tsubata

(10) Patent No.: US 8,144,279 B2
(45) Date of Patent: Mar. 27, 2012

(54) ACTIVE MATRIX SUBSTRATE, LIQUID CRYSTAL PANEL, LIQUID CRYSTAL DISPLAY UNIT, LIQUID CRYSTAL DISPLAY AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 338 days.

(21) Appl. No.: 12/526,700

(22) PCT Filed: Feb. 6, 2008

(86) PCT No.: PCT/JP2008/051954
§ 371 (c)(1),
(2), (4) Date: Aug. 11, 2009

(87) PCT Pub. No.: WO2008/139757
PCT Pub. Date: Nov. 20, 2008

(65) Prior Publication Data
US 2010/0073337 A1    Mar. 25, 2010

(30) Foreign Application Priority Data
May 8, 2007   (JP) .................................. 2007-123963

(51) Int. Cl.
*G02F 1/136* (2006.01)
(52) U.S. Cl. ........................................... 349/43
(58) Field of Classification Search ........................ None
See application file for complete search history.

(56) References Cited

U.S. PATENT DOCUMENTS

| 5,790,092 A | 8/1998 | Moriyama |
| 2003/0227429 A1 | 12/2003 | Shimoshikiryo |
| 2005/0213015 A1 | 9/2005 | Shimoshikiryo |
| 2006/0256271 A1 | 11/2006 | Shimoshikiryo |
| 2009/0002585 A1 | 1/2009 | Shimoshikiryoh et al. |
| 2010/0253866 A1* | 10/2010 | Lan et al. ........................ 349/38 |
| 2010/0259519 A1* | 10/2010 | Chen et al. ..................... 345/206 |
| 2011/0169799 A1* | 7/2011 | Yoon et al. ..................... 345/211 |
| 2011/0267554 A1* | 11/2011 | Yang et al. ...................... 349/41 |

FOREIGN PATENT DOCUMENTS

| EP | 1 383 105 A2 | 1/2004 |
| JP | 2002-72985 | 3/2002 |
| JP | 2004-354742 | 12/2004 |
| JP | 2005-165038 | 6/2005 |

OTHER PUBLICATIONS

English International Search Report for PCT/JP2008/051954, mailed Mar. 11, 2008.

* cited by examiner

*Primary Examiner* — Sung Pak
(74) *Attorney, Agent, or Firm* — Nixon & Vanderhye P.C.

(57) ABSTRACT

A pair of pixel electrodes provided on each pixel in the same pixel array are connected to one or the other of two adjacent data signal lines. When two consecutive pixels are sequentially blocked, for two pixels belonging to the same block and being adjacent in a column direction, the data signal line to which two pixel electrodes provided on one of the pixels are connected is different from the data signal line to which two pixel electrodes provided on the other of the pixels are connected. For two pixels belonging to different blocks and being adjacent in the column direction, the data signal line to which two pixel electrodes provided on one of the pixels are connected is the same as the data signal line to which two pixel electrodes provided on the other of the pixels are connected.

35 Claims, 36 Drawing Sheets

ACTIVE MATRIX SUBSTRATE, LIQUID CRYSTAL PANEL, LIQUID CRYSTAL DISPLAY UNIT, LIQUID CRYSTAL DISPLAY AND TELEVISION RECEIVER

This application is the U.S. national phase of International Application No. PCT/JP2008/051954 filed 6 Feb. 2008, which designated the U.S. and claims priority to JP Application No. 2007-123963 filed 8 May 2007, the entire contents of each of which are hereby incorporated by reference.

TECHNICAL FIELD

The present invention relates to a pixel division method liquid crystal display in which each pixel is constituted by a plurality of subpixels, and to an active matrix substrate and a liquid crystal panel, each of which is applied to the liquid crystal display.

BACKGROUND ART

As one technique for improving viewing angle dependence of γ characteristic in a liquid crystal display (difference between (i) γ characteristic in observing a liquid crystal display from the front and (ii) γ characteristic in obliquely observing the liquid crystal display), a pixel division method (so-called multi-pixel technique) for constituting each pixel by a plurality of subpixels has been suggested (refer to Patent Literature 1, for example).

FIG. 35 shows a configuration of a conventional active matrix substrate used for a pixel division method liquid crystal display. As shown in the drawing, the conventional active matrix substrate includes data signal lines 215 and scanning signal lines 216 which intersect at right angles to each other, first and second storage capacitor wirings 218a and 218b, and pixel regions 205 provided in a matrix pattern. It should be noted that a layer in which the data signal lines 215 are provided is higher than a layer in which the scanning signal lines 216 are provided. Each scanning signal line 216 extends in a row direction (horizontal direction in the drawing) so as to cross the pixel regions 205. Each data signal line 215 extends in a column direction (vertical direction in the drawing) along one side of pixel regions (edge along a direction in which the data signal line 215 intersects at right angles to the scanning signal lines 216). The first or second storage capacitor wiring 218a or 218b extends in the row direction (horizontal direction in the drawing) so as to superpose adjacent end portions of two pixel regions adjacent in the column direction.

On each pixel region 205, a switching element 212 including first and second transistors 212a and 212b, first and second pixel electrodes 217a and 217b, the first and second storage capacitor wirings 218a and 218b, first and second drain drawing wirings 227a and 227b, and first and second contact holes 211a and 211b are formed.

Here, the first and second pixel electrodes 217a and 217b are disposed on one (upper in the drawing) and the other (lower in the drawing) sides of the scanning signal line 216, respectively. The switching element 212 is provided in the vicinity of an intersection of the data signal line 215 and the scanning signal line 216. As shown in FIG. 36, each of the pixel electrodes (217a and 217b) provided in the pixel regions adjacent in the column direction is connected to the same data signal line 215 via the switching element 212.

A source electrode 209a of the first transistor is drawn in the row direction from the data signal line 215. A drain electrode 208a of the first transistor is formed so as to face the source electrode 209a and connected to the first pixel electrode 217a via the first drain drawing wiring 227a and the contact hole 211a. Furthermore, a first storage capacitor is formed on a superposition section in which the first pixel electrode 217a and the first storage capacitor wiring 218a superpose each other. Similarly, a source electrode 209b of the second transistor is drawn in the row direction from the data signal line 215. A drain electrode 208b of the second transistor is formed so as to be superposed on a second scanning electrode section 216b and face the source electrode 209b. The drain electrode 208b is connected to the second pixel electrode 217b via the second drain drawing wiring 227b and the contact hole 211b. Moreover, a second storage capacitor is formed on a superposition section in which the second pixel electrode 217b and the second storage capacitor wiring 218b superpose each other.

In a liquid crystal display including the aforementioned active matrix substrate, each pixel is formed in such a manner that (i) it is formed with the pixel region 205, and regions on a counter substrate and in a liquid crystal layer which regions correspond to the pixel region 205, (ii) a first subpixel is formed with a region on which the first pixel electrode 217a is provided, and regions on the counter substrate and in the liquid crystal layer which regions correspond to the region on which the first pixel electrode 217a is provided, and (iii) a second subpixel is formed with a region on which the second pixel electrode 217b is provided, and regions on the counter substrate and in the liquid crystal layer which regions correspond to the region on which the second pixel electrode 217b is provided.

With the aforementioned active matrix substrate, the same signal potential is supplied from the data signal line 215 to the first or second pixel electrodes 217a or 217b. However, potentials of the first and second storage capacitor wirings 218a and 218b are individually controlled so as to set the first and second pixel electrodes 217a and 217b to different potentials via the first and second storage capacitors.

Accordingly, in a liquid crystal display including the aforementioned active matrix substrate, constituting each pixel by a high-luminance subpixel (bright subpixel) and a low-luminance subpixel (dark subpixel) makes it possible to display halftone by area coverage modulation and thus viewing angle dependence of γ characteristic (e.g. excess brightness) can be improved.

As a method for driving a data signal line in a liquid crystal display, dot inversion driving (1H/1V inversion driving) is often applied. In the dot inversion driving, in the same frame, signal potentials are supplied to switching elements adjacent in the row direction so that polarities of the signal potentials are different from each other and on the other hand, signal potentials are supplied to switching elements adjacent in the column direction so that polarities of the signal potentials are different from each other. However, in the dot inversion driving, the frequency of polarity inversion on the data signal line during one frame period is high. Therefore, when this is applied particularly to a large-scale liquid crystal display, there occurs such a problem that the data signal line is insufficiently charged or power consumption is increased.

In order to solve such a problem, it is an option to apply such driving that: for the row direction, different polarities are supplied for each switching element; and for the column direction, different polarities are supplied for every two adjacent switching elements (2H/1V inversion driving, refer to Patent Literature 2, for example).

CITATION LIST

Patent Literature 1

Japanese Patent Application Publication, Tokukai, No. 2004-62146 A (Publication Date: Feb. 26, 2004)

Patent Literature 2

Japanese Patent Application Publication, Tokukaihei, No. 8-43795 A (Publication Date: Feb. 16, 1996)

SUMMARY OF INVENTION

However, as shown in FIG. 37, when the 2H/1V inversion driving is applied to a liquid crystal display including a conventional active matrix substrate, it is feared that bright subpixels might be irregularly disposed as shown in FIG. 37 with circular enclosures, and thus an image displayed might have rough texture. This is because human visual perception of the image is mainly based on the bright subpixels. This phenomenon occurs not only in the case of the 2H/1V inversion driving) but commonly in such driving (nH/1V inversion driving) that: for the row direction, different polarities are supplied for each switching element; and for the column direction, different polarities are supplied for every n (n: not less than two) adjacent switching elements.

The present invention has been made in consideration of the aforementioned problem. It is an object of the present invention to provide an active matrix substrate for enhancing display quality of a pixel division method liquid crystal display in which the nH/1V inversion driving is performed.

An active matrix substrate of the present invention includes: pixel regions; scanning signal lines extending in a row direction so as to cross the pixel regions corresponding thereto; data signal lines extending in a column direction; switching elements which are provided in the vicinity of corresponding intersections of the data signal lines and the scanning signal lines and each of which is connected to the data signal line and the scanning signal line forming the intersection in the vicinity of which the switching element is provided; storage capacitor wirings each of which is provided so as to correspond to a gap between pixel regions adjacent with each other in the column direction; and a pair of pixel electrodes in each pixel region, the pair of pixel electrodes forming storage capacitors with different ones of the storage capacitor wirings respectively, wherein: the pair of pixel electrodes provided in each pixel region adjacent with each other in the column direction is both connected to one of adjacent data signal lines via the switching element provided in the vicinity of an intersection of the one of the data signal lines and the scanning signal line crossing the pixel region, or to the other of the adjacent data signal lines via the switching element provided in the vicinity of an intersection of the other of the data signal lines and the scanning signal line crossing the pixel region; the intersections of the data signal lines and the scanning signal lines are grouped into A and B groups by alternately grouping intersections of a data signal line and the scanning signal lines into the A and B groups for every n adjacent intersections and grouping intersections adjacent in the row direction into different groups where n≧2; assuming that the adjacent data signal lines are referred to as first and second data signal lines; in a given pixel region, each of two pixel electrodes provided in a given pixel region is connected to the first data signal line via the switching element; and a pixel region adjacent to the given pixel region in the column direction is referred to as an adjacent pixel region, each of two pixel electrodes included in the adjacent pixel region is connected to a second data signal line of the adjacent pixel region via the switching element if (i) an intersection of the scanning signal line crossing the adjacent pixel region and the first data signal line and (ii) an intersection of the scanning signal line crossing the given pixel region and the first data signal line belong to the same one of the groups; and each of the two pixel electrodes included in the adjacent pixel region is connected to a first data signal line of the adjacent pixel region via the switching element if (i) the intersection of the scanning signal line crossing the adjacent pixel region and the first data signal line and the intersection of the scanning signal line crossing the given pixel region and the first data signal line belong to different ones of the groups.

Furthermore, the present active matrix substrate can also be described as an active matrix substrate including pixel regions disposed in row and column directions where the row direction is an extending direction of a scanning signal line, each pixel region has a pair of pixel electrodes connected to the same one of the scanning signal lines and to the same one of the data signal lines via a switching element wherein the pixel electrodes form capacitors with storage capacitor wirings in such a manner that pixel electrodes in one pixel region form the capacitors with different ones of the storage capacitor wirings, respectively, and one of two pixel electrodes provided on one pixel region and one of the two pixel electrodes provided on a pixel region adjacent to the pixel region in the column direction, form the capacitors with the same one of the storage capacitor wirings, wherein each of two pixel electrodes provided on each pixel region in the same pixel region array is connected to one or the other of two adjacent data signal lines and n consecutive pixel regions are sequentially grouped into blocks in the same pixel region array where n≧2, for pixel regions belonging to the same block, the pair of pixel electrodes in one pixel region and the pair of pixel electrodes in a pixel region adjacent to the pixel region in the column direction are connected to different ones of the data signal lines, and for pixel regions belonging to different blocks, the pair of pixel electrode in one pixel region and the pair of pixel electrode in a pixel region adjacent to the pixel region are connected to the same one of the data signal lines.

In a case where a pixel division method liquid crystal display is arranged with the use of the present active matrix substrate, pixels and data signal lines are connected in a staggered state as mentioned above. Therefore, when the data signal line is operated by the nH/1V inversion driving (such driving that: for the row direction, different polarities are applied for each switching element; and for the column direction, different polarities are applied for every n adjacent switching elements), polarities of two pixels adjacent in the row direction and polarities of two pixels adjacent in the column direction (each dot (pixel)) can be inversed. With this, the data signal line can be sufficiently charged by the nH/1V inversion driving, power consumption can be reduced, and the irregular disposition of bright subpixels as shown in FIG. 37 will not occur. With this, a liquid crystal display of high display quality in which display is less likely to be uneven can be realized.

Moreover, in the present liquid crystal display, an inversion cycle of a data signal can be made longer (the data signal can be inversed for every n horizontal period). Therefore, moving picture performance can also be improved by performing pseudo impulse driving or writing an interpolation image with the frequency of image writing increased.

The present active matrix substrate can be arranged such that: the switching element includes first and second transistors; the pair of pixel electrodes is referred to as first and second pixel electrodes which are provided on either side of the corresponding scanning signal line; the storage capacitor wirings are referred to as a first storage capacitor wiring when the storage capacitor wiring superposes the first pixel electrode, meanwhile the storage capacitor wirings are referred to as a second storage capacitor wiring when the storage capacitor wiring superposes the second pixel electrode; and the first and second pixel electrodes in pair are connected to the same data signal line respectively via the first and second transistors corresponding thereto.

A liquid crystal panel of the present invention includes: an active matrix substrate as set forth above; and a counter substrate.

The present liquid crystal panel is desirably arranged such that: in each pixel region, first and second subpixel regions are provided so as to sandwich therebetween the corresponding scanning signal line; one of the pair of pixel electrodes is provided to the first subpixel region and the other of the pair of pixel electrodes is provided to the second subpixel region; the liquid crystal panel includes first and second subpixels, (i) the first subpixels each including the first subpixel region and a region on the counter substrate which region corresponds to the first subpixel region and (ii) the second subpixels each including the second subpixel region and a region on the counter substrate which region corresponds to the second subpixel region; and the first and second subpixels include first and second alignment controlling structures, respectively. With this, a plurality of alignment regions (domains) can be formed in each subpixel and thus viewing angle characteristic can be improved.

The present liquid crystal panel can also be arranged such that each of the first and second alignment controlling structures includes at least one of (i) a rib provided on the counter substrate, (ii) a slit formed on the pixel electrode, and (iii) a slit formed on a common electrode of the counter electrode. In this case, for example, the present liquid crystal panel is arranged such that (i) the rib, (ii) the slit formed on the pixel electrode, and (iii) the slit formed on the common electrode are V-shaped when viewed in the row direction.

The present liquid crystal panel can be arranged such that: the switching element includes first and second transistors; the pair of pixel electrodes is referred to as first and second pixel electrodes which are provided on the first and second subpixel regions, respectively; the storage capacitor wirings are referred to as a first storage capacitor wiring when the storage capacitor wiring forms a capacitor with the first pixel electrode, meanwhile the storage capacitor wirings are referred to as a second storage capacitor wiring when the storage capacitor wiring forms a capacitor with the second pixel electrode; and the first and second pixel electrodes in pair are connected to the same data signal line respectively via the first and second transistors corresponding thereto.

The liquid crystal panel may also be arranged such that the first alignment controlling structure provided on each pixel has a shape which is obtained by rotating by 180° the first alignment controlling structure provided on a pixel adjacent to the pixel.

With the aforementioned arrangement, the first alignment controlling structure provided on one of two adjacent pixels has a shape which is obtained by rotating by 180° the first alignment controlling structure provided on the other of the two pixels. Therefore, in a case where the two pixels are referred to as pixels X and Y, alignment regions formed along the scanning signal line in the first subpixel of the pixel X and in the first subpixel of the pixel Y are different in kind.

Accordingly, when two adjacent pixels (X and Y) are regarded as one unit, parts of two first subpixels (e.g., two adjacent bright subpixels) belonging to the two adjacent pixels which parts are subjected to random alignment are diluted over not less than two kinds of alignment regions and certain alignment regions will not be inequitably influenced by random alignment. That is, in a unit of two adjacent pixels, influence of random alignment caused by the scanning signal line can be diluted over a plurality of alignment regions. With this, viewing angle characteristic can be continuously balanced as intended at the time of designing. Consequently, a liquid crystal display excellent in viewing angle characteristic can be realized.

The present arrangement is suitable for an MVA liquid crystal panel or the like such that: the shape of the first alignment controlling structure is such that a projected image of the shape is asymmetrical with respect to a straight line passing a center of the first subpixel region and perpendicular to the scanning signal lines, and is symmetrical with respect to a straight line passing the center of the first subpixel region and parallel to the scanning signal lines, when the projected image is cast on a plane parallel to a surface of the liquid crystal panel and including the scanning signal lines; and the shape of the second alignment controlling structure is such that a projected image of the shape is asymmetrical with respect to a straight line passing a center of the second subpixel region and perpendicular to the scanning signal lines, and is symmetrical with respect to a straight line passing the center of the second subpixel region and parallel to the scanning signal lines, when the projected image is cast on a plane parallel to the surface of the liquid crystal panel and including the scanning signal lines.

The present liquid crystal panel is preferably arranged such that in each pixel, the first and second subpixels correspond to bright and dark pixels at the time of display, respectively. This is because random alignment in a bright pixel has a greater influence on the balance of viewing angle characteristic than random alignment in a dark pixel.

The present liquid crystal panel is preferably arranged such that each pair of the pixels adjacent with each other is identical in color. With this, parts of adjacent first subpixels of the same color (e.g., two adjacent bright subpixels of the same color) which parts are subjected to random alignment are diluted over not less than two kinds of alignment regions. Therefore, viewing angle characteristic can be more improved.

The present liquid crystal panel is desirably arranged such that the second alignment controlling structure provided on each pixel has a shape which is obtained by rotating by 180° the second alignment controlling structure provided on a pixel adjacent to the pixel. With this, parts of adjacent first subpixels (e.g., two adjacent bright subpixels) which parts are subjected to random alignment are diluted over not less than two kinds of alignment regions. Furthermore, parts of adjacent second subpixels (e.g., two adjacent dark subpixels) which parts are subjected to random alignment are also diluted over not less than two kinds of alignment regions. Therefore, viewing angle characteristic can be more improved.

The present liquid crystal panel is desirably arranged such that in each pixel, the first alignment controlling structure of the pixel is identical in shape with the second alignment controlling structure of the pixel. With this, bright and dark pixels can be more flexibly disposed at the time of display.

The present liquid crystal panel is desirably arranged such that: by the first alignment controlling structures provided on each pixel, a plurality of alignments are formable along the scanning signal line in the first subpixel thereof; and by the first alignment controlling structures provided on the pixels adjacent thereto, a plurality of alignments are formable along the scanning signal line in the first subpixel thereof. With this, parts of two first subpixels (e.g., two adjacent bright subpixels) belonging to the aforementioned unit (two adjacent pixels) which parts are subjected to random alignment are diluted over not less than four kinds of alignment regions. Therefore, viewing angle characteristic can be still more improved.

The present liquid crystal panel can also be arranged such that in case where each pixel is grouped into pixel groups each consisting of a trio of pixels respectively corresponding to red, green, and blue disposed sequentially along a scanning signal line, the first alignment controlling structure provided on a pixel of a color belonging to one pixel group has a shape which is obtained by rotating by 180° the first alignment controlling structure provided on a pixel of the same color belonging to a pixel group adjacent to the pixel group. With this, parts of first subpixels of the same color adjacent in the row direction (e.g., two bright subpixels of the same color adjacent in the row direction) which parts are subjected to random alignment are also diluted over not less than two kinds of alignment regions. Therefore, viewing angle characteristic can be more improved.

The present liquid crystal panel can also be arranged such that in a case where the direction along the scanning signal lines is referred to as the row direction, the first subpixel region has two end portions along the row direction, and the first alignment controlling structure includes at least one of (i) a V-shaped rib which is provided on the counter substrate and which is superposed on both of the two end portions of the first subpixel region and bent between the end portions in the row direction, (ii) a slit which is formed on the pixel electrode and V-shaped when viewed in the row direction, and (iii) a slit which is formed on the common electrode provided on the counter electrode and which is V-shaped when viewed in the row direction.

The present liquid crystal panel can also be arranged such that in each pixel having the switching element which is provided between adjacent first and second data signal lines and connected to the first data signal line, each of the first and second alignment controlling structures of the pixel includes at least one of (i) the rib which is V-shaped when viewed in the row direction from the second data signal line, (ii) the slit which is formed on the pixel electrode and V-shaped when viewed in the row direction from the second data signal line, and (iii) the slit which is formed on the common electrode and V-shaped when viewed in the row direction from the second data signal line. With this, more parts of the drawing wiring from the switching element can be provided under the alignment controlling structure. Therefore, aperture ratio can be improved.

The present liquid crystal panel may be arranged such that: the first transistor has a drain electrode connected to the first pixel electrode via a first drain drawing wiring and a first contact hole, and the second transistor has a drain electrode connected to the second pixel electrode via a second drain drawing wiring and a second contact hole; and at least parts of the first and second drain drawing wirings superpose the first and second alignment controlling structures, respectively. Furthermore, the present liquid crystal panel may also be arranged such that at least parts of the first and second contact holes superpose the first and second alignment controlling structures, respectively. With this, in a case where each alignment controlling structure is a light-blocking type, aperture ratio can be improved.

The present liquid crystal panel may also be arranged such that: each first storage capacitor wiring has a first storage capacitor wiring extending section and each second storage capacitor wiring has a second storage capacitor wiring extending section, wherein the first storage capacitor wiring extending section is extended to the first pixel electrode to which the first storage capacitor wiring corresponds, and the second storage capacitor wiring extending section is extended to the second pixel electrode to which the second storage capacitor wiring corresponds; and at least parts of the first and second storage capacitor wiring extending sections superpose the first and second alignment controlling structures, respectively. With this, aperture ratio can be maintained and a storage capacitor can be increased by each storage capacitor wiring extending section.

The present liquid crystal panel may also be arranged such that: the first transistor has a drain electrode connected to the first pixel electrode via a first drain drawing wiring and a first contact hole, and the second transistor has a drain electrode connected to the second pixel electrode via a second drain drawing wiring and a second contact hole; and each first drain drawing wiring has a first superposition section superposed on the first storage capacitor wiring extending section and each second drain drawing wiring has a second superposition section superposed on the second storage capacitor wiring extending section.

With this, for example, in a case where the first transistor malfunctions, the first storage capacitor wiring extending section and the first drain drawing wiring can be connected together by penetrating an insulating film under the first superposition section. With this, the first pixel electrode which is present in a defective pixel and the first storage capacitor wiring can be connected together via the first storage capacitor wiring extending section. This makes it possible to reduce a potential of the first pixel electrode to a potential of the first storage capacitor wiring.

The present liquid crystal panel is desirably arranged such that: the first alignment controlling structure has a slit formed on the first pixel electrode, and the second alignment controlling structure has a slit formed on the second pixel electrode; and the first and second contact holes are formed (i) between the first superposition section and the first drain electrode and (ii) between the second superposition section and the second drain electrode, respectively; and each first drain drawing wiring has a part between the first drain electrode and the first contact hole, which part superposes any of the slits, and each second drain drawing wiring has a part between the second drain electrode and the second contact hole, which part superposes any of the slits. With this, the aforementioned disconnection can be carried out where no pixel electrode is provided. This facilitates the disconnection.

The present liquid crystal panel may also be arranged such that: the first transistor has a drain electrode connected to the first pixel electrode via a first drain drawing wiring and one or more contact holes and the second transistor has a drain electrode connected to the second pixel electrode via a second drain drawing wiring and one or more contact holes; and each first drain drawing wiring is hollowed where the first drain drawing wiring intersects with the contact hole and each second drain drawing wiring is hollowed where the second drain drawing wiring intersects with the contact hole. With this, aperture ratio can be improved by the hollow. Furthermore, in a case where a plurality of contact holes are provided, redundancy can be secured in terms of electric connection of the drain drawing wiring and each pixel electrode and thus poor connection can be prevented. In this case, the present liquid crystal panel may also be arranged such that: in a case where directions along the data signal line and the scanning signal line are referred to as row and column directions, respectively, each first drain drawing wiring is hollowed by having two hollows corresponding to two of the contact holes, the two hollows being extended in the row and column directions, respectively; and each second drain drawing wiring is hollowed by having two hollows corresponding to two of the contact holes, the two hollows being extended in the row and column directions, respectively. With this, fluctuation in an area of contact can be prevented even if random alignment occurs.

A liquid crystal display unit of the present invention includes a liquid crystal panel as set forth above; and a driver.

A liquid crystal display of the present invention includes a liquid crystal display unit as set forth above.

The present liquid crystal display is arranged such that the scanning lines and the data signal lines are driven so that during one frame period, a signal potential having the negative polarity with respect to a standard potential is supplied to the switching elements in the vicinity of the intersections belonging to the A group and on the other hand, a signal potential having the positive polarity with respect to the standard potential is supplied to the switching elements in the vicinity of the intersections belonging to the B group.

With the aforementioned arrangement, when the data signal line is operated by the nH/1V inversion driving (such driving that: for the row direction, different polarities are supplied for each switching element; and for the column direction, different polarities are supplied for every n adjacent switching elements), each dot (pixel) can be inversed. That is, the data signal line can be sufficiently charged by the nH/1V inversion driving, and the irregular disposition of bright sub-pixels as shown in FIG. 37 will not occur. With this, a liquid crystal display of high display quality in which display is less likely to be uneven can be realized.

Moreover, in the present liquid crystal display, an inversion cycle of the data signal can be made longer (the data signal can be inversed for every n horizontal period). Therefore, moving picture performance can also be improved by performing pseudo impulse driving or writing an interpolation image with the frequency of image writing increased.

Furthermore, since the nH/1V inversion driving can be applied, power consumption in a driver can be reduced and thus generation of heat in the driver can be prevented. Moreover, when generation of heat in the driver is prevented, a driver IC can be miniaturized. With this, an overall size of a liquid crystal display can also be reduced.

The present liquid crystal display may also be arranged such that potentials of the first and second storage capacitor wirings are controlled so that phases of potential waveform of the first and second storage capacitor wirings are shifted by 180°.

The present liquid crystal panel may also be arranged such that: each first storage capacitor wiring is controlled in potential such that the potential rises after each of the transistors is switched off and the rise state is maintained until each of the transistors is switched off in the next frame and on the other hand, each second storage capacitor wiring is controlled in potential such that the potential falls after each of the transistors is switched off and the fall state is maintained until each of the transistors is switched off in the next frame; or each first storage capacitor wiring is controlled in potential such that the potential falls after each of the transistors has been switched off and the fall state is maintained until each of the transistors is switched off in the next frame and on the other hand, each second storage capacitor wiring is controlled in potential such that the potential rises after each of the transistors has been switched off and the rise state is maintained until each of the transistors is switched off in the next frame. With this, waveform distortion of the potentials of the storage capacitor wirings has less influence on drain effective potential and thus this is effective in reducing uneven luminance. In this case, the present liquid crystal display may also be arranged such that potential rises of the first storage capacitor wiring and potential falls of the second storage capacitor wiring are shifted by one horizontal period, or potential falls of the first storage capacitor wiring and potential rises of the second storage capacitor wiring are shifted by one horizontal period.

The present liquid crystal display can also be described as a liquid crystal display including pixel regions disposed in row and column directions where the row direction is an extending direction of a scanning signal line, each pixel region has a pair of pixel electrodes connected to the same one of the scanning signal lines and to the same one of the data signal lines via a switching element wherein the pixel electrodes form capacitors with storage capacitor wirings in such a manner that pixel electrodes in one pixel region form the capacitors with different ones of the storage capacitor wirings, respectively, and one of two pixel electrodes provided on one pixel region and one of the two pixel electrodes provided on a pixel region adjacent to the pixel region in the column direction, form the capacitors with the same one of the storage capacitor wirings, wherein each of two pixel electrodes provided on each pixel region in the same pixel region array is connected to one or the other of two adjacent data signal lines and n consecutive pixel regions are sequentially grouped into blocks in the same pixel region array where n≧2, for pixel regions belonging to the same block, the pair of pixel electrodes in one pixel region and the pair of pixel electrodes in a pixel region adjacent to the pixel region in the column direction are connected to different ones of the data signal lines, and for pixel regions belonging to different blocks, the pair of pixel electrode in one pixel region and the pair of pixel electrode in a pixel region adjacent to the pixel region are connected to the same one of the data signal lines.

The present liquid crystal display is desirably arranged such that the data signal lines are supplied alternatively with a signal potential equal to or higher than a standard potential and a signal potential equal to or lower than the standard potential for every n horizontal period in such a manner that one data signal line is supplied with one of the signal potentials in one horizontal period, while a data signal line adjacent to the data signal line is supplied with the other one of the signal potentials in the horizontal period.

The present liquid crystal display may also be arranged such that: storage capacitor wiring signals whose levels are alternated in accordance with a cyclic level shift are supplied to the storage capacitor wirings in such a manner that two storage capacitor wirings forming the capacitors with the pair of pixel electrodes in one pixel region are supplied respectively with storage capacitor wiring signals which are alternative to each other in terms of the levels initially after a scanning signal line to which the pair of the pixel electrodes is connected is scanned.

A television receiver of the present invention includes a liquid crystal display as set forth above; and a tuner section for receiving television broadcast.

As mentioned above, in a case where a pixel division method liquid crystal display is arranged with the use of the present active matrix substrate, each dot (pixel) can be inversed when the data signal line is operated by the nH/1V inversion driving. That is, with the nH/1V inversion driving, the data signal line can be sufficiently charged and bright subpixels can be regularly disposed. With this, a liquid crystal display of high display quality in which display is less likely to be uneven can be realized. This effect may be particularly remarkable in a large-scale liquid crystal display.

BRIEF DESCRIPTION OF DRAWINGS

FIG. 8 (b) is a schematic view showing alignment in a liquid crystal display to which the liquid crystal panel shown in FIG. 7 is applied.

FIG. 9 (b) is a schematic view showing alignment in a liquid crystal display to which the liquid crystal panel shown in FIG. 7 is applied.

FIG. 23 (b) is a schematic view showing a configuration of the present liquid crystal display.

REFERENCE SIGNS LIST

Figure 1:
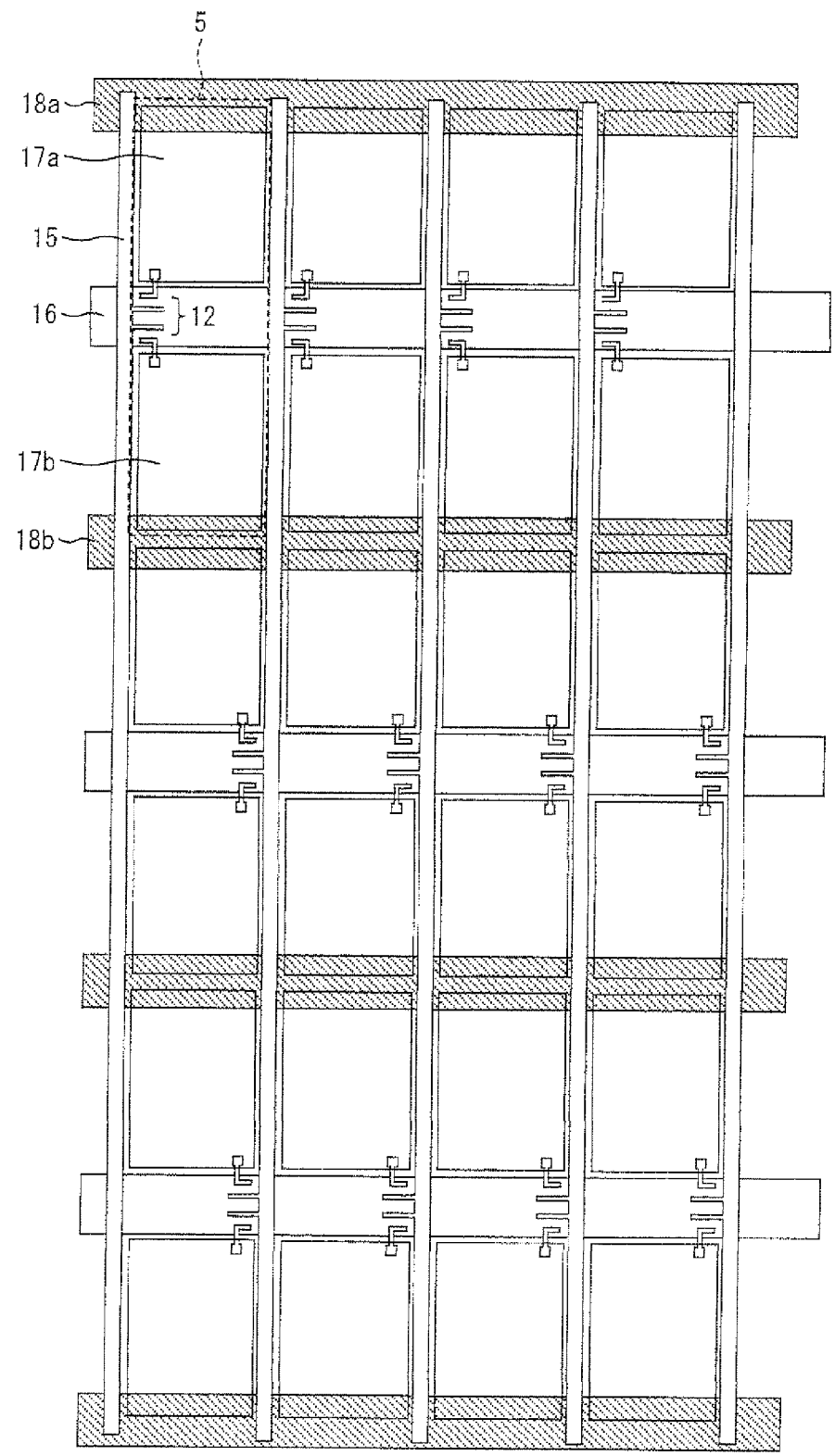
FIG. 1 is a plan view showing a configuration of a liquid crystal panel according to an embodiment of the present invention.

5 Pixel region
55 Pixel
12 Switching element
12a First transistor
12b Second transistor
15 Data signal line
16 Scanning signal line
17a First pixel electrode
17b Second pixel electrode
18a First storage capacitor wiring
18b Second storage capacitor wiring
100 Liquid crystal display unit
110 Liquid crystal display
601 Television receiver
S Slit
D1-D4 Alignment region
L1 First rib
L2 Second rib

DESCRIPTION OF EMBODIMENTS

Figure 2:
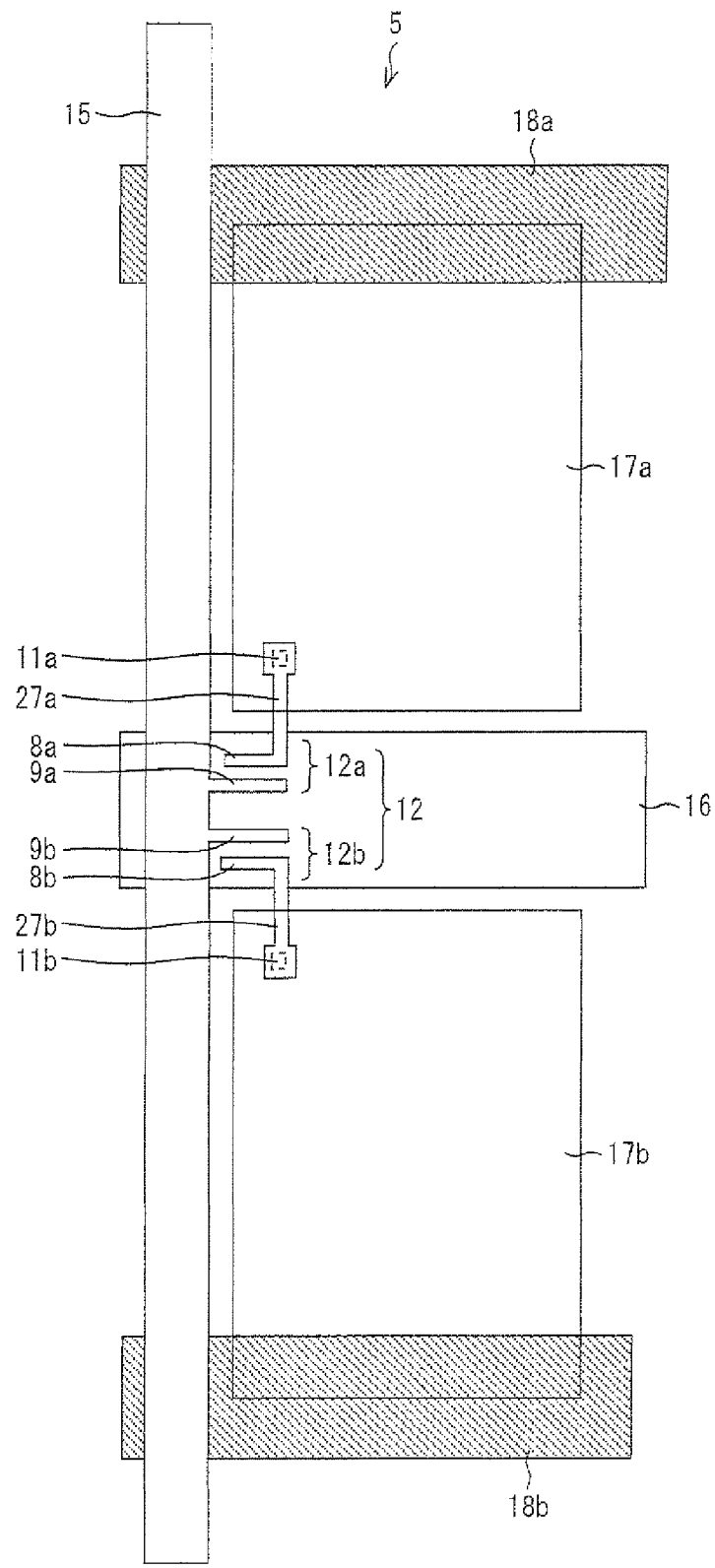
FIG. 2 is an enlarged plan view showing a part of the liquid crystal panel of FIG. 1.

FIG. 1 is a plan view of a liquid crystal panel according to an embodiment of the present invention. It should be noted that though the present liquid crystal panel includes an active matrix substrate of the present invention, a liquid crystal layer, and a color filter substrate, FIG. 1 does not show the liquid crystal layer and the color filter substrate. FIG. 2 is an enlarged plan view showing a part of FIG. 1.

As shown in FIG. 1, the present active matrix substrate includes data signal lines 15 and scanning signal lines 16 which intersect at right angles to each other, first and second storage capacitor wirings 18a and 18b, and pixel regions 5 provided in a matrix pattern. It should be noted that a layer in which the data signal lines 15 are provided is higher than a layer in which the scanning signal lines 16 are provided. Each scanning signal line 16 extends in a row direction (horizontal direction in the drawing) so as to cross the pixel regions 5. Each data signal line 15 extends in a column direction (vertical direction in the drawing) along one side of pixel regions (edge along a direction in which the data signal line 15 intersects at right angles to the scanning signal lines 16). The first or second storage capacitor wiring 18a or 18b extends in the row direction (horizontal direction in the drawing) so as to superpose adjacent end portions of two pixel regions adjacent in the column direction.

As shown in FIG. 2, on the pixel region 5, a switching element 12 including first and second transistors 12a and 12b, first and second pixel electrodes 17a and 17b, the first and second storage capacitor wirings 18a and 18b, first and second drain drawing wirings 27a and 27b, and first and second contact holes 11a and 11b are formed.

Here, the first and second pixel electrodes 17a and 17b are disposed on one (upper in the drawing) and the other (lower in the drawing) sides of the scanning signal line 16, respectively. The switching element 12 is provided in the vicinity of an intersection of the data signal line 15 and the scanning signal line 16. As shown in FIG. 1, each of the first and second pixel electrodes 17a and 17b provided in any of the pixel regions 5 is connected to either of two data signal lines 15 on either side of the pixel region 5 via the switching element 12.

A source electrode 9a of the first transistor is drawn in the row direction from the data signal line 15. A drain electrode 8a of the first transistor is formed so as to face the source electrode 9a and connected to the first pixel electrode 17a via the first drain drawing wiring 27a and the contact hole 11a. Furthermore, a first storage capacitor is formed on a superposition section in which the first pixel electrode 17a and the first storage capacitor wiring 18a superpose each other. Similarly, a source electrode 9b of the second transistor is drawn in the row direction from the data signal line 15. A drain electrode 8b of the second transistor is formed so as to face the source electrode 9b. The drain electrode 8b is connected to the second pixel electrode 17b via the second drain drawing wiring 27b and the contact hole 11b. Moreover, a second storage capacitor is formed on a superposition section in which the second pixel electrode 17b and the second storage capacitor wiring 18b superpose each other.

In the present liquid crystal panel, each pixel is formed in such a manner that (i) it is formed with the pixel region 5, and regions on a color filter substrate and in a liquid crystal layer which regions correspond to the pixel region 5, (ii) a first subpixel is formed with a region on which the first pixel electrode 17a is provided, and regions on the counter substrate and in the liquid crystal layer which regions correspond to the region on which the first pixel electrode 17a is provided, and (iii) a second subpixel is formed with a region on which the second pixel electrode 17b is provided, and regions on the counter substrate and in the liquid crystal layer which regions correspond to the region on which the second pixel electrode 17b is provided.

With the present liquid crystal panel, the same signal potential is supplied from the data signal line 15 to the first or second pixel electrodes 17a or 17b. However, potentials of the first and second storage capacitor wirings 18a and 18b are individually controlled so as to set the first and second pixel electrodes 17a and 17b to different potentials via the first and second storage capacitors.

Accordingly, in a liquid crystal display including the present liquid crystal panel, constituting each pixel by a high-luminance subpixel (bright subpixel) and a low-luminance subpixel (dark subpixel) makes it possible to display halftone by area coverage modulation and thus viewing angle dependence of γ characteristic (e.g. excess brightness) can be improved.

Figure 3:
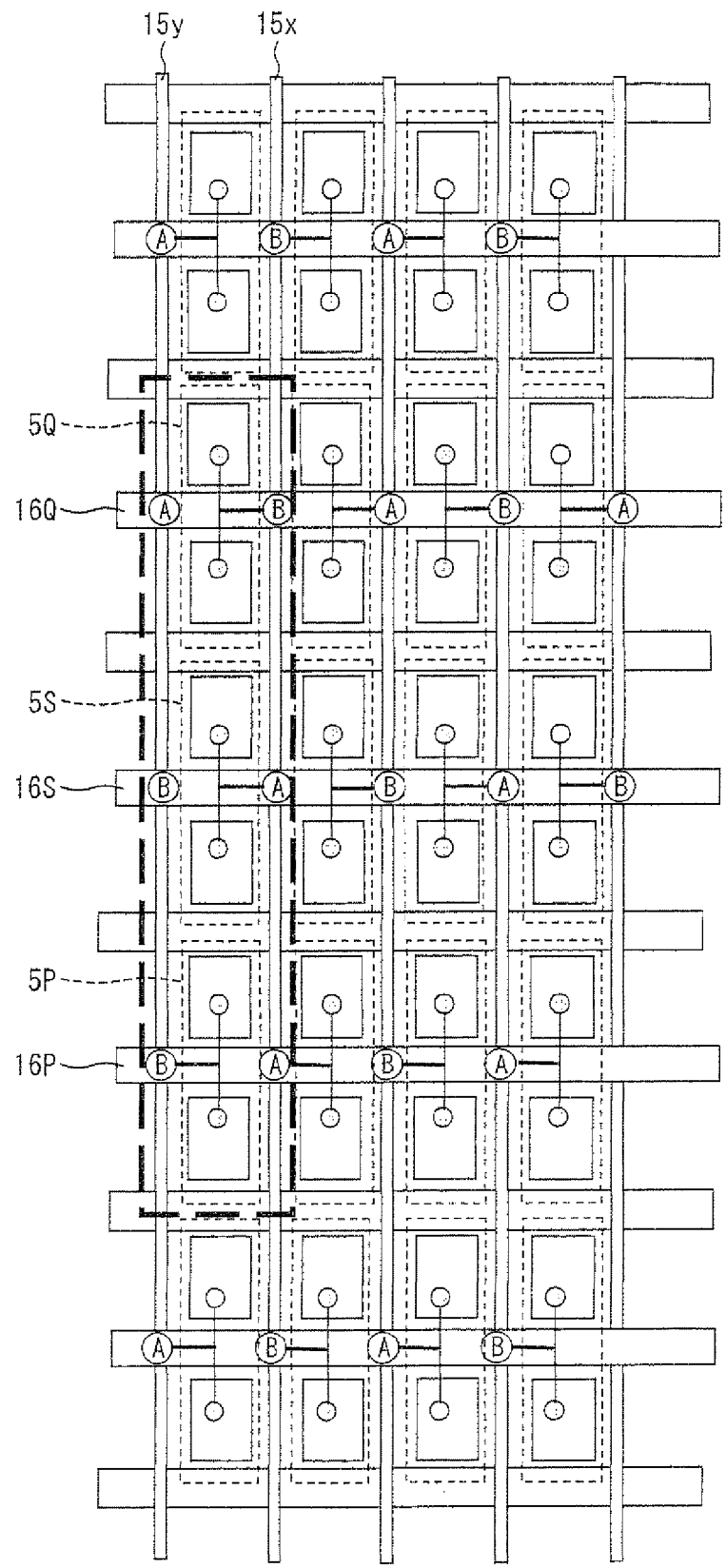
FIG. 3 is a schematic view showing a configuration of an active matrix substrate of the liquid crystal panel shown in FIG. 1.
Figure 4:
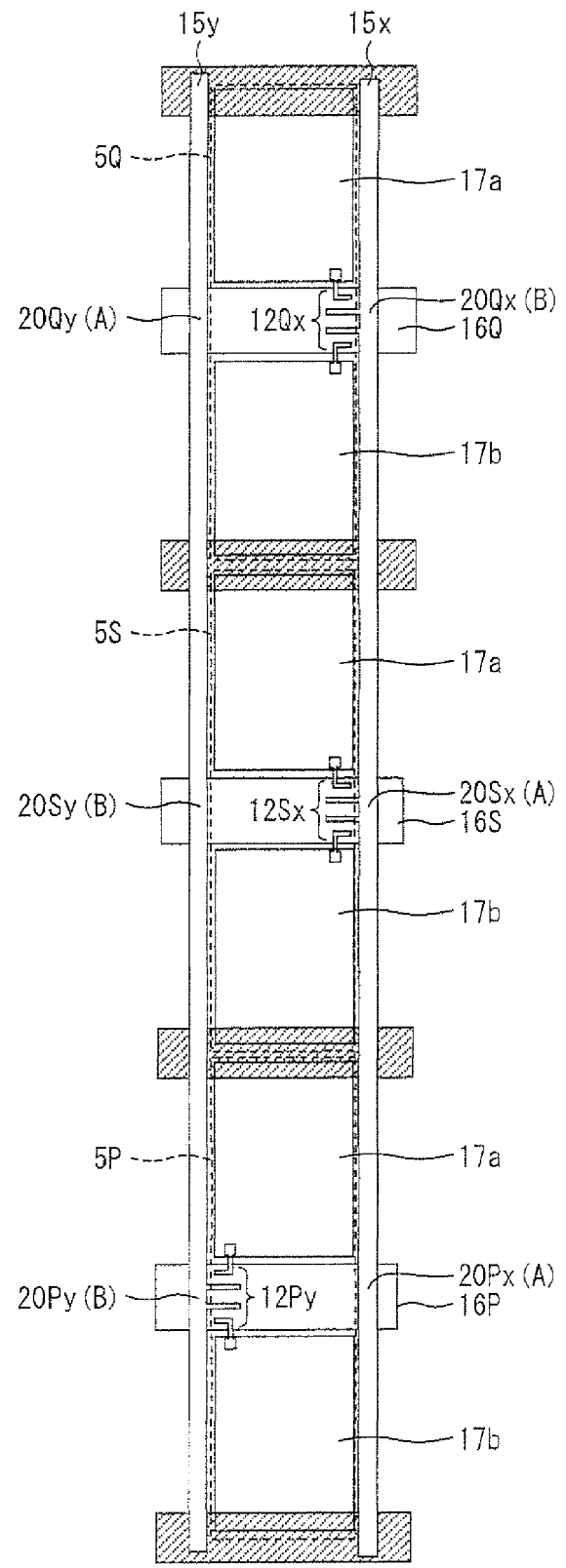
FIG. 4 is an enlarged plan view showing a part of the active matrix substrate shown in FIG. 3.

With reference to FIGS. 1, 3 and 4, the following describes a relationship of connection of first and second pixel electrodes which are provided in each pixel region on an active matrix substrate of the present liquid crystal panel to a data signal line. It should be noted that a liquid crystal panel is applied to a liquid crystal display in which the nH/1V inversion driving as set forth above is performed. Furthermore, FIG. 3 is a schematic view showing a part of the aforementioned active matrix substrate and FIG. 4 is an enlarged plan view showing a part of FIG. 3, which part is enclosed with a bold dashed line in FIG. 3.

First, intersections of the same data signal line and the scanning signal lines are alternately grouped into A and B groups for every n (n: not less than 2) adjacent intersections and intersections adjacent in the row direction are grouped into different groups, thereby the intersections of the data signal lines and the scanning signal lines are grouped into the A and B groups. FIG. 3 shows a case where n is 2 (that is, a case where a liquid crystal panel is applied to a liquid crystal display in which the 2H/1V inversion driving is performed).

As shown in FIG. 1, each of the first and second pixel electrodes 17a and 17b provided in any of the pixel regions is connected: (i) to a first data signal line, which is one of two data signal lines on either side of the pixel region, via the switching element 12 provided in the vicinity of the intersection of the first data signal line and the scanning signal line 16 crossing the pixel region; or (ii) to a second data signal line, which is the other of the two data signal lines on either side of the pixel region, via the switching element 12 provided in the vicinity of the intersection of the second data signal line and the scanning signal line 16 crossing the pixel region.

Here, a pixel region as above and two data signal lines on either side thereof are referred to as a pixel region 5S and first and second data signal lines 15x and 15y, respectively, as shown in FIGS. 3 and 4. Two pixel electrodes (17a and 17b) provided on the pixel region 5S are connected to the first data signal line 15x via a switching element 12x provided in the vicinity of an intersection 20Sx of a scanning signal line 16S crossing the pixel region 5S and the first data signal line 15x. Here, the intersection 20Sx belongs to the A group.

Here, a pixel region adjacent to the pixel region 5S in the column direction is referred to as an adjacent pixel region. When (i) an intersection of the scanning signal line crossing the adjacent pixel region and the first data signal line 15x and (ii) the intersection 20Sx of the scanning signal line 16S crossing the pixel region 5S and the first data signal line 15x belong to the same group (A), two pixel electrodes included in this adjacent pixel region are both connected to the second data signal line 15y via the switching element. On the other hand, when (i) the intersection of the scanning signal line crossing the adjacent pixel region and the first data signal line 15x and (ii) the intersection 20Sx of the scanning signal line 16S crossing the pixel region 5S and the first data signal line 15x belong to a different group from the group (A), two pixel electrodes included in the adjacent pixel region are both connected to the first data signal line 15x via the switching element.

Accordingly, as for a pixel region 5P adjacent to the pixel region 5S in the column direction (in a downward direction in the drawing), since (i) an intersection 20Px of a scanning signal line 16P crossing the adjacent pixel region 5P and the first data signal line 15x and (ii) the intersection 20Sx of the scanning signal line 16S crossing the pixel region 5S and the first data signal line 15x belong to the same group (A), two pixel electrodes (17a and 17b) included in the adjacent pixel region 5P are both connected to the second data signal line 15y via a switching element 12Py provided in the vicinity of an intersection 20Py of the scanning signal line 16P and the second data signal line 15y.

On the other hand, as for a pixel region 5Q adjacent to the pixel region 5S in the column direction (in an upward direction in the drawing), since (i) an intersection 20Qx of a scanning signal line 16Q crossing the adjacent pixel region 5Q and the first data signal line 15x and (ii) the intersection 20Sx of the scanning signal line 16S crossing the pixel region 5S and the first data signal line 15x belong to a different group from the group (A), two pixel electrodes included in the adjacent pixel region 5Q are both connected to the first data signal line 15x via a switching element 12Qx provided in the vicinity of the intersection 20Qx.

By connecting two pixel electrodes included in each pixel region to either of two data signal lines on either side of the two pixel electrodes in accordance with the aforementioned manner, an active matrix substrate of the present liquid crystal panel can be configured.

Figure 20:
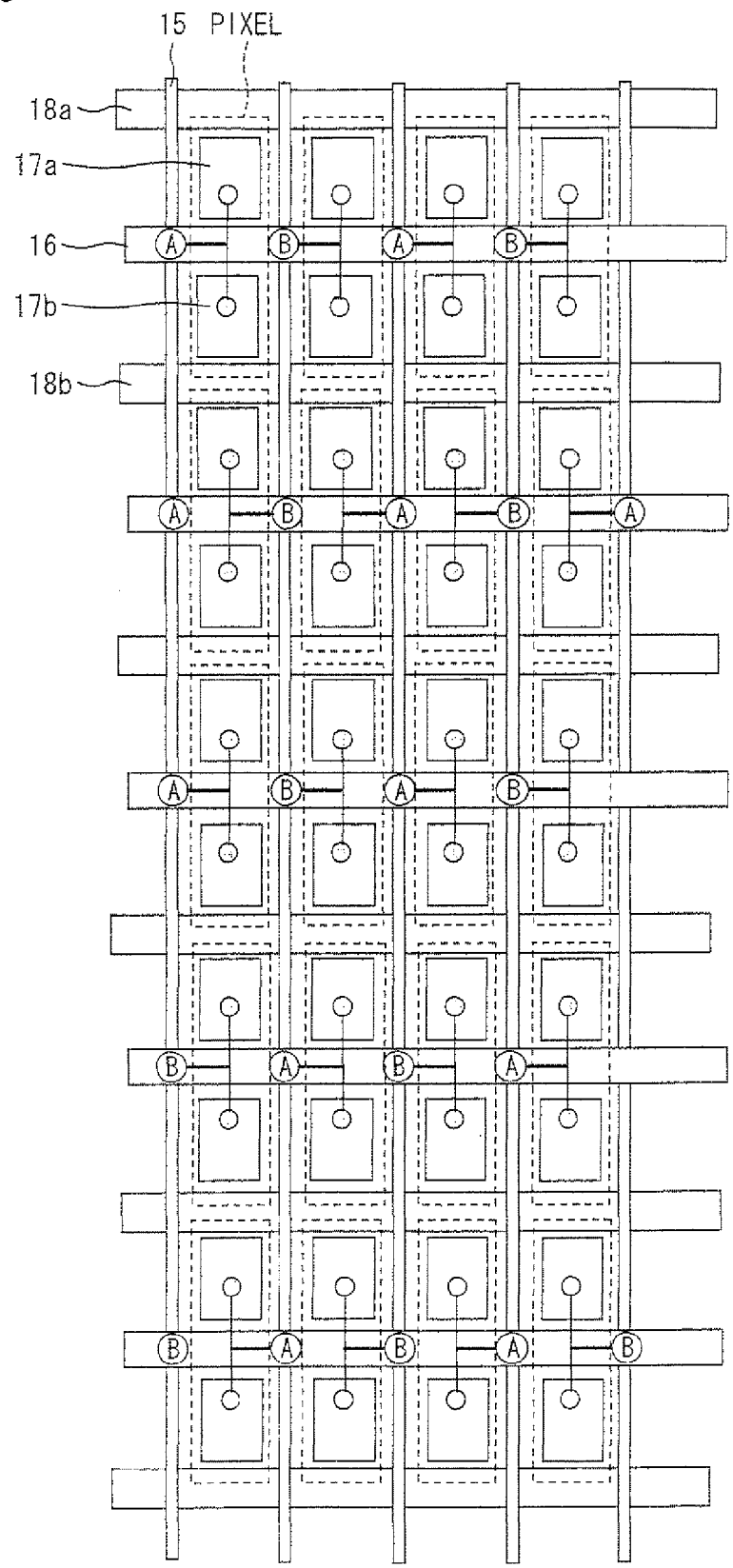
FIG. 20 is a schematic view showing another method for driving the present liquid crystal display.

Also in a case where n is not less than 2, the aforementioned manner is unchanged, except a manner of grouping intersections into groups. For example, FIG. 20 shows a case where n is 3 (i.e., a case where a liquid crystal panel is applied to a liquid crystal display in which 3H/1V inversion driving is performed).

Figure 5:
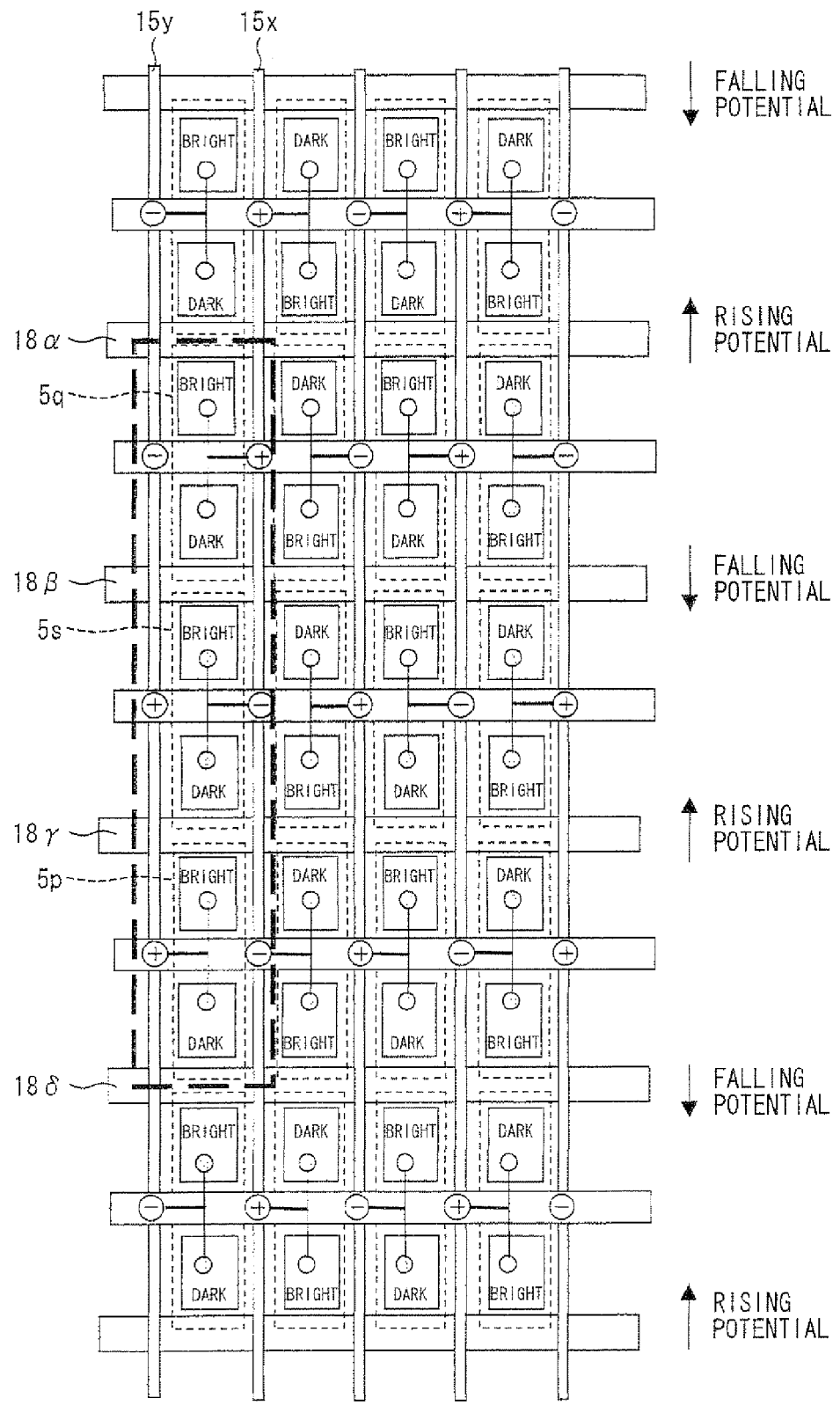
FIG. 5 is a schematic view showing a method for driving a liquid crystal display according to the present embodiment.
Figure 6:
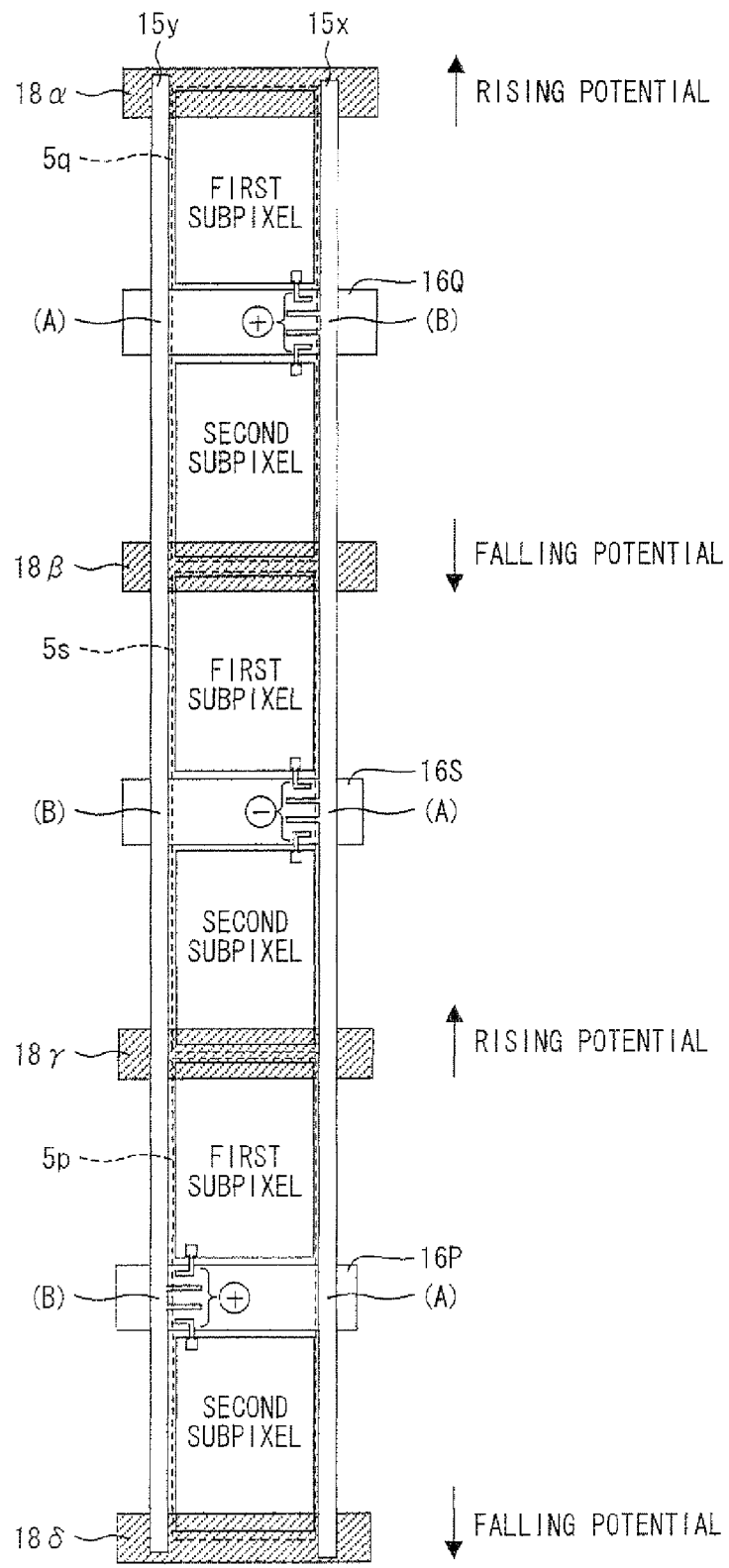
FIG. 6 is an enlarged schematic view showing a part of the liquid crystal display of FIG. 5.

With reference to FIGS. 5 and 6, the following describes a method for driving the present liquid crystal display including the aforementioned liquid crystal panel. FIG. 5 is a schematic view showing part of a display region of the present liquid crystal display. FIG. 6 is an enlarged plan view showing a part of FIG. 5, which part is enclosed with a bold dashed line in FIG. 5.

In the present liquid crystal display in which the 2H/1V inversion driving is performed (the polarities of a signal potential applied to the data signal line are inverted to a counter electrode potential Vcom for every two horizontal periods), for the liquid crystal panel shown in FIG. 3 or 4, during one frame period, the negative and positive polarities are supplied to (i) the switching element which is in the vicinity of the intersection belonging to the A group and (ii) the switching element which is in the vicinity of the intersection belonging to the B group, respectively. Furthermore, potentials of adjacent storage capacitor wirings are reversely fluctuated in such a manner that: a rising potential is supplied to a storage capacitor wiring 18α; a falling potential is supplied to a storage capacitor wiring 18β adjacent to the storage capacitor wiring 18a; the rising potential is supplied to a storage capacitor wiring 18γ adjacent to the storage capacitor wiring 18β; and the falling potential is supplied to a storage capacitor wiring 185δ adjacent to the storage capacitor wiring 18γ (potential control of the storage capacitor wiring is to be described in details later). With this, the display as shown in FIG. 5 is performed.

That is, as shown in FIG. 6, a first subpixel of a pixel 5q is a bright subpixel since the subpixel is under potential rise by the storage capacitor wiring 18a after positive polarity is written from the data signal line 15x. A second subpixel of the pixel region 5q is a dark subpixel since the subpixel is under potential fall by the storage capacitor wiring 18β after positive polarity is written from the data signal line 15x.

Moreover, a first subpixel of a pixel 5s is a bright subpixel since the subpixel is under potential fall by the storage capacitor wiring 18β after the negative polarity is written from the data signal line 15x. A second subpixel of the pixel region 5s is a dark subpixel since the subpixel is under potential rise by the storage capacitor wiring 18γ after the negative polarity is written from the data signal line 15x.

Further, a first subpixel of a pixel 5p is a bright subpixel since the subpixel is under potential rise by the storage capacitor wiring 18γ after the positive polarity is written from the data signal line 15γ. A second subpixel of the pixel region 5p is a dark subpixel since the subpixel is under potential fall by the storage capacitor wiring 18δ after the positive polarity is written from the data signal line 15y.

Figure 37:
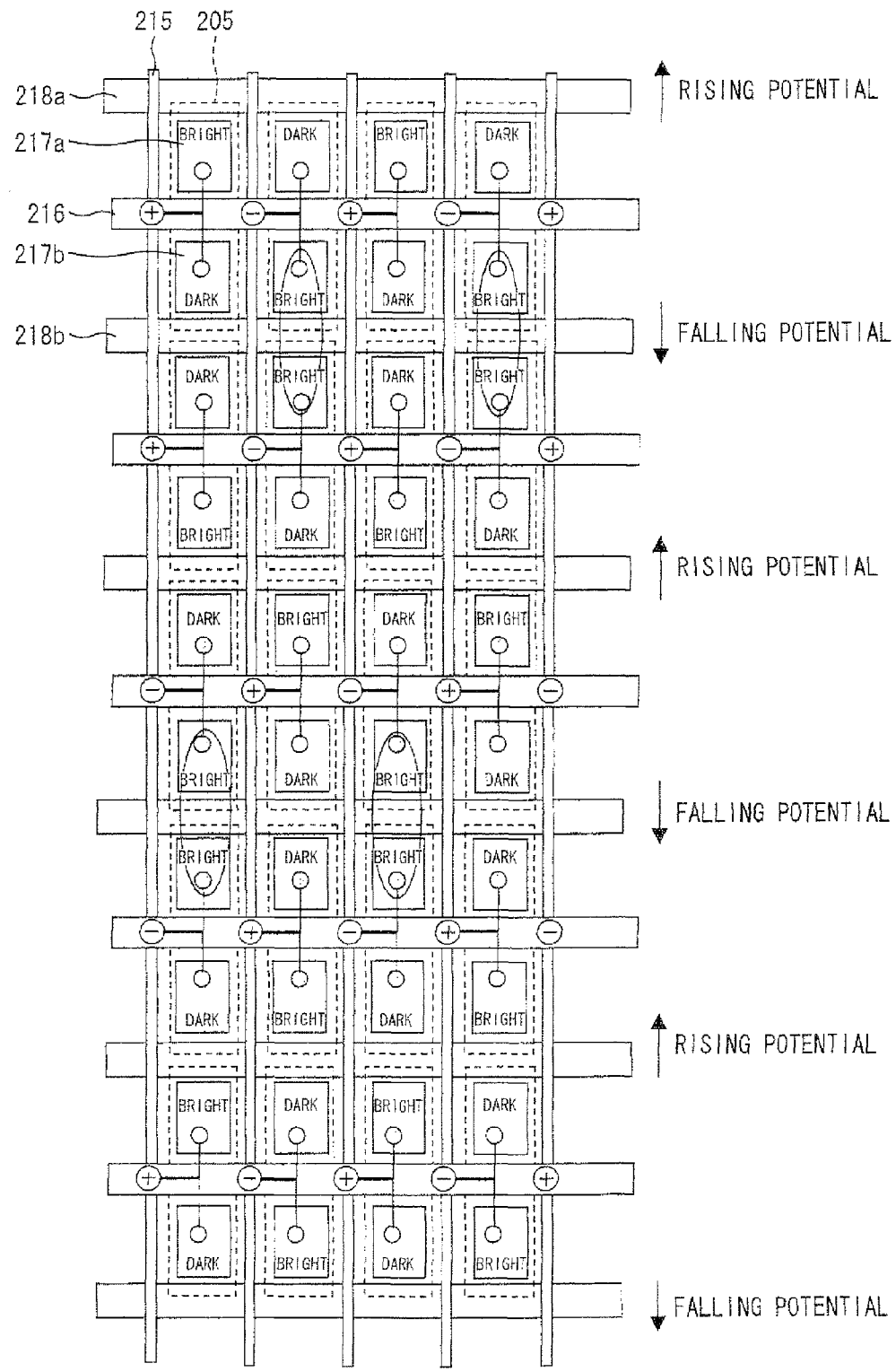
FIG. 37 is a schematic view showing a method for driving a conventional liquid crystal display.

In this way, with the present liquid crystal display, by operating the data signal line by the 2H/1V inversion driving, each dot (pixel) is inverted as shown in FIG. 5 and dots are not irregularly disposed as shown in FIG. 37. With this, even and clear display can be realized.

Similarly, in a liquid crystal display to which a liquid crystal panel of FIG. 20 is applied, when the data signal line is operated by the 3H/1V inversion driving, each dot (pixel) is inverted and even and clear display can be realized.

Figure 7:
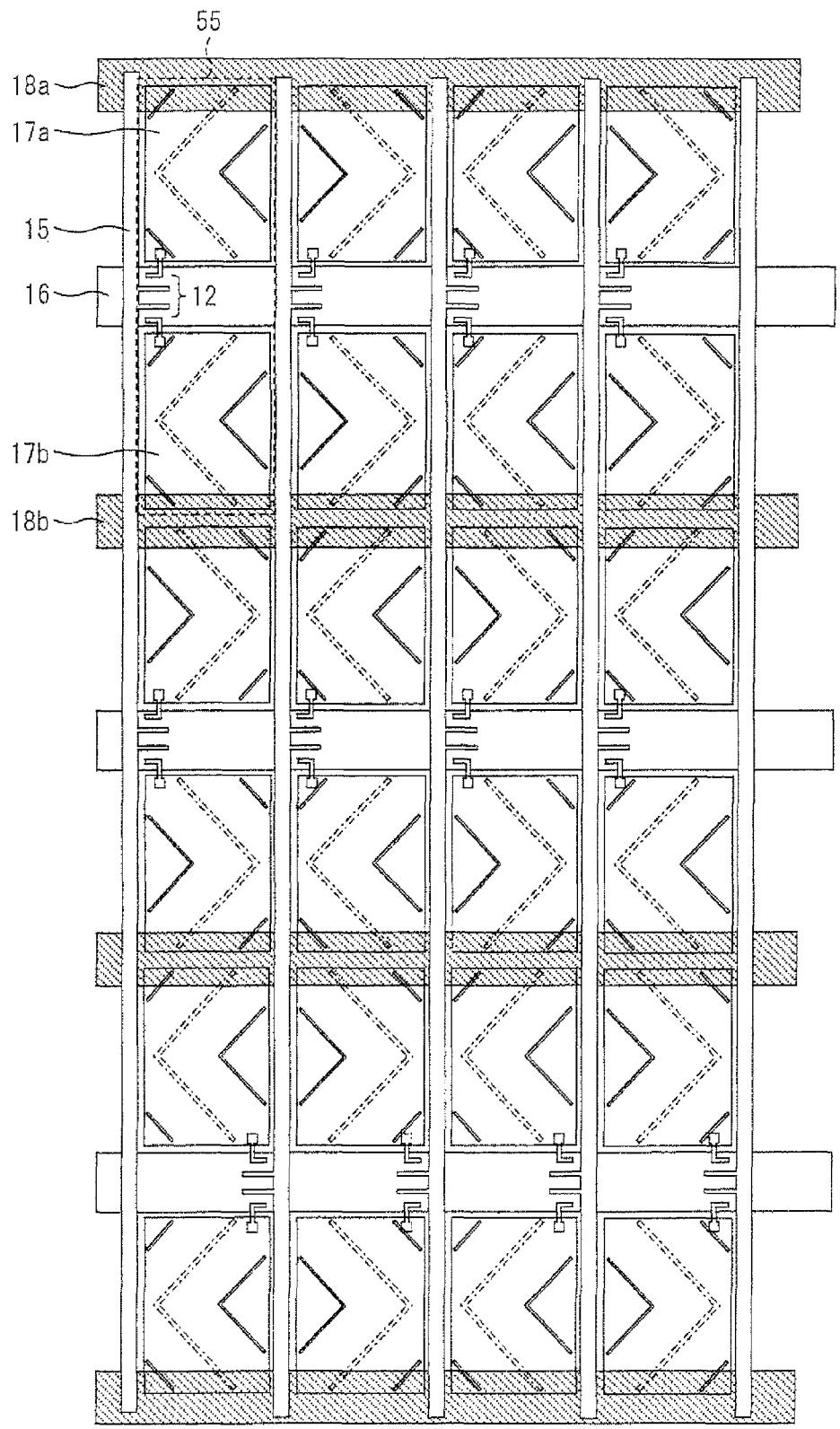
FIG. 7 is a plan view showing another configuration of the liquid crystal panel according to the present embodiment.
Figure 8:
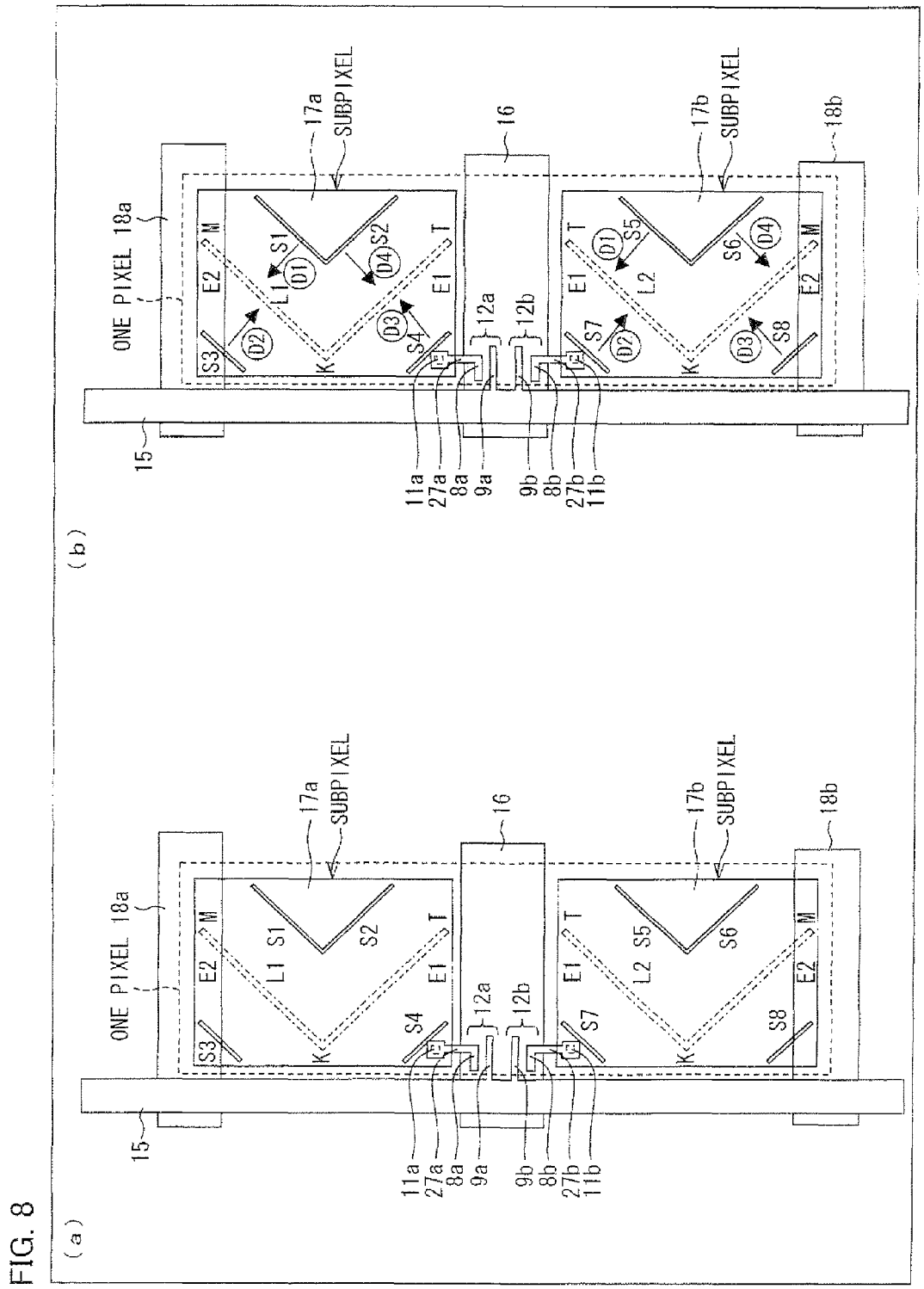
FIG. 8 (a) is an enlarged plan view showing a part (one pixel) of the liquid crystal panel shown in FIG. 7.

The present liquid crystal panel can also be configured by MVA (Multidomain Vertical Alignment) as shown in FIG. 7. It should be noted that though the present liquid panel includes the present active matrix substrate, a liquid crystal layer, and a color filter substrate, FIG. 7 does not show the liquid crystal layer but shows a rib only for the color filter substrate. FIG. 8 (a) is an enlarged plan view showing a part of FIG. 7.

As shown in FIG. 8 (a), in each pixel region (not illustrated) of an active matrix substrate, first and second subpixel regions (not illustrated) are provided so as to sandwich the scanning signal line 16 therebetween. First and second subpixels are configured to include: (i) the first subpixel region and a region on a color filter substrate which region corresponds to the first subpixel region and (ii) the second subpixel region and a region on the color filter substrate which region corresponds to the second subpixel region, respectively. The first subpixel is provided with the first pixel electrode 17a superposed on almost all the first subpixel region. The first subpixel is further provided with a first alignment controlling structure including a first rib L1 and slits (pixel electrode slits) S1 to S4. Furthermore, the second subpixel is provided with the second pixel electrode 17b superposed on almost all the second subpixel region. The second subpixel is further provided with a second alignment controlling structure including a second rib L2 and slits (pixel electrode slits) S5 to S8. Then one pixel 55 is constituted by the first and second subpixels.

In the pixel 55, the first subpixel located on one side of the scanning signal line 16 has an end portion E1 along the scanning signal line 16 and an end portion E2 facing the end portion E1 and the second subpixel located on the other side of the scanning signal line 16 has an end portion E1 along the scanning signal line 16 and an end portion E2 facing the end portion E1. Here, the region on the color filter substrate which region corresponds to the first subpixel is provided with the first rib L1 which is V-shaped when viewed in the row direction (in a direction from the left to the right in the drawing) so that a start section T and a termination section M are located on the end portions E1 and E2, respectively. Moreover, the region on the color filter substrate which region corresponds to the second subpixel is provided with the second rib L2 which is V-shaped when viewed in the row direction (in the direction from the left to the right in the drawing) so that a start section T and a termination section M are located on the end portions E1 and E2, respectively. That is, the first rib L1 and the second rib L2 are provided in the same direction.

Furthermore, a plurality of slits S1 to S4 are provided in the first pixel electrode 17a so as to correspond to the first rib L1. On the other hand, a plurality of slits S5 to S8 are provided in the second pixel electrode 17b so as to correspond to the second rib L2. Here, the slits S2 and S4 are provided on either side of a segment of the first rib L1 from the start section T to a bend section K so as to be substantially parallel to the segment. The slits S1 and S3 are provided on either side of a segment of the first rib L1 from the bend section K to the termination section M so as to be substantially parallel to this segment. The slits S5 and S7 are provided on either side of a segment of the second rib L2 from the start section T to a bend section K so as to be substantially parallel to this segment. The slits S6 and S8 are provided on either side of a segment of the second rib L2 from the bend section K to the termination section M so as to be substantially parallel to this segment. The slits S5 to S8 are similar to the slits S1 to S4 in shape and where to dispose the slits S5 to S8 with respect to the second rib L2 is similar to where to dispose the slits S1 to S4 with respect to the first rib L1. It should be noted that for the first or second rib L1 or L2, an angle formed by the start section T, the bend section K, and the termination section M (∠TKM) is about 90°.

In this way, the slit S1, one side of the first rib L1 (the segment KM), and the slit S3 are parallel to each other and obliquely stretch with respect to the scanning signal line 16 (at an angle of about 45°). The slit S2, one side of the first rib L1 (the segment TK), and the slit S4 are parallel to each other and obliquely stretch with respect to the scanning signal line 16 (at an angle of about 135°). A portion of the one side of the first rib L1 (the segment TK) and a portion of the slit S4 are located on the end portion (along the scanning signal line 16) of the first subpixel. On the other hand, the slit S6, one side of the second rib L2 (the segment KM), and the slit S8 are parallel to each other and obliquely stretch with respect to the scanning signal line 16 (at an angle of about 135°). The slit S5, one side of the second rib L2 (the segment TK), and the slit S7 are parallel to each other and obliquely stretch with respect to the scanning signal line 16 (at an angle of about 45°). A portion of the one side of the second rib L2 (the segment TK) and a portion of the slit S7 are located on the end portion (along the scanning signal line 16) of the second subpixel.

Figure 31:
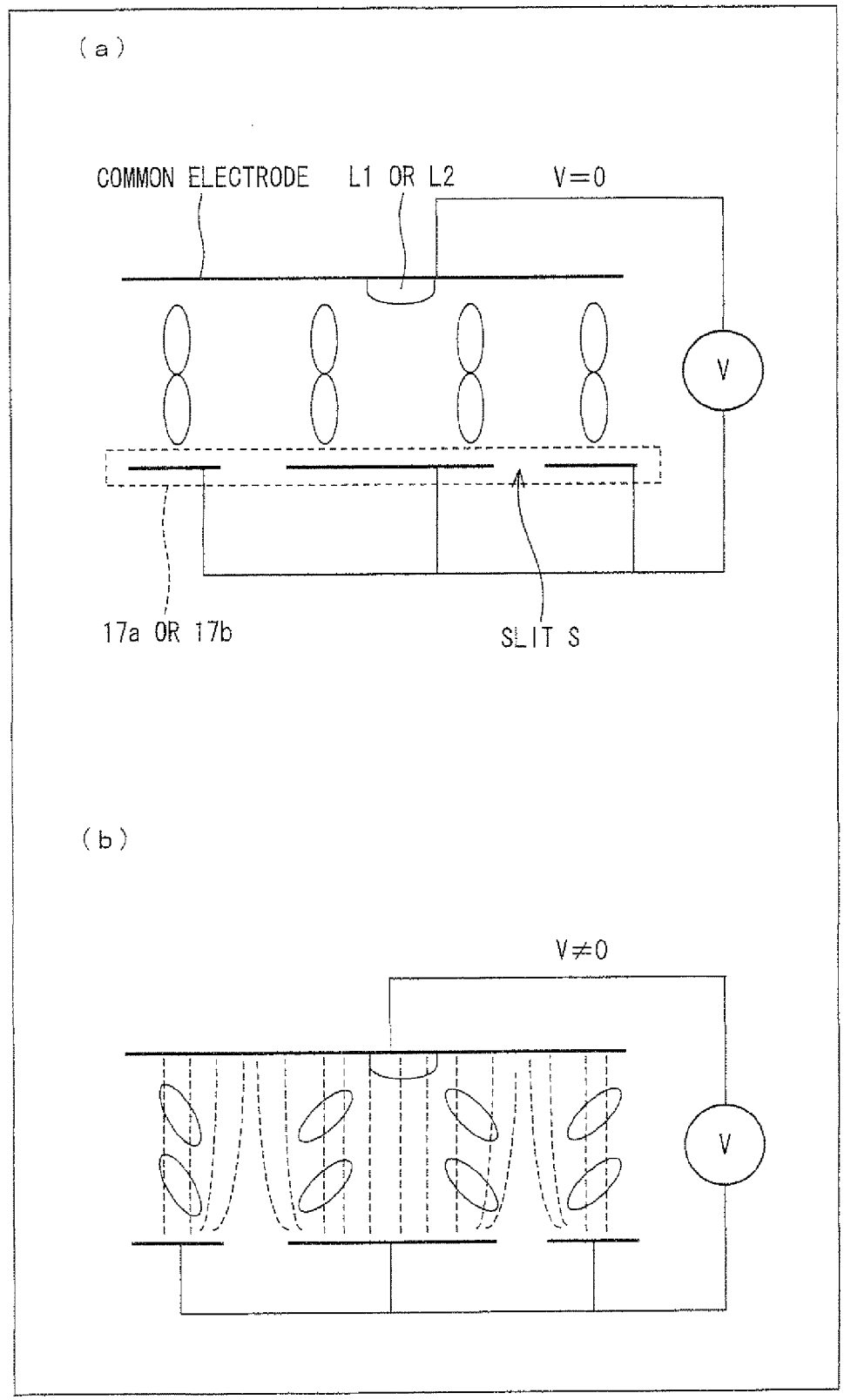
FIGS. 31 (a) and 31 (b) are cross-sectional views illustrating alignment in the present liquid crystal display (a configuration having a rib and a slit as the alignment controlling structure).

FIGS. 31 (a) and 31 (b) are schematic cross-sectional views when the present liquid crystal panel is applied to a liquid crystal display. It should be noted that in the present liquid crystal panel, a vertical alignment film is used as an alignment film and liquid crystal whose dielectric anisotropy is negative is used. As shown in the drawings, in the present liquid crystal display, liquid crystal molecules are upright at the time of black display (in a case where a voltage V across the active matrix substrate and the color filter substrate=0). On the other hand, liquid crystal molecules are tilted in different directions with respect to each region partitioned with the first or second rib and the slits (a dashed line in FIG. 31 (b) shows an electrical flux line).

That is, by providing a region on the color filter substrate which region corresponds to the first subpixel with the first rib L1 and providing the first pixel electrode 17a with the slits S1 to S4, alignment regions D3 and D4 are formed on either side of the segment of the first rib L1 from the start section T and to bend section K and alignment regions D1 and D2 are formed on either side of the segment of the first rib L1 from the bend section K to the termination section M, as shown in FIG. 8 (b). Further, the alignment regions D1 to D4 are formed as follows: The alignment region D2 is formed on a side of the slit S1 which side faces away from the first rib L1; The alignment region D3 is formed on a side of the slit S2 which side faces away from the first rib L1; The alignment region D is formed on a side of the slit S3 which side faces away from the first rib L1; The alignment region D4 is formed on a side of the slit S4 which side faces away from the first rib L1. Similarly, by providing a region on the color filter substrate which region corresponds to the second subpixel with the second rib L2 and providing the second pixel electrode 17b with the slits S5 to S8, alignment regions D1 and D2 are formed on either side of the segment of the second rib L2 from the start section T to the bend section K and alignment regions D3 and D4 are formed on either side of the segment of the second rib L2 from the bend section K to the termination section M, as shown in FIG. 8 (b). Further, the alignment regions D1 to D4 are formed as follows: The alignment region D2 is formed on a side of the slit 55 which side faces away from the second rib L2; The alignment region D3 is formed on a side of the slit S6 which side faces away from the second rib L2; The alignment region D1 is formed on a side of the slit S7 which side faces away from the second rib L2; The alignment region D4 is formed on a side of the slit S8 which side faces away from the second rib L2. With this, a broader viewing angle can be realized in a liquid crystal display to which the present liquid crystal panel is applied.

Figure 9:
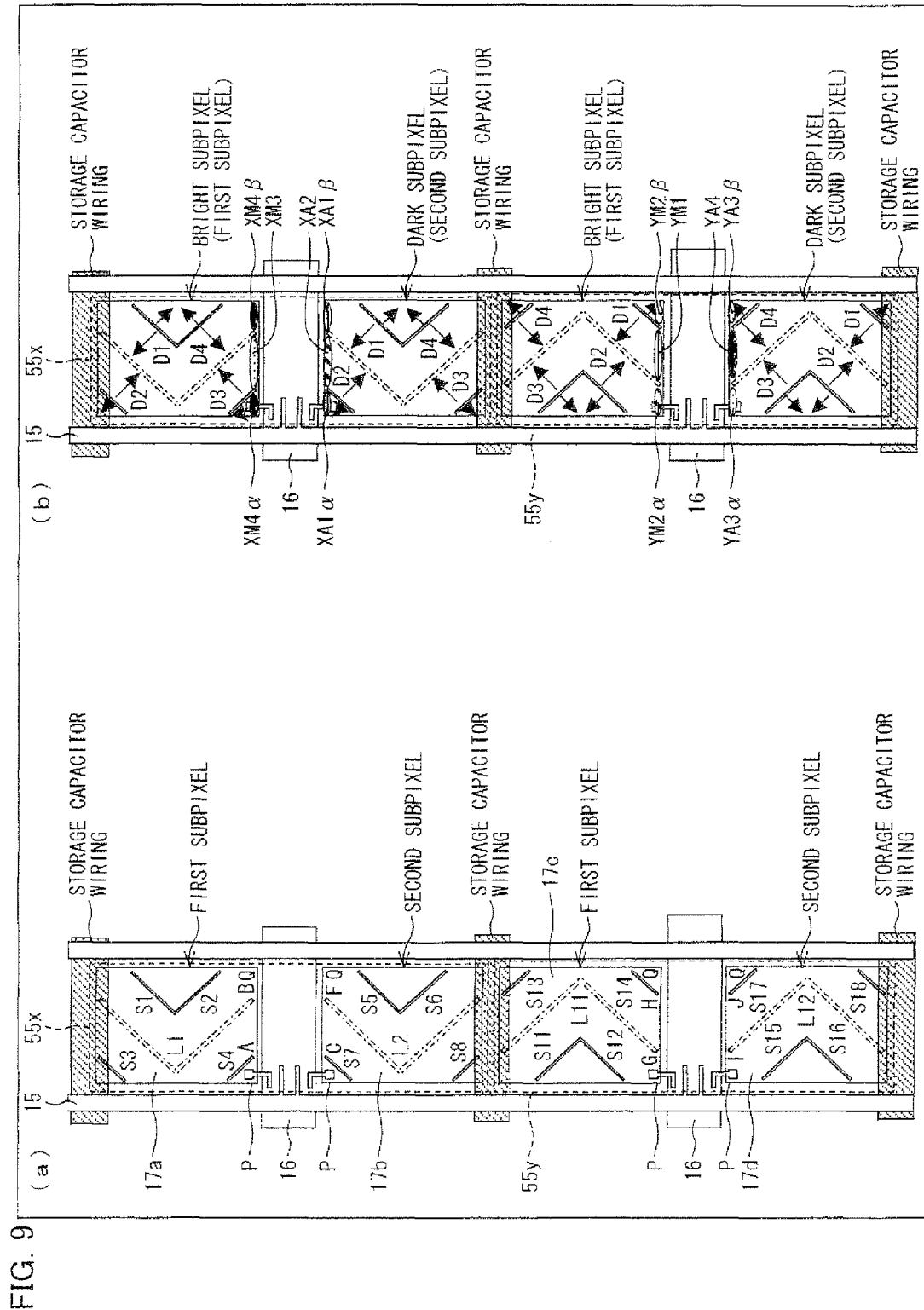
FIG. 9 (a) is an enlarged plan view showing a part (as much as two pixels) of the liquid crystal panel shown in FIG. 7.

In the present liquid crystal panel, as shown in FIG. 9 (a), the first alignment controlling structure (rib and slits) provided on a pixel 55x which is one of two pixels 55x and 55y adjacent in the column direction has a shape which is obtained by rotating by 180° the first alignment controlling structure (rib and slits) provided on the pixel 55y which is the other of the two pixels 55x and 55y adjacent in the column direction. Furthermore, in each pixel, the first and second alignment controlling structures are substantially identical in shape. Accordingly, the second alignment controlling structure (rib and slits) provided on the pixel 55x has a shape which is obtained by rotating by 180° the second alignment controlling structure (rib and slits) provided on the pixel 55y. That is, ribs Lit and L12, first and second pixel electrodes 17c and 17d, and slits S11 to S18, each of which is provided on the pixel 55y, can be obtained by rotating by 180° the ribs L1 and L2, the first and second pixel electrodes 17a and 17b, and the slits S1 to S8, each of which is provided on the pixel 55x. Specifically, the slit S11, one side of the first rib L11, and the slit S13 are parallel to each other and obliquely stretch with respect to the scanning signal line 16 (at an angle of about 135°). The slit 812, one side of the first rib L11, and the slit S14 are parallel to each other and obliquely stretch with respect to the scanning signal line 16 (at an angle of about 45°. A portion G of the one side of the first rib L1 and a portion H of the slit S4 are located on the end portion (along the scanning signal line 16) of the first subpixel. On the other hand, the slit S16, one side of the second rib L12, and the slit S18 are parallel to each other and obliquely stretch with respect to the scanning signal line 16 (at an angle of about 45°. The slit S15, one side of the second rib L12, and the slit S17 are parallel to each other and obliquely stretch with respect to the scanning signal line 16 (at an angle of about 135°. A portion I of the one side of the second rib L12 (the segment TK) and a portion J of the slit S17 are located on the end portion (along the scanning signal line 16) of the second subpixel. Moreover, in the pixel 55x, as shown in FIG. 9 (a), a portion B of the one side of the first rib L1 and a portion A of the slit S4 are located on the end portion of the first subpixel (along the scanning signal line 16) and a portion F of the one side of the second rib L2 and a portion C of the slit S7 are located on the end portion of the second subpixel (along the scanning signal line 16).

FIG. 9 (b) shows the distribution of the alignment regions D1 to D4 formed on the pixels 55x and 55y. It should be noted that in each of the pixels 55x and 55y, the first and second subpixels correspond to bright and dark subpixels, respectively.

It is known that in each pixel, liquid crystals are randomly aligned in the vicinity of the scanning signal line 16 (along the scanning signal line 16). In the present liquid crystal panel, parts of random alignment in the alignment regions D1 to D4 of the bright and dark subpixels in the two adjacent pixels 55x and 55y are as follows: Parts of random alignment in the alignment regions D1 to D4 of the bright subpixel in the pixel 55x are 0 (none), 0 (none), XM3, and XM4α+XM4β, respectively. Parts of random alignment in the alignment regions D1 to D4 of the dark subpixel in the pixel 55x are XA1α+XA1β, XA2, 0 (none), and 0 (none), respectively. Parts of random alignment in the alignment regions D1 to D4 of the bright subpixel in the pixel 55y are YM1, YM2α+YM2β, 0 (none), and 0 (none), respectively. Parts of random alignment in the alignment regions D1 to D4 of the dark subpixel in the pixel 55y are 0 (none), 0 (none), YA3α+YA3β, and YA4, respectively.

Accordingly, when the two pixels (55x and 55y) are regarded as one unit, parts of random alignment in the alignment regions D1 to D4 which parts are included in two bright subpixels are YM1, YM2α+YM2α, XM3, and XM4α+XM4β, respectively. Moreover, parts of random alignment in the alignment regions D1 to D4 which parts are included in two dark subpixels are XA1α+XA1β, XA2, YA3α+YA3β, and YA4, respectively.

The above shows that in the present liquid crystal panel, the parts of random alignment to which the two bright subpixels included in the pixels 55x and 55y adjacent in the column direction is subjected are diluted over the alignment regions D1 to D4. Furthermore, in the present liquid crystal panel, the first and second alignment controlling structures are provided in the pixels 55x and 55y so that YM1, YM2α+YM2β, XM3, and XM4α+XM4β are substantially equal in size. Therefore, areas of random alignment in the alignment regions D1 to D4 are (influence of random alignment to which the alignment regions are subjected is) almost equalized. Similarly, it is shown that the parts of random alignment to which the two dark subpixels included in the pixels 55x and 55y adjacent in the column direction is subjected are diluted over the alignment regions D1 to D4. Furthermore, in the present liquid crystal panel, the first and second alignment controlling structures are provided in the pixels 55x and 55y so that XA1α+XA1β, YA3α+YA3β, and YA4 are substantially equal in size. Therefore, areas of random alignment in the alignment regions D1 to D4 are (influence of random alignment to which the alignment regions are subjected is) almost equalized. The above is also applied to a case where bright and dark subpixels are replaced with each other in each pixel.

The sizes of the parts of random alignment can be approximated to lengths on the scanning signal line 16 which are shown in FIG. 9 (a) as follows: YM1, YM2α, YM2β, XM3, XM4α, XM4β, XA1α, XA1β, XA2, YA3α, YA3β, and YA4 can be approximated to lengths between: G and H, P and G, H and Q, A and B, P and A, B and Q, P and C, F and Q, C and F, P and I, J and Q, and I and J, respectively. P and Q show either edge of the subpixel along the scanning signal line.

In this way, with the present liquid crystal panel, influence of random alignment by the scanning signal line 16 can be equitably diluted over the alignment regions (D1 to D4). With this, viewing angle characteristic can be continuously balanced as intended at the time of designing. Consequently, a liquid crystal display excellent in viewing angle characteristic can be realized.

The following explains this point.

In a liquid crystal display in which a pixel division method and an MVA mode are combined together, a part of random alignment is produced along a scanning signal line. As a result, an area of an alignment region is reduced by the size of the part of random alignment and substantially, alignment regions are different from each other in size. This phenomenon causes deterioration in viewing angle characteristic in each (up and down, left and right or lower right, upper right, upper left, lower left, or the like) direction. Accordingly, for example, in a case where the ribs L1 and L2 of two pixels adjacent in the column direction are provided in the same direction, certain alignment regions are inequitably influenced by the part of random alignment along the scanning signal line. This causes a large difference to viewing angle characteristic in each direction. However, in the present liquid crystal panel, the ribs L1 and L2 of the two pixels adjacent in the column direction are reversely provided. Therefore, influence of the part of random alignment along the scanning signal line 16 is diluted over the alignment regions D1 to D4. This makes it possible not to cause a large difference to viewing angle characteristic in each direction.

Moreover, in the liquid crystal panel shown in FIGS. 7 and 8 (a), the first and second ribs (L1 and L2) are separate (independent from each other with a gap therebetween). Therefore, for example, in a case where a one drop filling process (described later) is practiced, production of vacuum bubbles in liquid crystals can be prevented. This is because the gap between the first and second ribs facilitates the spread of liquid crystals. Furthermore, also in a case where an alignment film is formed by an ink-jet technique, the gap between the first and second ribs facilitates the spread of the alignment film. This makes it possible to prevent the alignment film from being unevenly formed.

Figure 29:
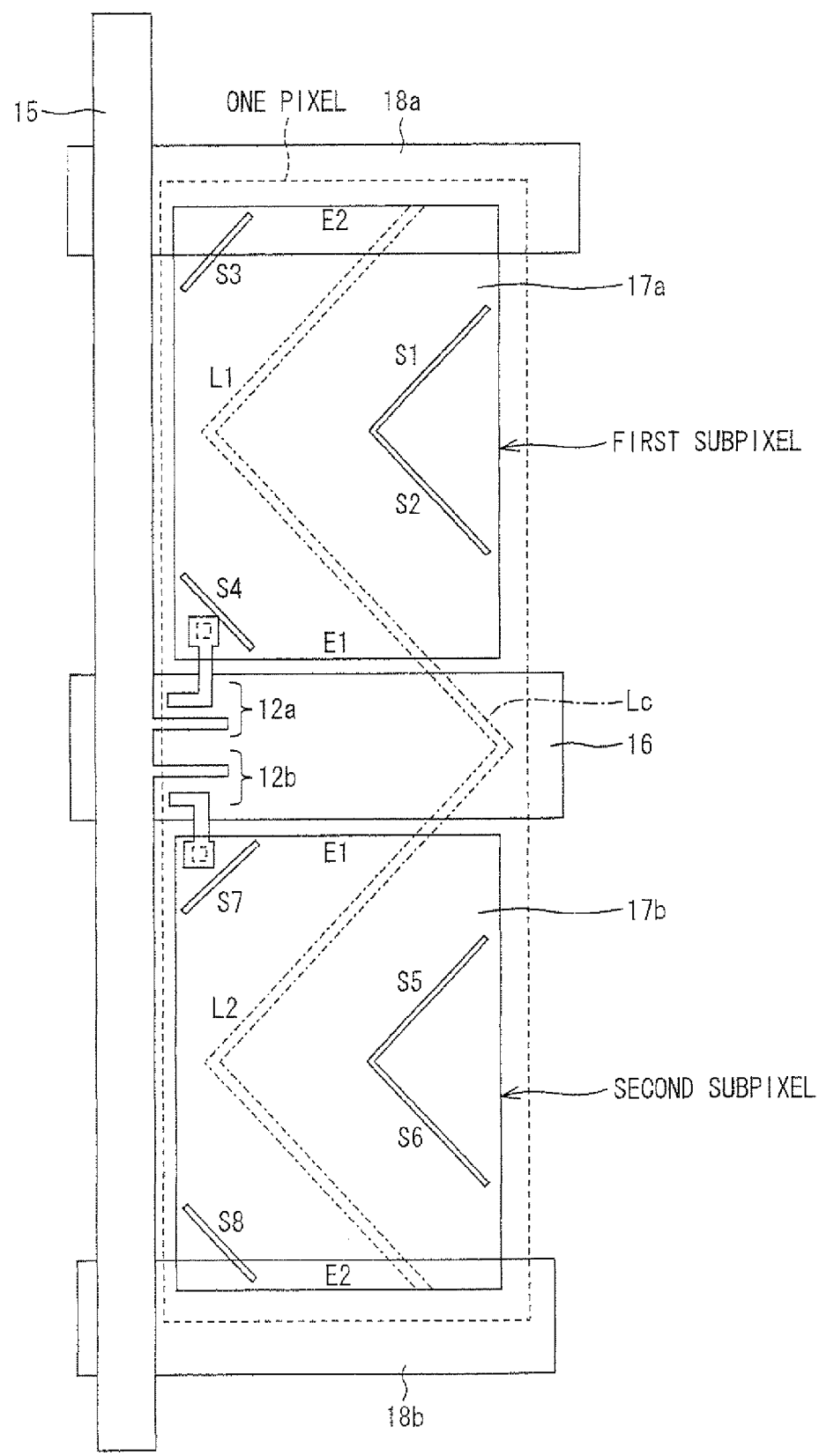
FIG. 29 is a plan view showing another configuration (a configuration having a zigzag rib) of the present liquid crystal panel.

Further, the liquid crystal panel shown in FIGS. 7 and 8 (a) can also be arranged such that the first and second ribs L1 and L2 are connected together by a rib Lc provided so as to be superposed on the scanning signal line 16, as shown in FIG. 29. In this case, a zigzag rib is provided on one pixel.

Figure 30:
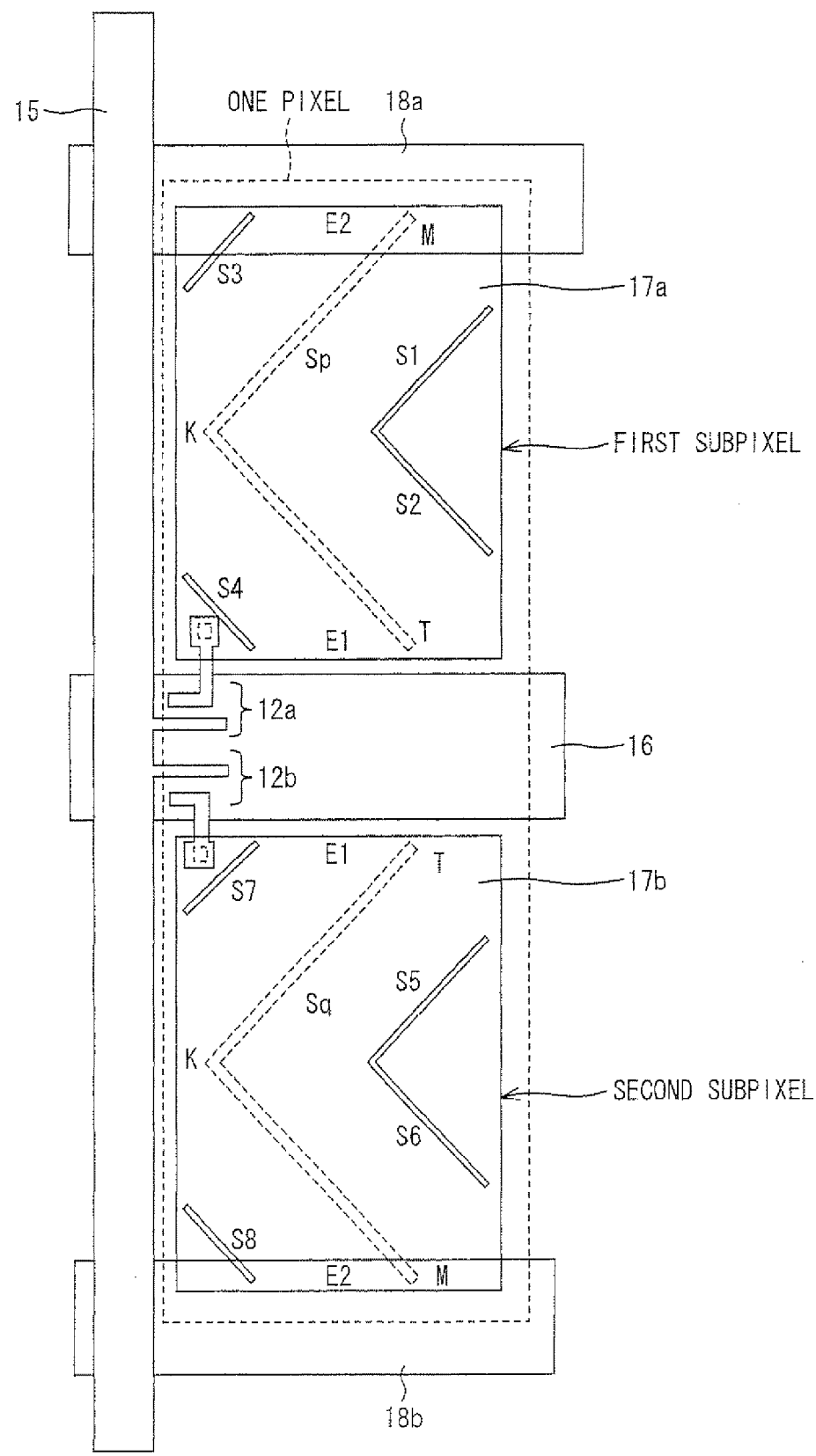
FIG. 30 is a plan view showing another configuration (a configuration having a slit only as an alignment controlling structure) of the present liquid crystal panel.
Figure 32:
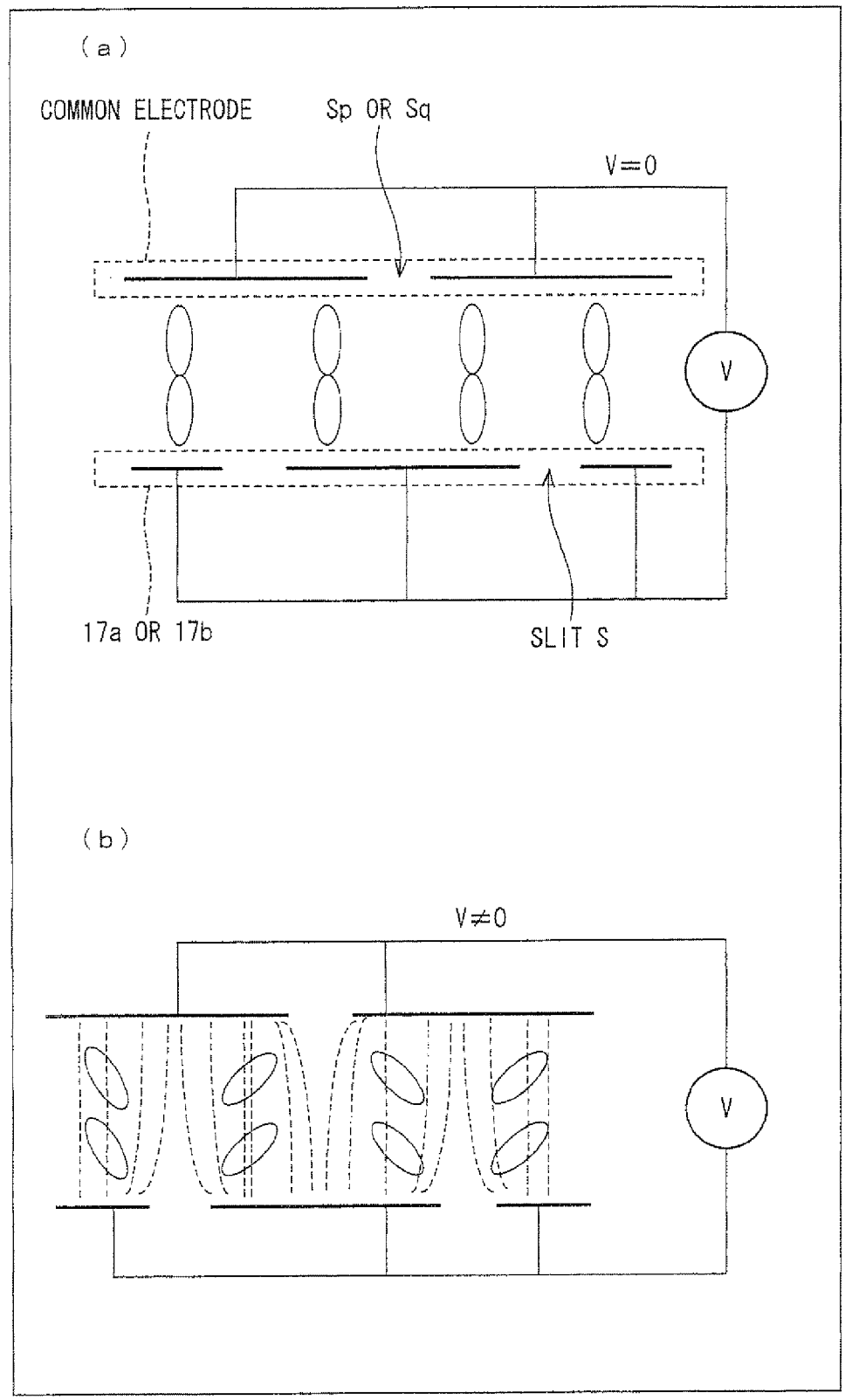
FIGS. 32 (a) and 32 (b) are cross-sectional views illustrating alignment in the present liquid crystal display (a configuration having a slit only as the alignment controlling structure).

Furthermore, the present liquid crystal panel can also be arranged as FIG. 30. In this arrangement, the first and second ribs L1 and L2 in FIG. 8 (a) are replaced with first and second common electrode slits (slits provided on common electrodes) Sp and Sq, respectively. Except for this point, the liquid crystal panel of FIG. 30 is arranged similarly to that of FIG. 8 (a). FIG. 32 (b) is a schematic cross-sectional view when the liquid crystal panel as arranged above is applied to a liquid crystal display. As shown in the drawings, liquid crystal molecules are upright at the time of black display (in a case where a voltage V across the active matrix substrate and the color filter substrate=0). On the other hand, liquid crystal molecules are tilted in different directions with respect to each region partitioned with (i) the first common electrode slit Sp and each slit S formed on the first pixel electrode 17a or (ii) the second common electrode slit Sq and each slit S formed on the second pixel electrode 17b (a dashed line in FIG. 31 (b) shows an electrical flux line). With this, four alignment regions are formed in each of the first and second subpixels (similarly to FIG. 9 (b)).

Figure 10:
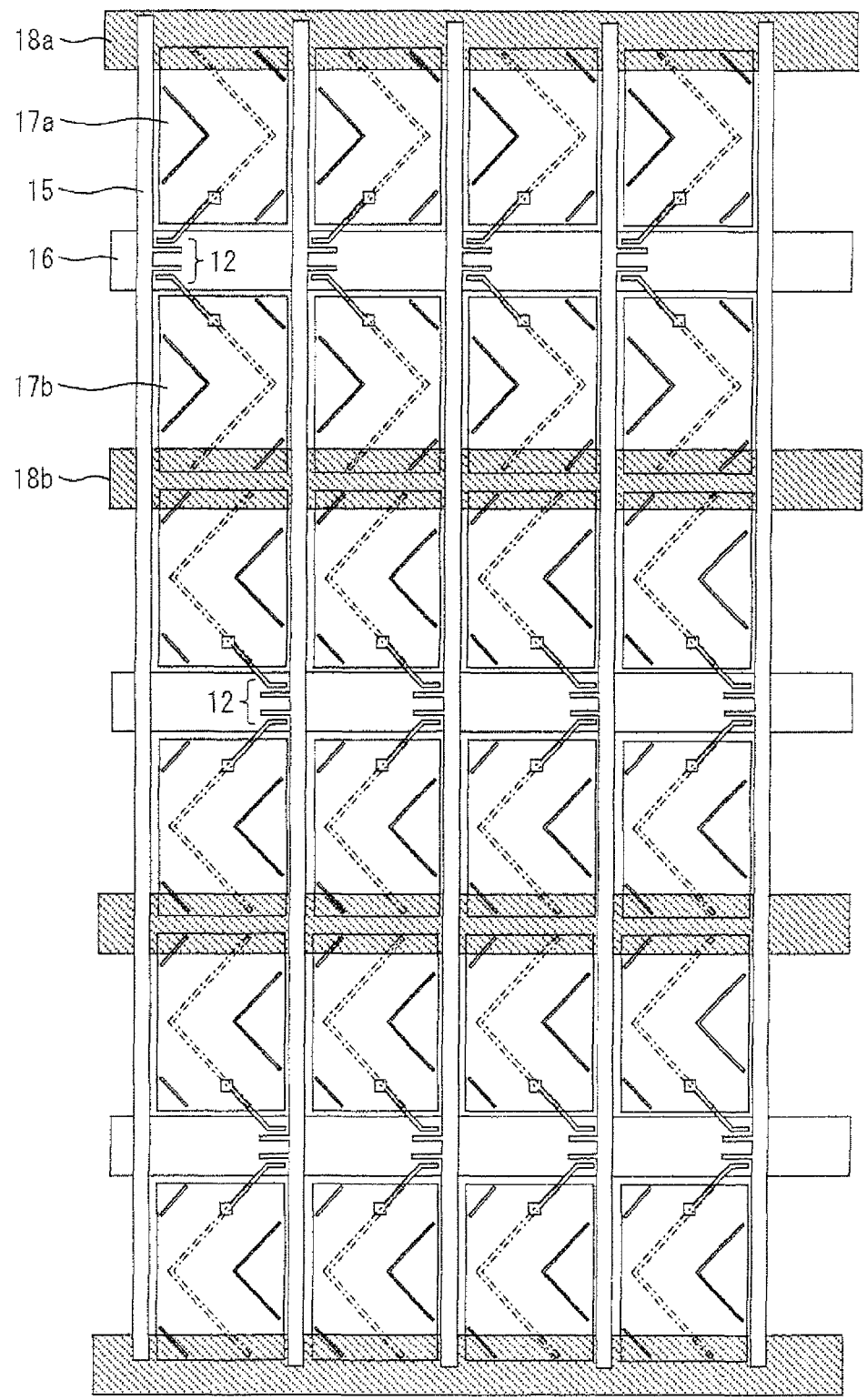
FIG. 10 is a plan view showing another configuration of the liquid crystal panel according to the present embodiment.
Figure 11:
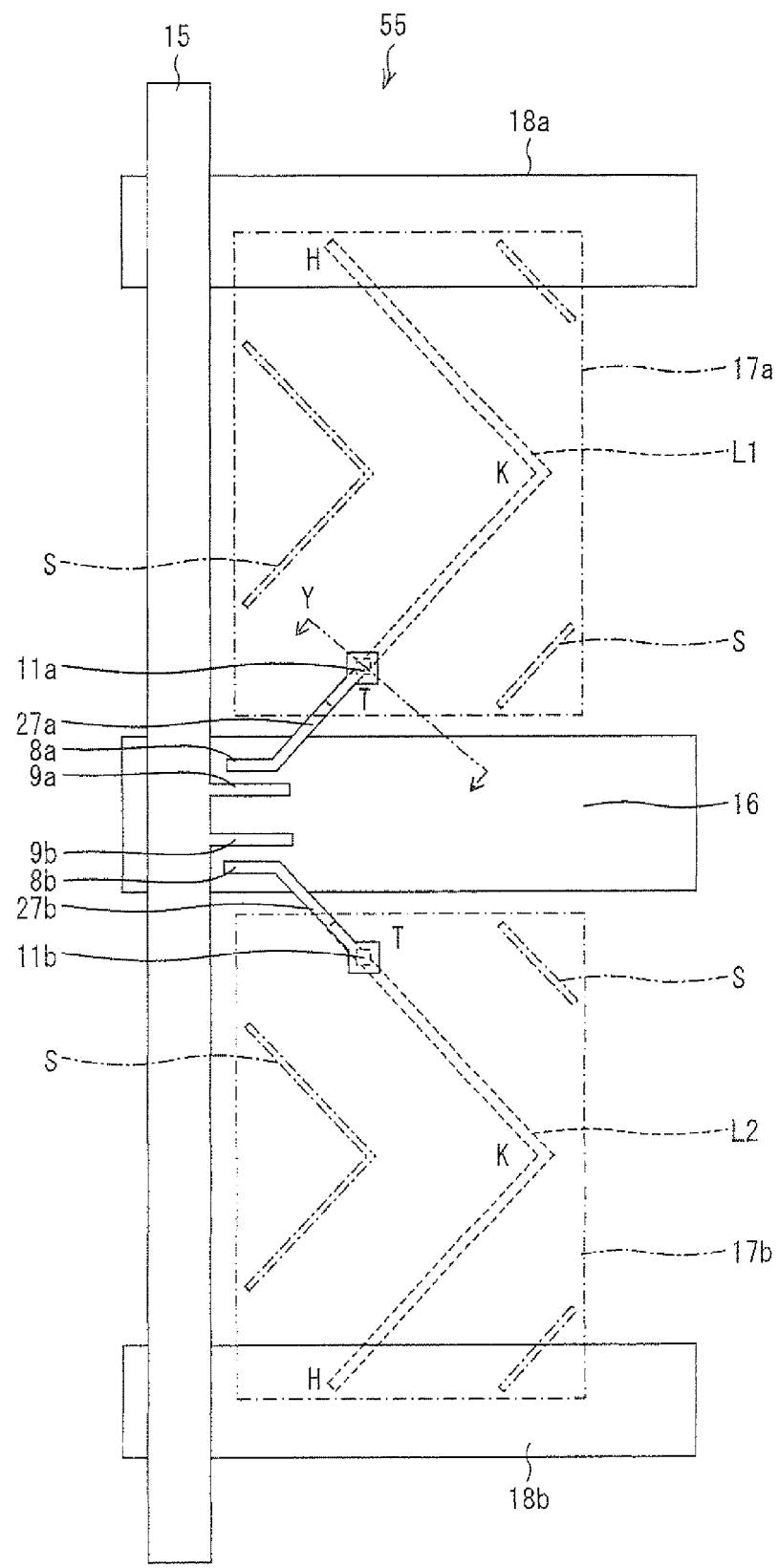
FIG. 11 is an enlarged plan view showing a part of the liquid crystal panel shown in FIG. 10.
Figure 12:
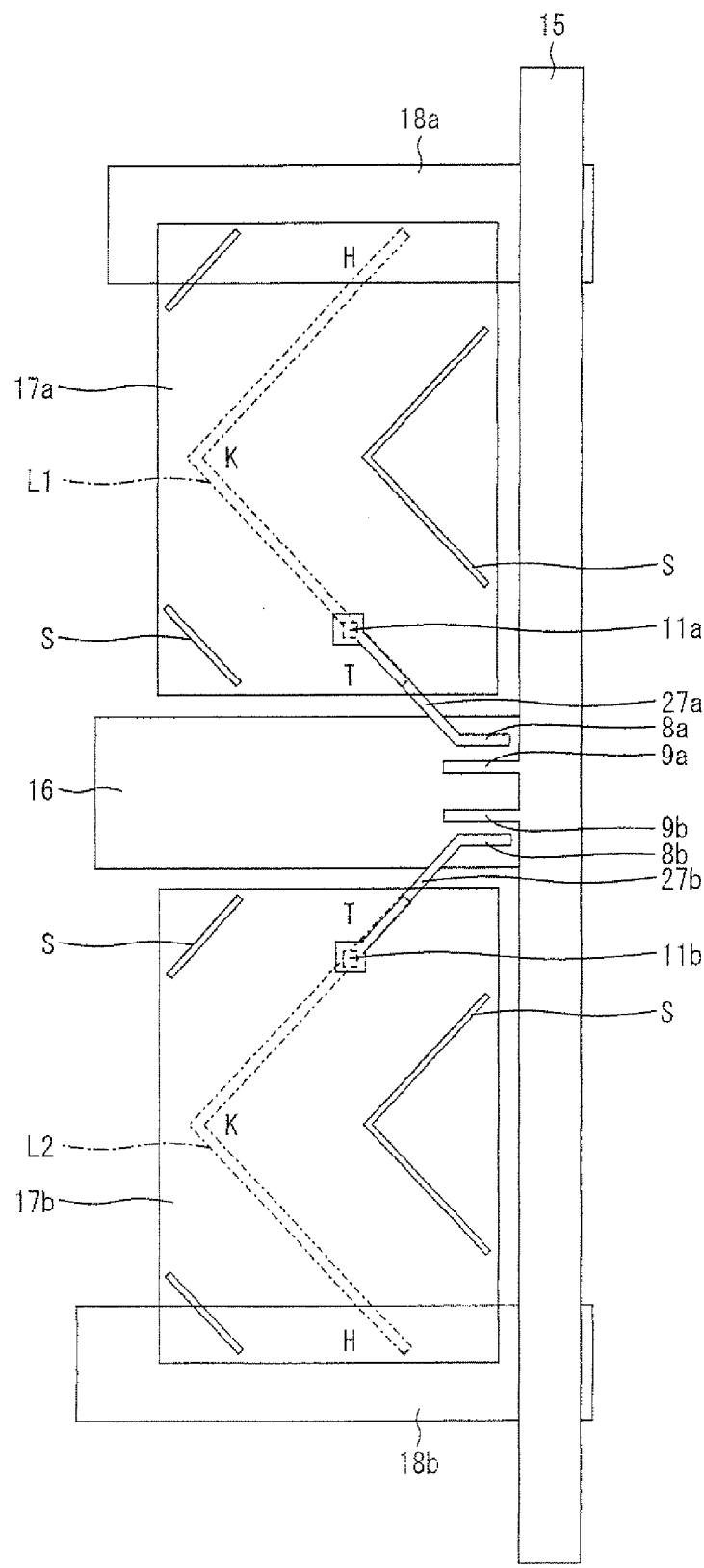
FIG. 12 is an enlarged plan view showing a part of the liquid crystal panel shown in FIG. 10.

As shown in FIG. 10, the present liquid crystal panel may also be arranged such that in each pixel, a rib is directed toward where the switching element 12 is connected. That is, as shown in FIGS. 11 and 12, the ribs L1 and L2 are provided on the pixel 55 which is located between the adjacent data signal lines 15*x* and 15*y* and has the switching element 12 connected to the data signal line 15*x*. The ribs L1 and L2 are arranged such that the start sections T and the termination sections H thereof are closer to the data signal line 15*x* than the bend sections K thereof. With this, most parts of the first and second drain drawing wirings 27*a* and 27*b* can be formed under the first and second ribs L1 and L2, respectively. Therefore, aperture ratio of the pixel 55 can be improved.

Figure 19:
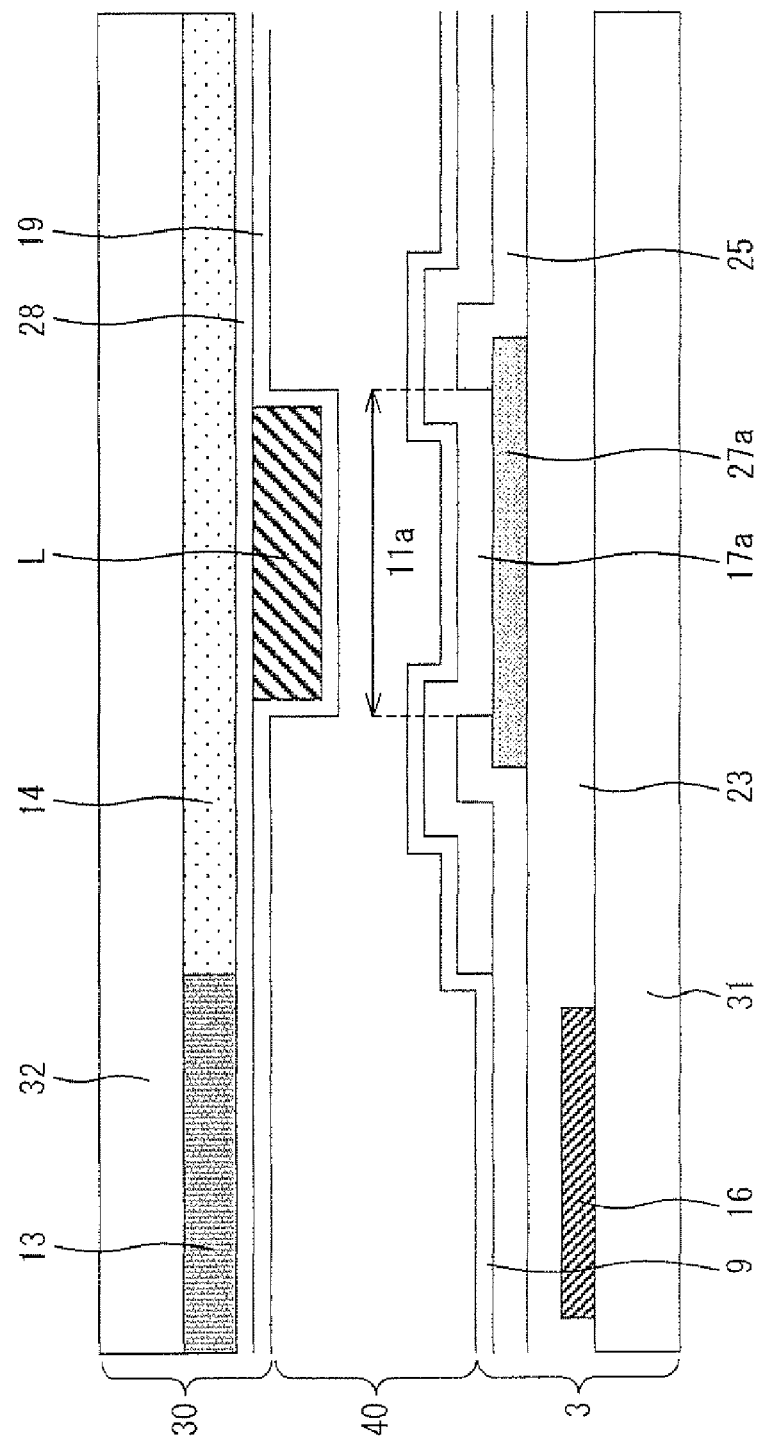
FIG. 19 is a cross-sectional view taken along the line Y of the liquid crystal panel shown in FIG. 11.

FIG. 19 shows a cross-sectional view taken along the line Y of FIG. 11. In an active matrix substrate 3 of the present embodiment, the scanning signal line 16 and a storage capacitor wiring (not illustrated) are formed on a substrate 31. On the scanning signal line 16 and the storage capacitor wiring, the first drain drawing wiring 27*a* is formed via a gate insulating film 23. On the first drain drawing wiring 27*a*, the first pixel electrode 17*a* is formed via an interlayer insulating film 25. Further, an alignment film 9 is formed so as to cover the first pixel electrode 17*a*. In a contact hole 11*a*, the interlayer insulating film 25*a* is removed and the first drain drawing wiring 27*a* and the first pixel electrode 17*a* are connected together. A color filter substrate 30 faces the active matrix substrate 3 via a liquid crystal layer 40. In the color filter substrate 30, on a substrate 32, a color filter 14 positioned to correspond to the pixel electrode 17*a* and a black matrix 13 closing a gap between color filters 14 are formed. On the color filter 14 and the black matrix 13, a counter electrode 28 is formed. A rib L is formed on a part of the counter electrode 28. Moreover, an alignment film 19 is formed so as to cover the counter electrode 28 and the rib L.

Figure 13:
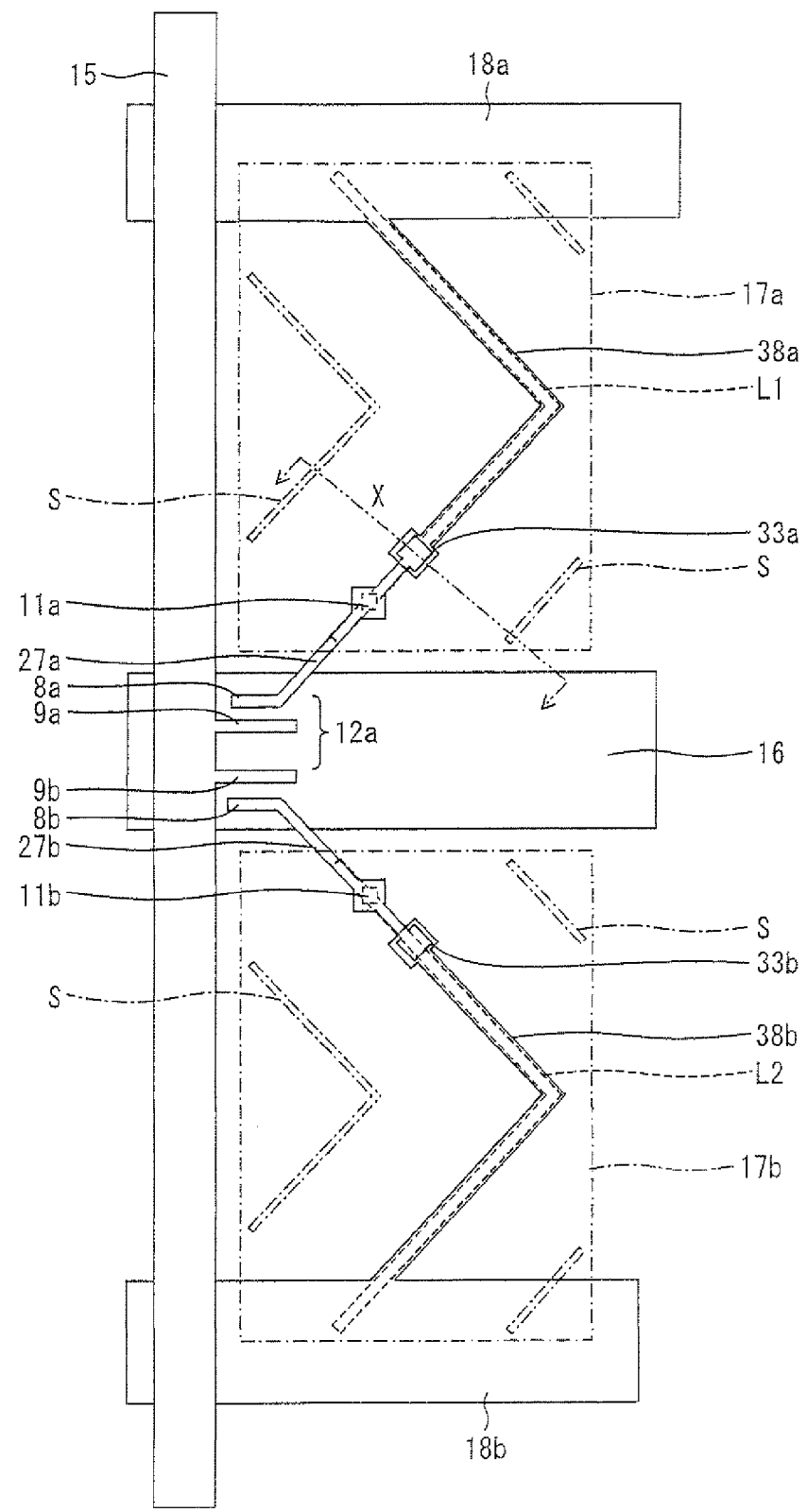
FIG. 13 is a plan view showing another configuration of the present liquid crystal panel.
Figure 18:
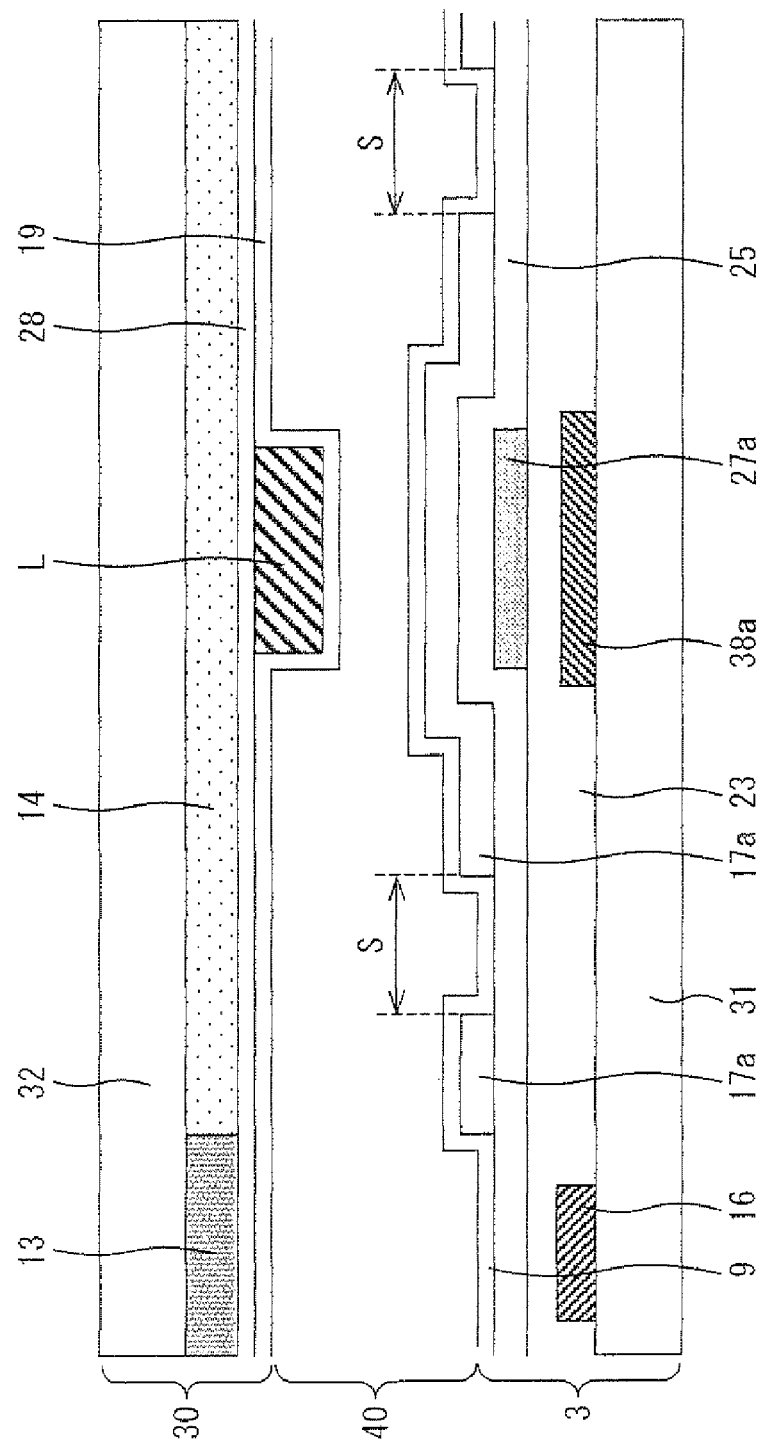
FIG. 18 is a cross-sectional view taken along the line X of the liquid crystal panel shown in FIG. 13.

The present liquid crystal panel may also be arranged as shown in FIG. 13. That is, a first storage capacitor wiring extending section 38*a* extends from the first storage capacitor wiring 18*a* so as to superpose the first pixel electrode 17*a* on the first storage capacitor wiring extending section 38*a*. On the other hand, a second storage capacitor wiring extending section 38*b* extends from the second storage capacitor wiring 18*b* so as to superpose the second pixel electrode 17*b* on the second storage capacitor wiring extending section 38*b*. The first and second storage capacitor wiring extending sections 38*a* and 38*b* superpose the first and second ribs L1 and L2, respectively. Furthermore, the first drain drawing wiring 27*a* has a first superposition section 33*a* to be superposed on the first storage capacitor wiring extending section 38*a*. On the other hand, the second drain drawing wiring 27*b* has a second superposition section 33*b* to be superposed on the second storage capacitor wiring extending section 38*b*. Moreover, most parts of the first and second drain drawing wirings 27*a* and 27*b* are formed under the first and second ribs L1 and L2, respectively. FIG. 18 shows a cross-sectional view taken along the line x of FIG. 13. In the present active matrix substrate 3, the scanning signal line 16 and the first storage capacitor wiring extending section 38*a* are formed on the substrate 31. On the scanning signal line 16 and the first storage capacitor wiring extending section 38*a*, the first drain drawing wiring 27*a* is formed via the gate insulating film 23. On the first drain drawing wiring 27*a*, the first pixel electrode 17*a* is formed via the interlayer insulating film 25. Further, the alignment film 9 is formed so as to cover the first pixel electrode 17*a*. The color filter substrate 30 faces the active matrix substrate 3 via the liquid crystal layer 40. In the color filter substrate 30, on the substrate 32, the color filter 14 positioned to correspond to the pixel electrode 17*a* and the black matrix 13 closing a gap between color filters 14 are formed. On the color filter 14 and the black matrix 13, the counter electrode 28 is formed. The rib L is formed on the part of the counter electrode 28. Moreover, the alignment film 19 is formed so as to cover the counter electrode 28 and the rib L. Under the rib L, a part of the first drain drawing wiring 27*a* (the first superposition section) is superposed on a part of the first storage capacitor wiring extending section 38*a* via the gate insulating film 23.

With this, for example, in a case where the first transistor 12*a* malfunctions, the first storage capacitor wiring extending section 38*a* and the first drain drawing wiring 27*a* can be connected together by penetrating the insulating film under the first superposition section 33*a*. On the other hand, the drain drawing wiring 27*a* can be disconnected between the first contact hole 11*a* and the first drain electrode 8*a*. With this, the first pixel electrode 17*a* which is present in a defective pixel and the first storage capacitor wiring 18*a* can be connected together via the first storage capacitor wiring extending section 38*a*. This makes it possible to reduce a potential of the first pixel electrode 17*a* to a potential of the first storage capacitor wiring 18*a*. As a result, in a normally-black liquid crystal display, a defective pixel in which malfunction has occurred can be less noticeable by changing the defective pixel into a black dot.

Figure 14:
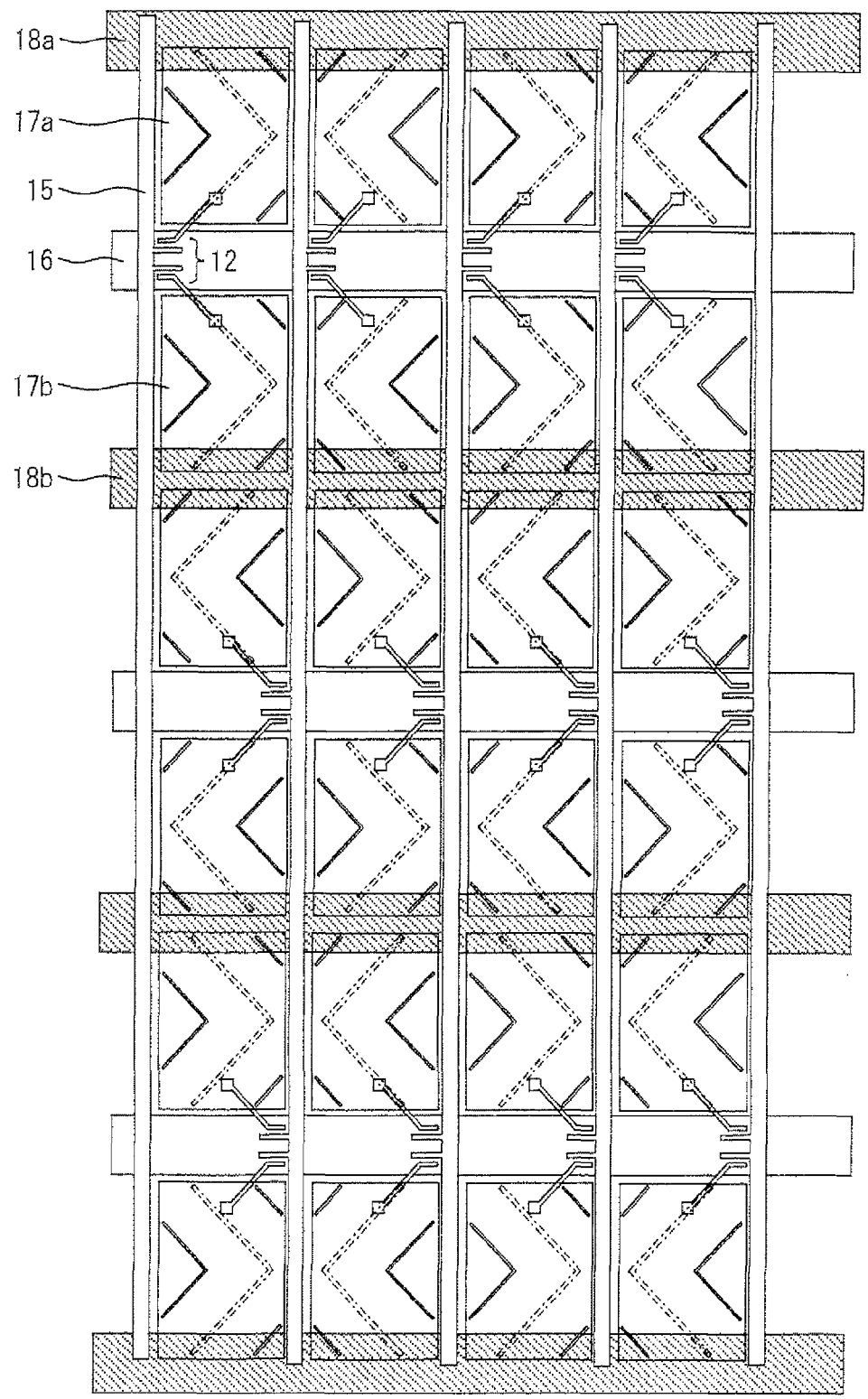
FIG. 14 is a plan view showing another configuration of the present liquid crystal panel.
Figure 15:
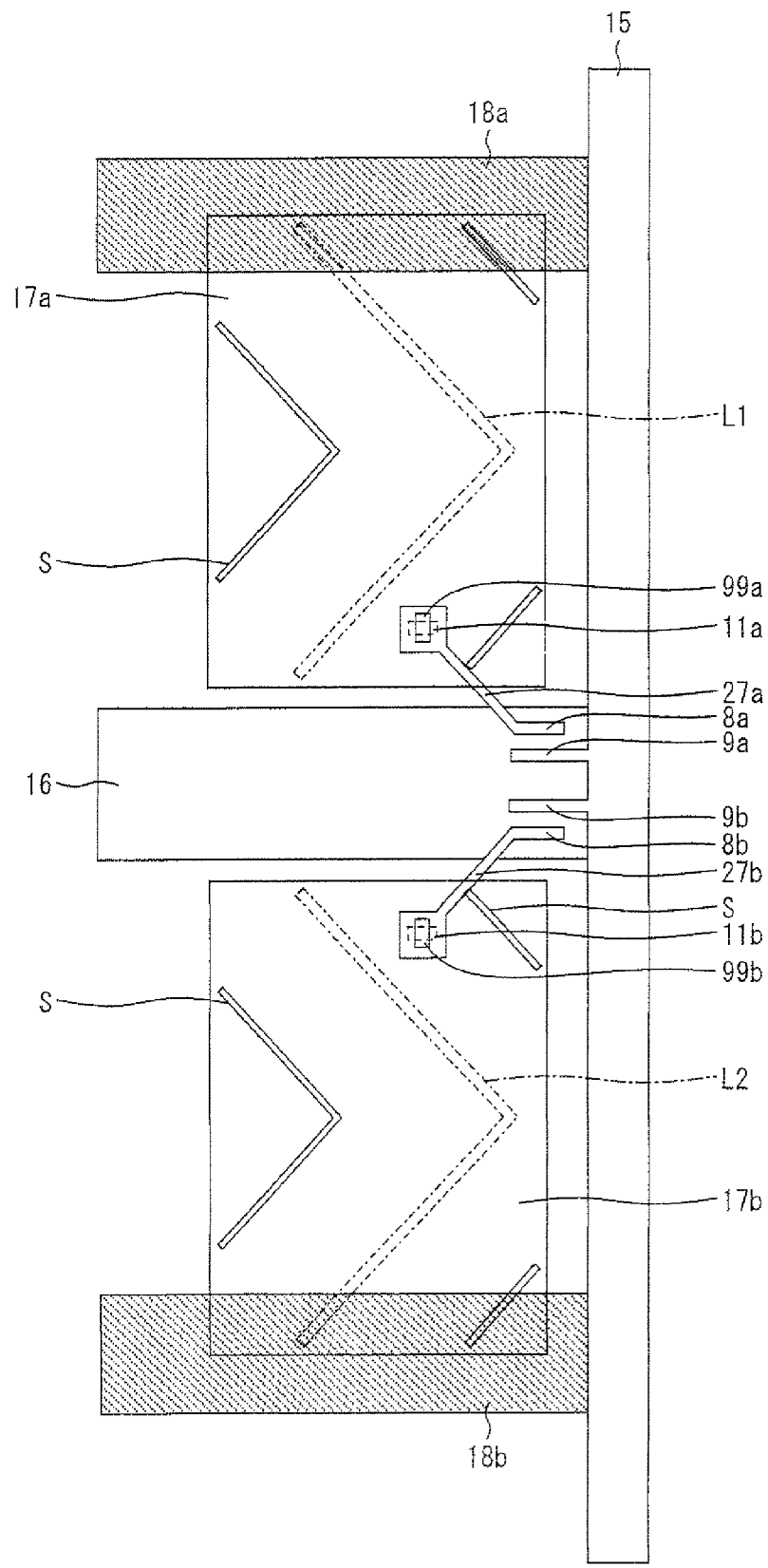
FIG. 15 is a plan view showing another configuration of the present liquid crystal panel.

The liquid crystal panel shown in FIG. 10 can also be modified as shown in FIG. 14. That is, the ribs are reversely provided with respect to each pixel for the column direction (up and down direction in the drawing), without the need of changing a shape of each switching element 12. In this case, a pixel in which the rib is directed toward where the switching element 12 is connected is as shown in FIG. 11. On the other hand, a pixel in which the rib is not directed toward where the switching element 12 is connected is as shown in FIG. 15. In this case, the drain drawing wirings 27*a* and 27*b* and the contact holes 11*a* and 11*b* are positioned where no rib and slit are provided thereon and thereunder. Then as shown in FIG. 15, a hollow 99*a* or 99*b* intersecting with corresponding one of the contact holes 11*a* and 11*b* is formed on corresponding one of the drain drawing wirings 27*a* and 27*b*. With this, aperture ratio can be improved. Moreover, there is another advantage. Since the contact hole and the hollow intersect with each other, an area of contact is unlikely to be reduced even if random alignment occurs.

Figure 16:
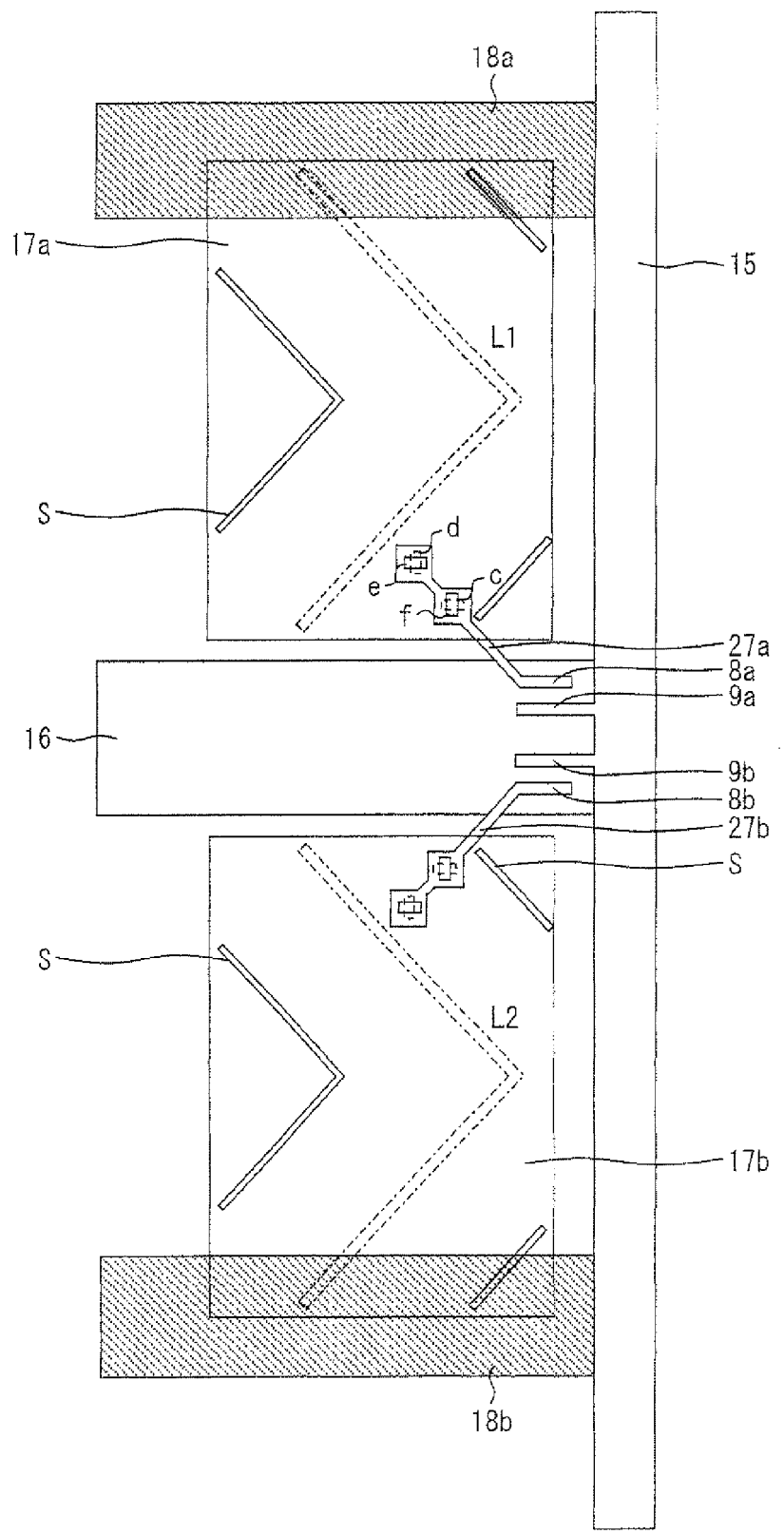
FIG. 16 is a plan view showing another configuration of the present liquid crystal panel.

The present liquid crystal panel may also be arranged as shown in FIG. 16. That is, two contact holes c and d are formed on the drain drawing wiring 27*a*. Furthermore, a extended hollow e or f intersecting at right angles to corresponding one of the contact holes c and d is formed on the drain drawing wiring 27*a*. It should be noted that one and the other of the hollows extend in the column and row directions, respectively. With this, such an effect that an area of contact is unlikely to be reduced can be achieved even if random alignment occurs.

Figure 17:
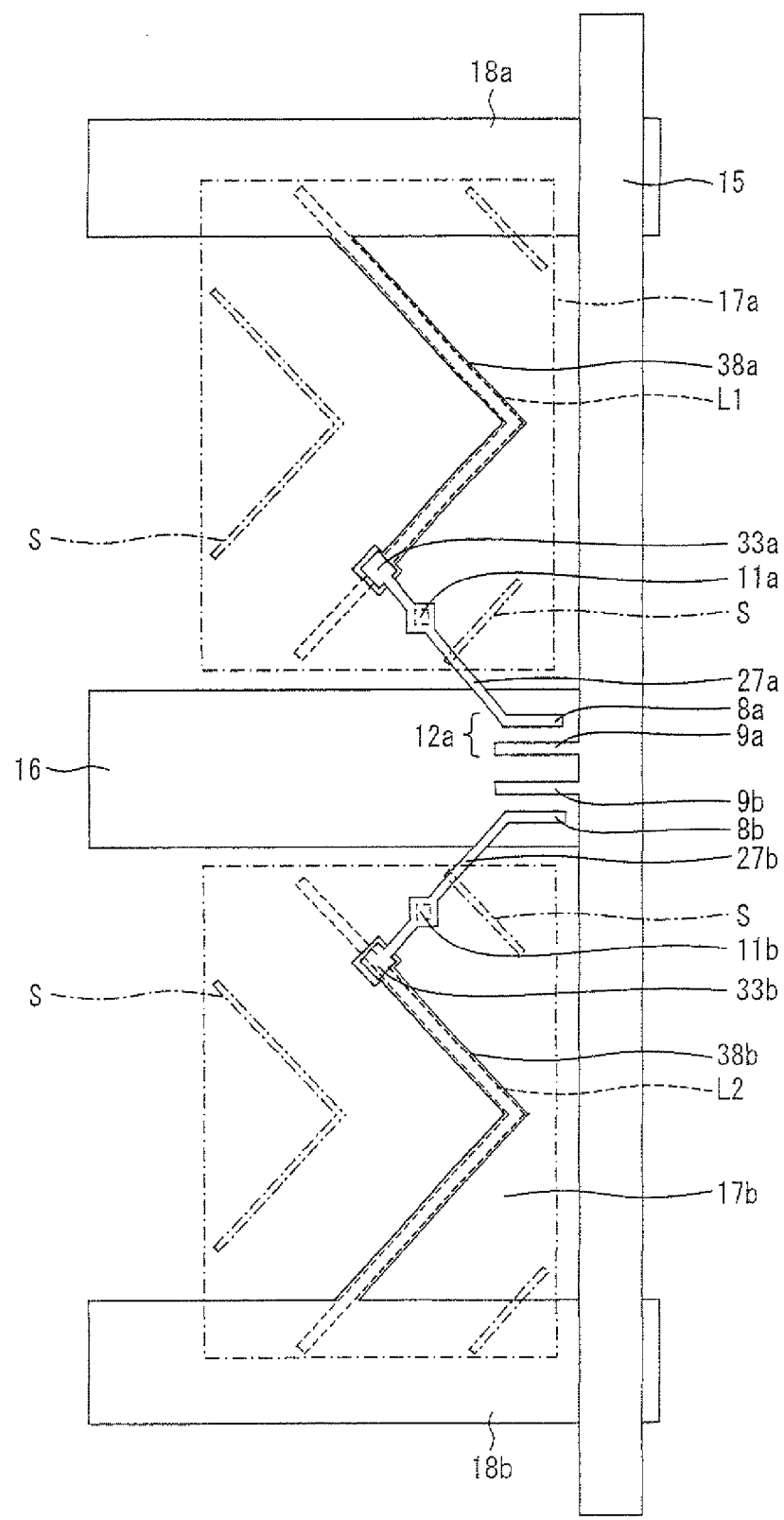
FIG. 17 is a plan view showing another configuration of the present liquid crystal panel.

Moreover, the present liquid crystal panel can be arranged as shown in FIG. 17. That is, the first storage capacitor wiring extending section 38*a* extends from the first storage capacitor wiring 18*a* so as to superpose the first pixel electrode 17*a* on the first storage capacitor wiring extending section 38*a*. On the other hand, the second storage capacitor wiring extending section 38*b* extends from the second storage capacitor wiring 18*b* so as to superpose the second pixel electrode 17*b* on the second storage capacitor wiring extending section 38*b*. The first and second storage capacitor wiring extending sections 38*a* and 38*b* superpose the first and second ribs L1 and L2, respectively. Furthermore, the first drain drawing wiring 27*a* has the first superposition section 33*a* to be superposed on the first storage capacitor wiring extending section 38*a*. On the other hand, the second drain drawing wiring 27*b* has the second superposition section 33*b* to be superposed on the second storage capacitor wiring extending section 38*b*. Here, the first drain drawing wiring 27*a* has, between the second drain electrode 8a and the first contact hole 11a, a part on which the slit S is superposed. On the other hand, the second drain drawing wiring 27b has, between the second drain electrode 8b and the second contact hole 11b, a part on which the slit S is superposed.

With this, for example, in a case where the first transistor 12a malfunctions, the first storage capacitor wiring extending section 38 and the first drain drawing wiring 27a can be connected together by penetrating the insulating film under the first superposition section 33a. On the other hand, the drain drawing wiring 27a can be disconnected between the first contact hole 11a and the first drain electrode 8a (under the slit S) where no pixel electrode is provided. This makes the disconnection process easy.

Figure 28:
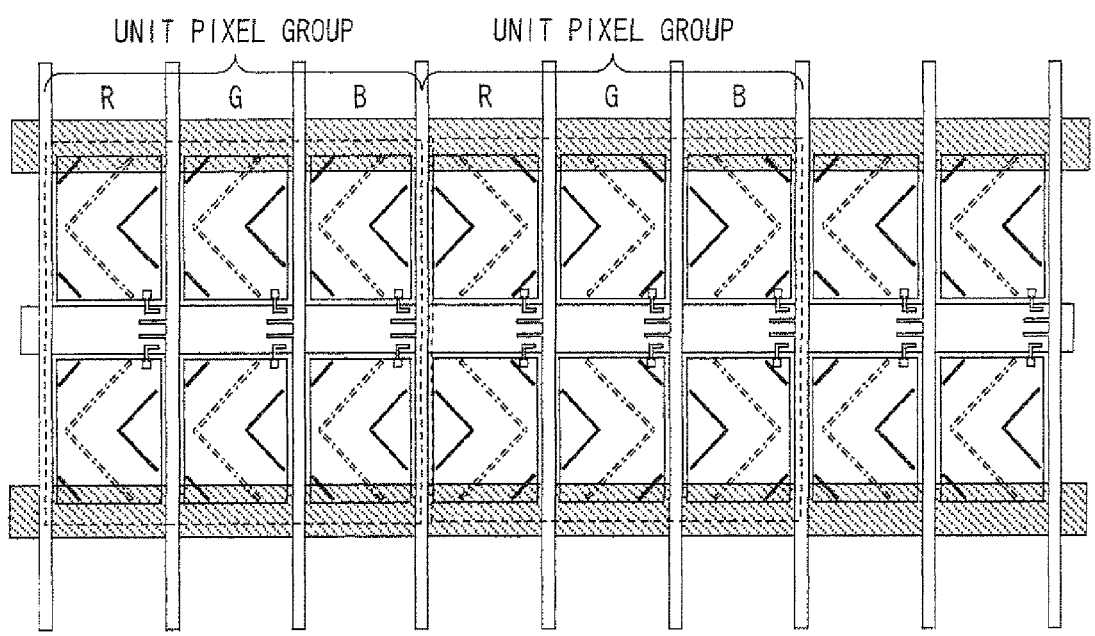
FIG. 28 is a plan view showing another configuration of the present liquid crystal panel.

Furthermore, the present liquid crystal panel may also be arranged as shown in FIG. 28. That is, three pixels which correspond to red (R), green (G), and (B) and are disposed in the row direction are referred to as one pixel region group. For two pixel regions of the same color which are included in two pixel region groups adjacent in the row direction, each rib provided on one of the two pixel regions has a shape which is obtained by rotating by 180° each rib provided on the other of the two pixel regions. With this, in a liquid crystal display including the present liquid panel, for a pixel (two-pixel) unit of the same color, influence of the part of random alignment along the scanning signal line 16 is diluted over the alignment regions. This makes it possible not to cause a large difference to viewing angle characteristic in each direction.

The following explains one embodiment of a method for producing an active matrix substrate.

First, on a transparent insulating substrate of glass, plastic, or the like, (i) a metal film of titanium, chromium, aluminum, molybdenum, tantalum, tungsten, copper, or the like, (ii) an alloy film of these metals, or (iii) a laminated film in which the metal film or the alloy film is included is formed, by a method, such as a sputtering technique, so as to have a thickness of 1000 to 3000 Å. Such a film is patterned by a photo-etching technique so as to be in the shape as required and thereby a scanning signal line (also serving as a gate electrode of each transistor) and a storage capacitor wiring are formed.

Next, (i) a silicon nitride film (SiNx) serving as a gate insulating film, (ii) a high-resistance semiconductor layer of amorphous silicon, polysilicon, or the like, and (iii) a low-resistance semiconductor layer of n+amorphous silicon or the like are sequentially formed by a plasma CVD (chemical vapor phase deposition) technique or the like. (i) to (iii) are patterned by the photo-etching technique. Moreover, thicknesses of (i) the silicon nitride film as the gate insulating film, (ii) the amorphous silicon film as the high-resistance semiconductor layer, and (iii) the n+amorphous silicon film as the low-resistance semiconductor layer are about: 3000 to 5000 Å, 1000 to 3000 Å, and 400 to 700 Å, respectively, for example.

Subsequently, (i) a metal film of titanium, chromium, aluminum, molybdenum, tantalum, tungsten, copper, or the like, (ii) an alloy film of these metals, or (iii) a laminated film in which the metal film or the alloy film is included is formed, by a method, such as the sputtering technique, so as to have a thickness of 1000 to 3000 Å. Such a film is patterned by the photo-etching technique or the like so as to be in the shape as required and thereby a data signal line, a source electrode, a drain electrode, and a drain drawing wiring are formed.

Then, on the high-resistance semiconductor layer (i layer) of the amorphous silicon film or the like and the low-resistance semiconductor layer (n+layer) of the n+amorphous silicon film or the like, channel etching is performed by dry etching by making the data signal line, the source electrode, the drain electrode, and the drain drawing wiring in a mask pattern. With this process, a thickness of the i layer is optimized and each transistor (channel region) is formed. Here, a semiconductor layer which is not covered with the data signal line, the source electrode, the drain electrode, and the drain drawing wiring is removed by etching and a thickness of the i layer which thickness is necessary for the capability of each transistor is left.

Next, as an interlayer insulating film, (i) a photosensitive acrylic resin film, (ii) an inorganic insulating film of silicon nitride, oxide silicon, or the like, (iii) a laminated film of the photosensitive acrylic resin film and the inorganic insulating film, or (iv) the like is formed so as to cover each transistor (channel region), the data signal line, the source electrode, the drain electrode, and the drain drawing wiring. Here, (i) the silicon nitride film which has been formed by the plasma CVD technique or the like and has a thickness of about 2000 to 5000 Å, (ii) the photosensitive acrylic resin film which has been formed by a spin coat technique and has a thickness of 20000 to 40000 Å, or (iii) a laminated film of the silicon nitride film and the photosensitive acrylic resin film can be applied. In the present active matrix substrate, a silicon nitride film is formed as the interlayer insulating film (a passivation film). Furthermore, a polyimide resin film, a nonphotosensitive resin film, or a spin-on glass (SOG) film can also be applied as the interlayer insulating film.

Subsequently, a hole is formed by etching the interlayer insulating film in accordance with a position of a contact hole. Here, photosensitive resist is patterned by a photolithography technique (exposure and development) and the photosensitive resist is etched.

Then, on the interlayer insulating film, a transparent conductive film of ITO (indium tin oxide), IZO, zinc oxide, tin oxide, or the like is formed so as to have a thickness of about 1000 to 2000 Å by the sputtering technique or the like. The transparent conductive film is patterned by the photo-etching technique so as to be in the shape as required and thereby each pixel electrode is formed. In an active matrix substrate applied to an MVA liquid crystal panel, each pixel electrode is formed so as to include a slit or the like.

Next, an alignment film is applied by the ink-jet technique or the like. According to the above steps, an active matrix substrate is formed.

The following explains a method for filling liquid crystal between an active matrix substrate and a color filter substrate which is a counter substrate, and the like.

Liquid crystal may be filled by such a method (vacuum filling method) that: thermosetting sealing resin is provided with an inlet through which liquid crystal is filled; the inlet is soaked with liquid crystal in a vacuum; the liquid crystal is filled by releasing air; and thereafter the inlet is sealed with UV cure resin. Moreover, liquid crystal may also be filled by a one drop filling process as described below.

UV cure sealing resin including spacer, such as fiberglass is applied on the circumference of the active matrix substrate and liquid crystal is dropped on the color filter substrate by the one drop process. With the one drop process, a suitable amount of liquid crystal can be regularly dropped in an inner part of the seal. The drop amount is determined by a cell gap value and a value of volume of a cell in which liquid crystal needs to be filled.

Subsequently, in order to combine the color filter substrate and the active matrix substrate, each of which was subjected to seal patterning or one drop as mentioned above, atmosphere in a combining device is decompressed to 1 Pa. Under such a decompressed state, the substrates are combined together. In this way, by making atmosphere to atmospheric pressure, a sealed part is crushed.

Then UV is irradiated by a UV cure device so as to temporarily cure the sealing resin. Next, the sealing resin is baked so as to be finally cured. At this point, liquid crystal is spread inside the sealing resin and the liquid crystal is filled in a cell.

On the color filter substrate, (i) colored layers (R, G, and B) disposed in a matrix pattern so as to correspond to each pixel of the active matrix substrate, (ii) a black matrix provided in a gap between the colored layers, (iii) a counter electrode (common electrode), and (iv) the like are formed. By combining such a color filter substrate with the present active matrix substrate, and dropping and sealing liquid crystal as mentioned above, the present liquid crystal panel is formed.

In the present embodiment, the present liquid crystal display unit and liquid crystal display are arranged as below.

Figure 23:
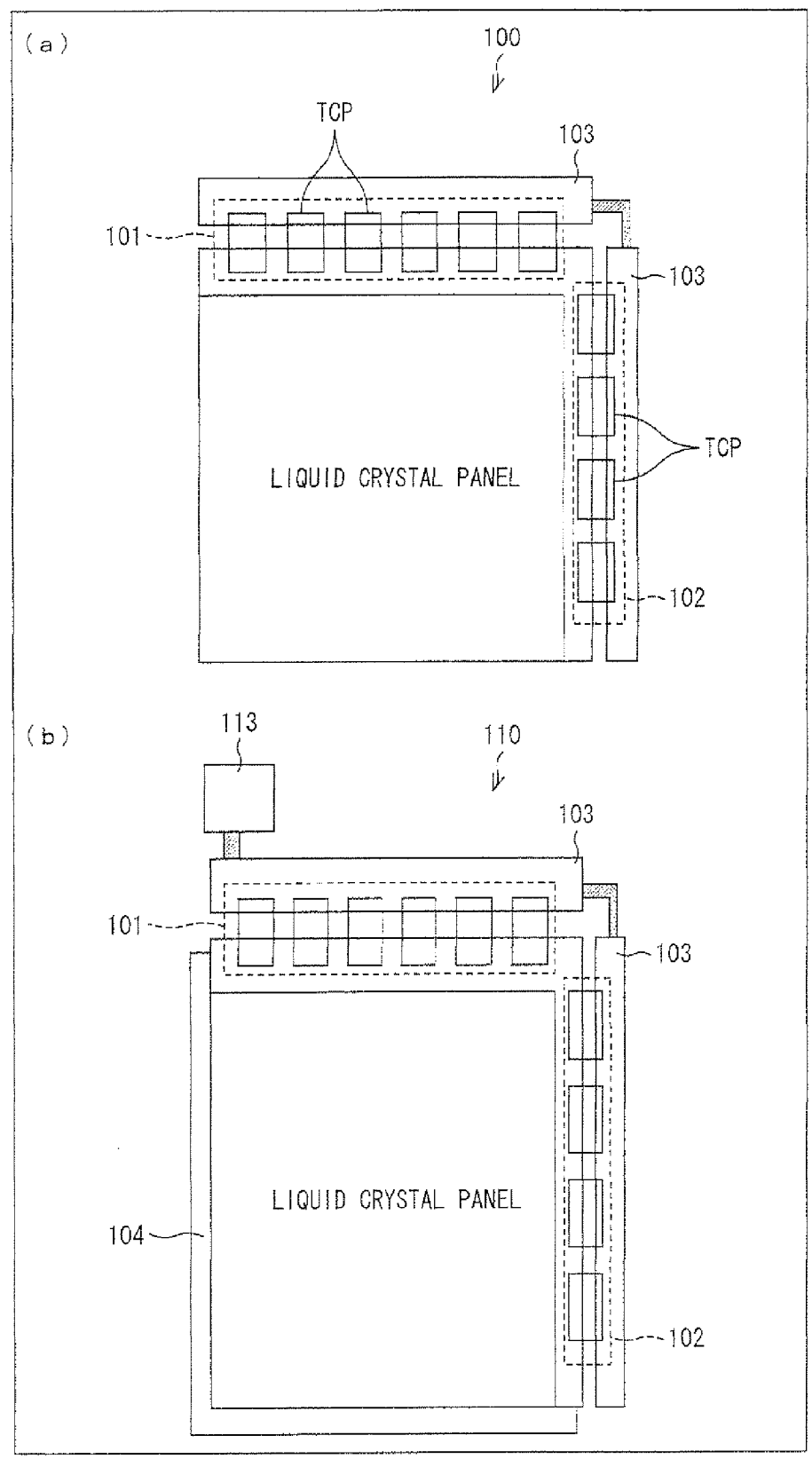
FIG. 23 (a) is a schematic view showing a configuration of a liquid crystal display unit of the present invention.
Figure 27:
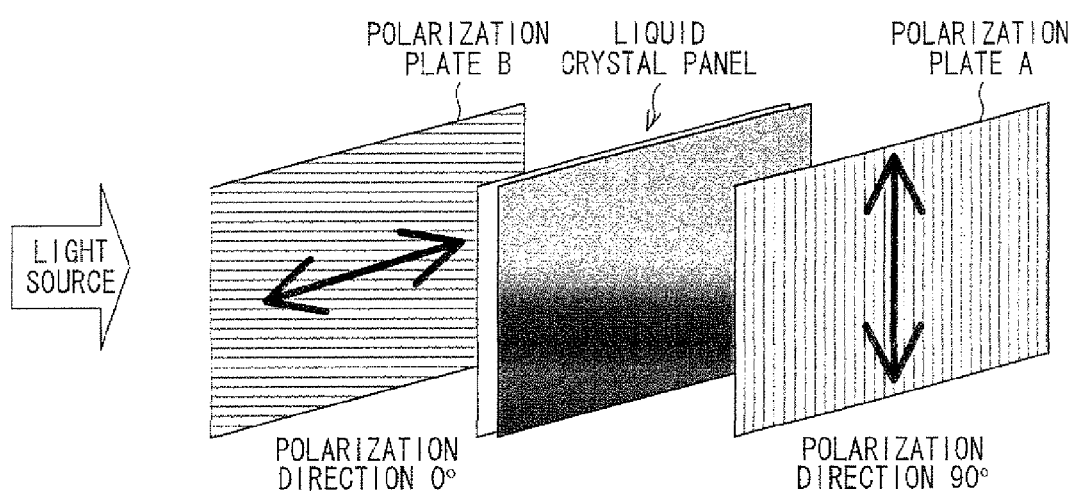
FIG. 27 is a schematic view showing how to attach polarization plates to the present liquid crystal panel.

That is, as shown in FIG. 27, to either side of a liquid crystal panel, two polarization plates A and B are combined so that polarization axes of the polarization plates A and B intersect at right angles to each other. Furthermore, an optical compensation sheet or the like may be laminated on the polarization plate if necessary. Next, as shown in FIG. 23 (a), drivers (a gate driver 102 and a source driver 101) are connected. Here, as one example, connection by a TCP (Tape Career Package) method is explained. First, ACF (Anisotoropic Conductive Film) is temporarily pressed on a terminal section of the liquid crystal panel. Next, TCP in which the drivers are loaded is removed from a carrier tape. TCP is positioned with respect to a panel terminal electrode, heated and finally pressed. Thereafter, a circuit substrate 103 (PWB: Printed wiring board) for connecting the drivers TCP together and an input terminal of TCP are connected together with ACF. With this, a liquid crystal display unit 100 is completed.

Thereafter, as shown in FIG. 23 (b), a display control circuit 113 is connected to the drivers (101 and 102) of the liquid crystal display unit via the circuit board 103. By integrating the liquid crystal display unit and the display control circuit 113 with an illumination device (backlight unit) 104, a liquid crystal display 110 is completed.

Figure 21:
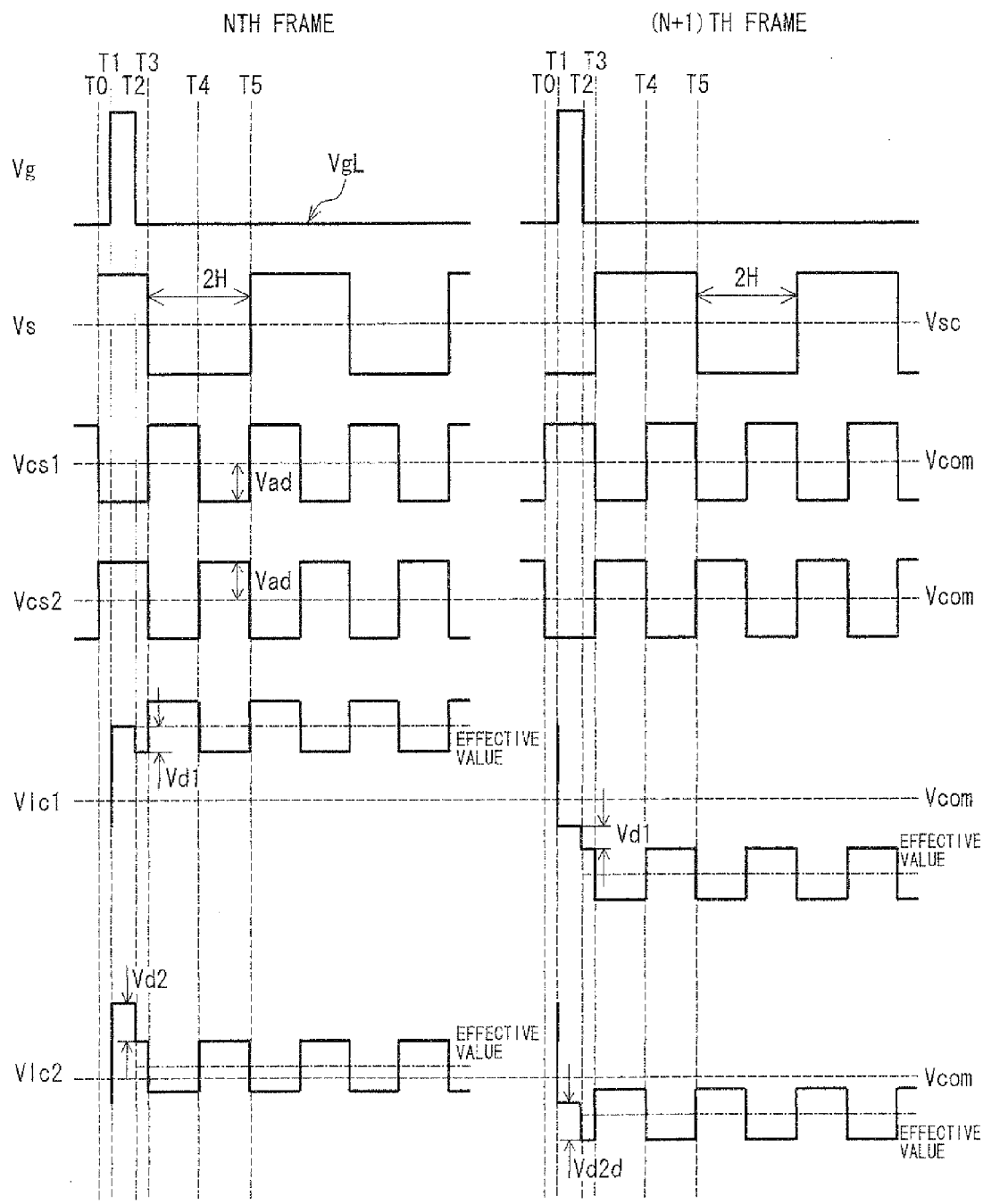
FIG. 21 is a timing chart showing the method for driving the present liquid crystal display.

FIG. 21 is a timing chart showing operation of each section in the present liquid crystal display. Here, a case where the data signal line 15 is operated by the 2H/1V inversion driving is shown. It should be noted that Vg, Vs, Vcs1, Vcs2, Vlc1, and Vlc2 are voltages of: the scanning line 16, the data line 15 (source voltage), the first storage capacitor wiring 18a, the second storage capacitor wiring 18b, the first pixel electrode 17a, and the second pixel electrode 17b, respectively. Moreover, each of the voltages of the first and second storage capacitor wirings 18a and 18b is modulated with an amplitude voltage Vad and their phases are shifted by 180°. That is, just after Vg is L at T2 (the TFTs 12a and 12b are off), Vcs1 and Vcs2 are controlled to be H and L, respectively.

Figure 22:
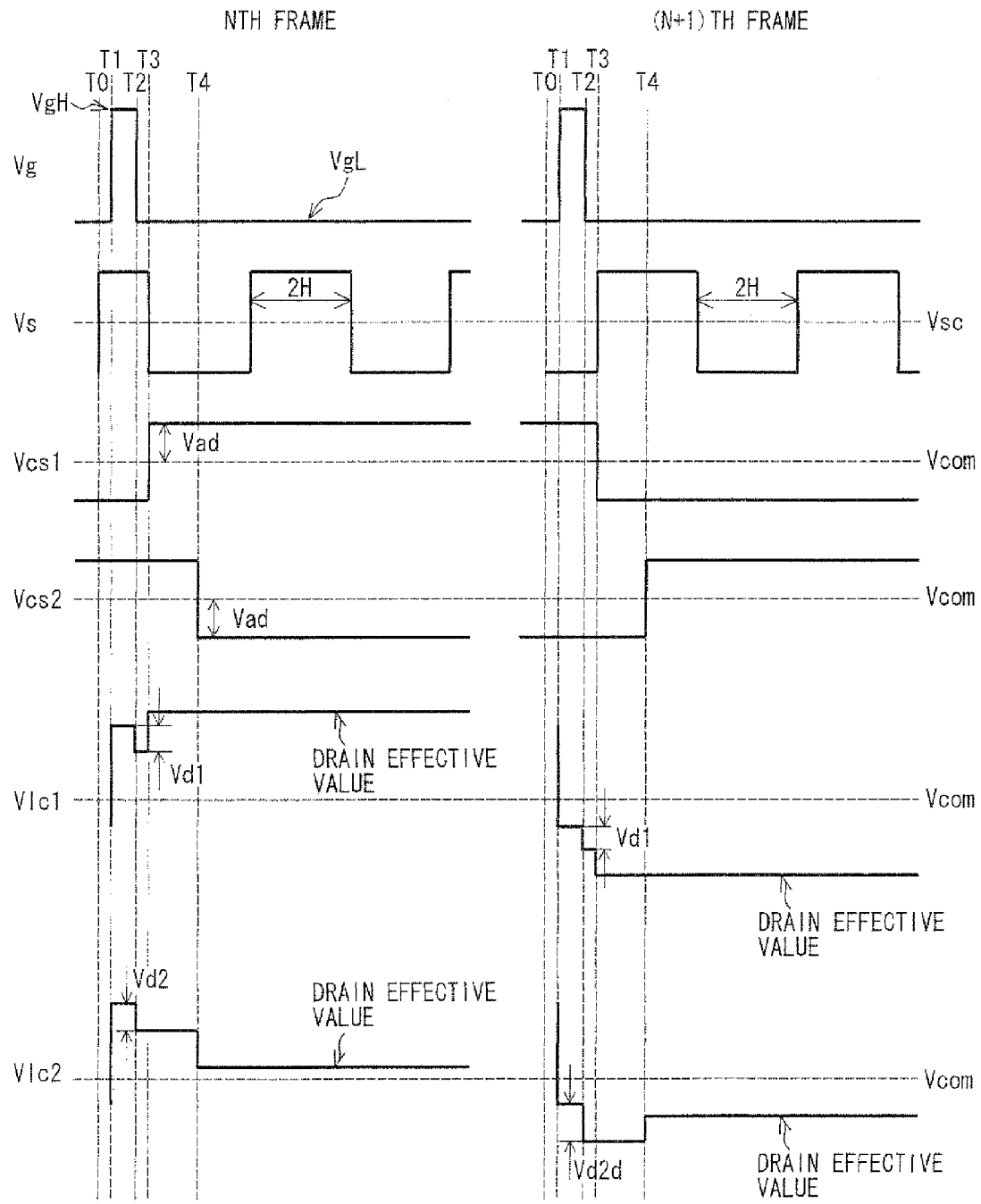
FIG. 22 is a timing chart showing the another method for driving the present liquid crystal display.

Furthermore, as shown in FIG. 22, Vcs1 can be waveform remaining High (or Low) at T3 just after Vg is L at T2 (the TFTs 12a and 12b are off) and Vcs2 can also be waveform remaining Low (or High) at T4 after one horizontal period (1H) from T3. That is, potentials are controlled in such a manner of: increasing Vcs1 after each transistor is off and maintaining the rise state in the frame, and decreasing Vcs2 after 1H period from the rise of Vcs1 and maintaining the fall state in the frame; or decreasing Vcs1 after each transistor is off and maintaining the fall state in the frame, and increasing Vcs2 after 1H period from the fall of Vcs1 and maintaining the rise state in the frame. With this, waveform distortion of Vcs1 and Vcs2 has less influence on drain effective potential and thus this is effective in reducing uneven luminance.

Figure 33:
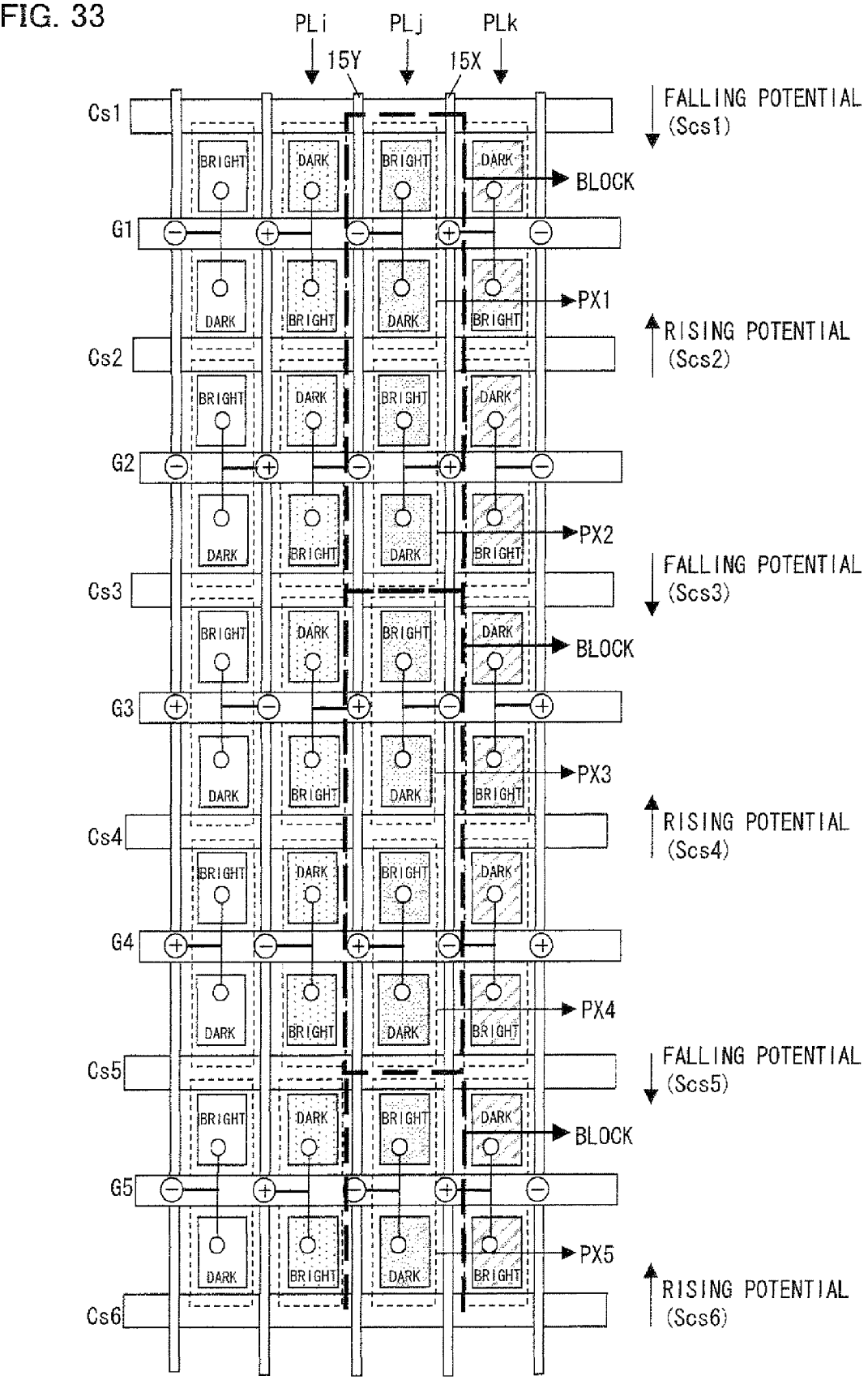
FIG. 33 is a schematic view showing a relationship of connection of a pixel to a data signal line, and the method for driving the present liquid crystal display.
Figure 34:
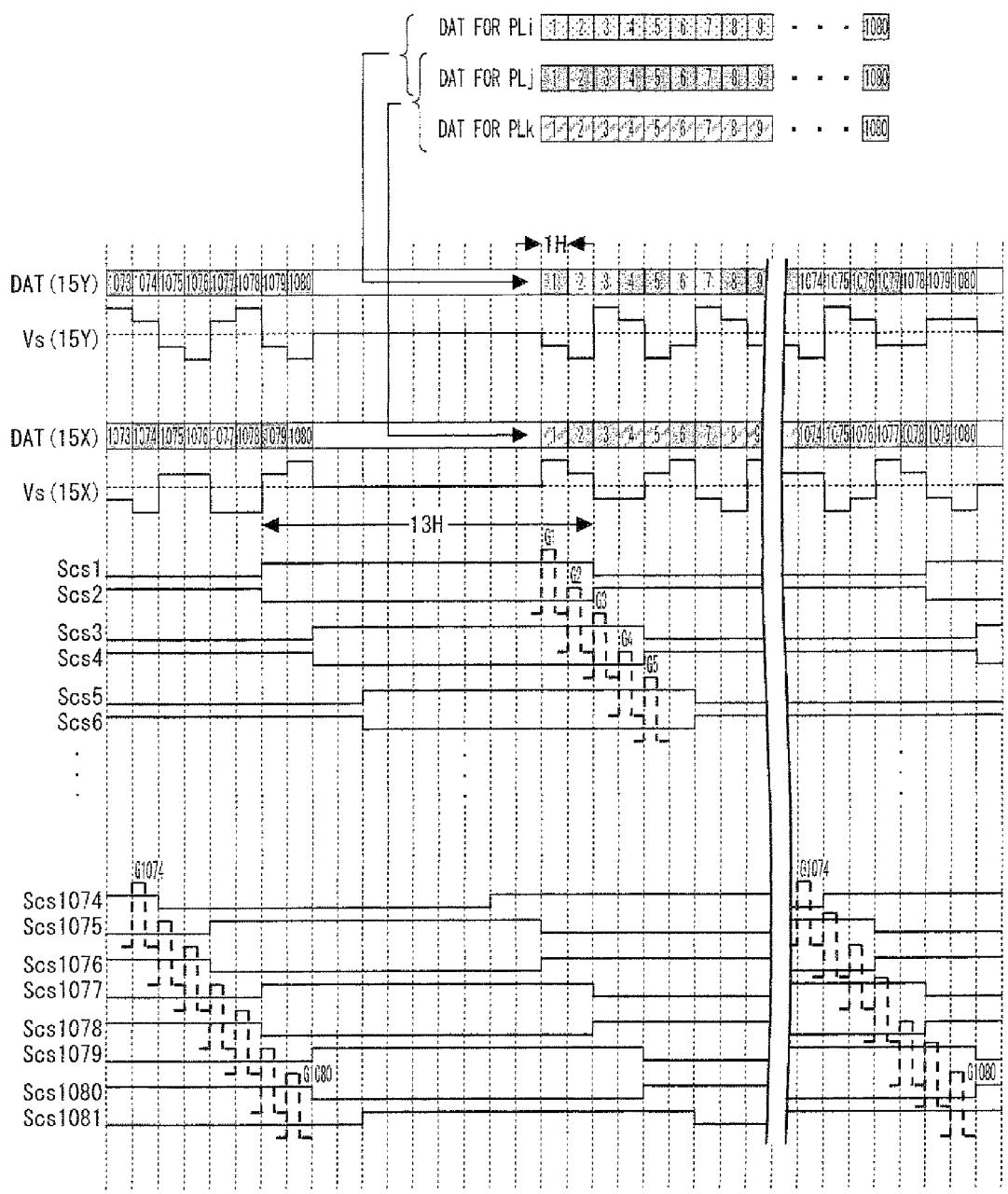
FIG. 34 is a timing chart showing the method for driving the present liquid crystal display.
Figure 35:
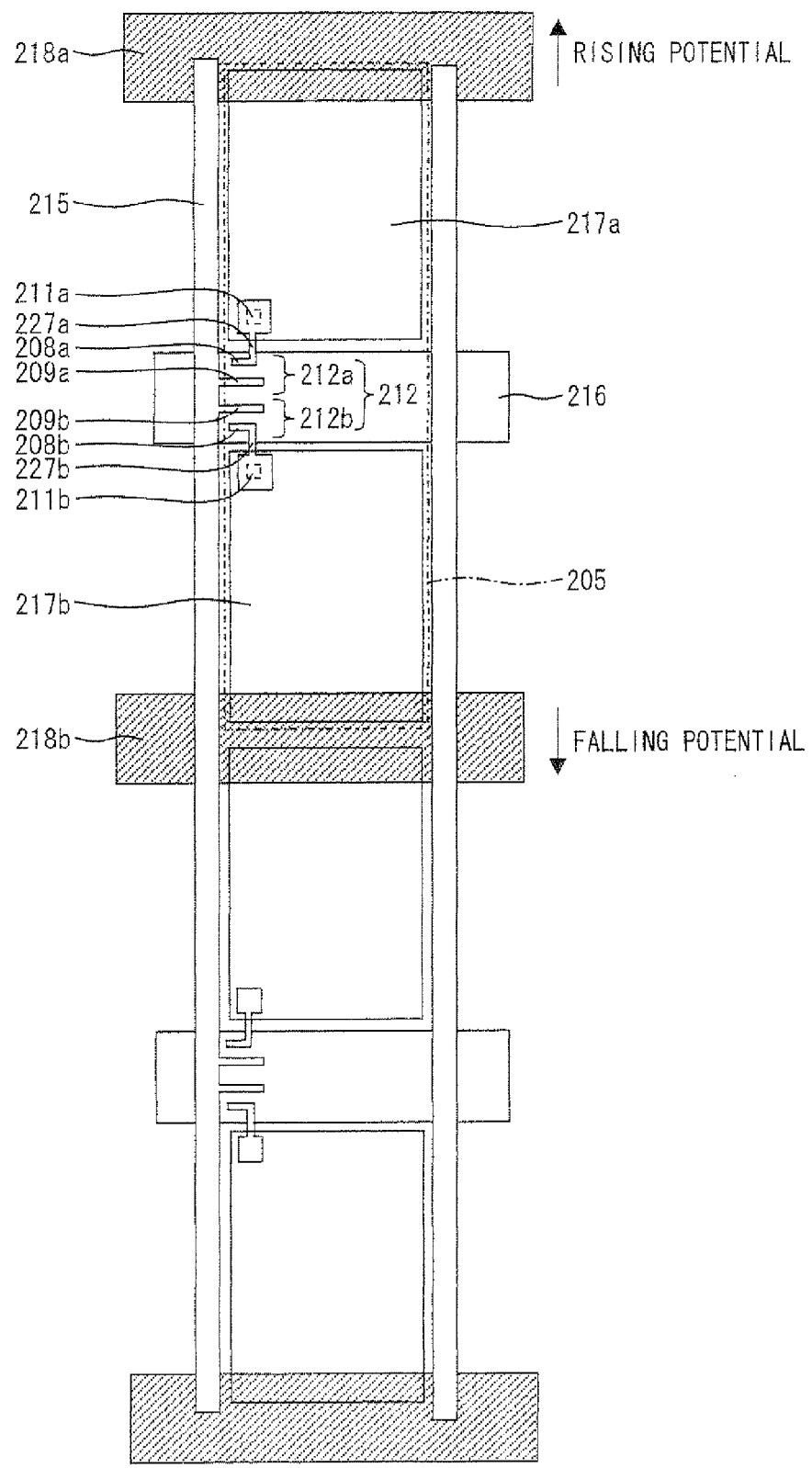
FIG. 35 is a plan view showing a configuration of an active matrix substrate applied to a conventional liquid crystal panel.
Figure 36:
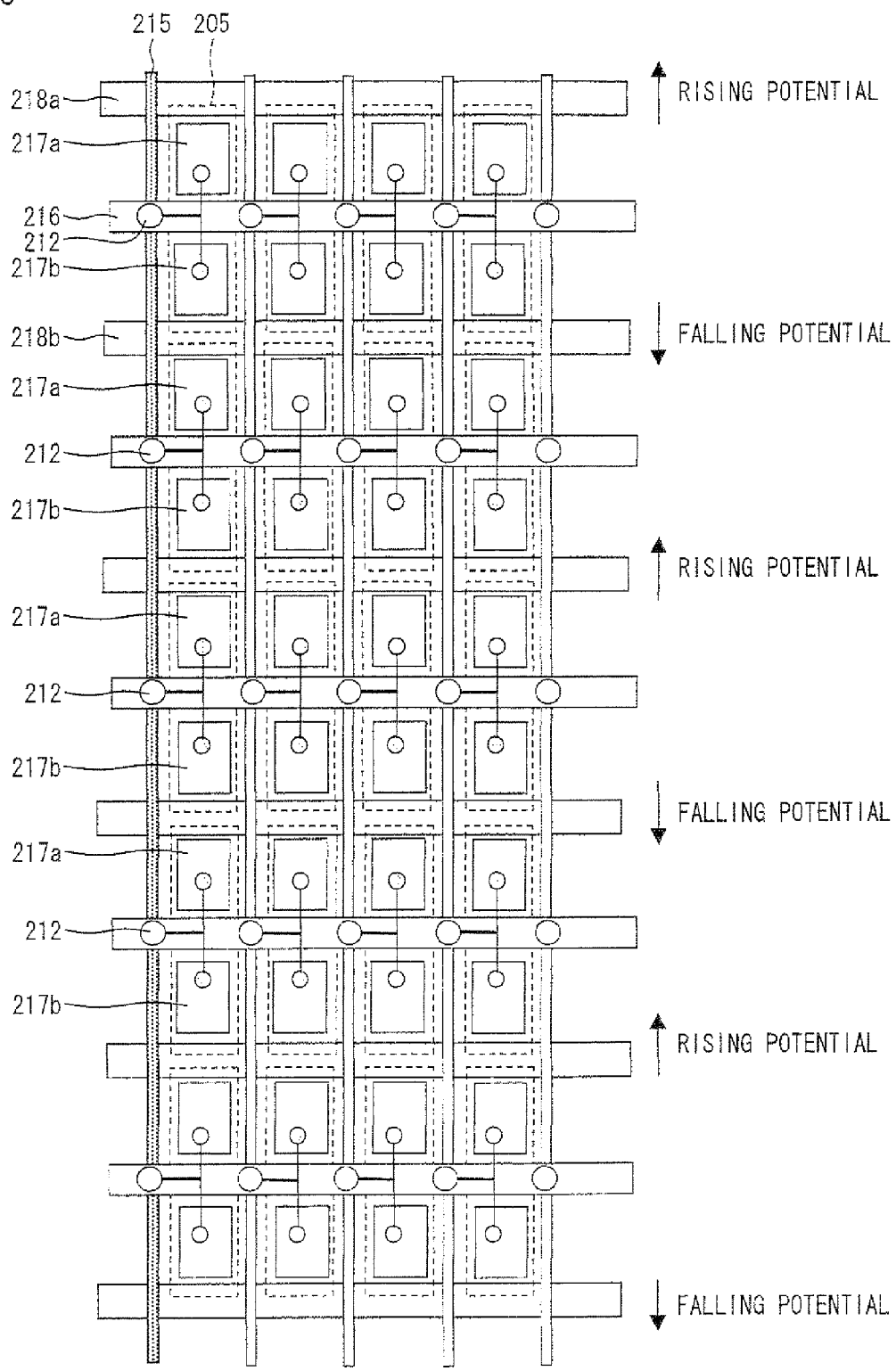
FIG. 36 is a schematic view showing the configuration of the active matrix substrate applied to the conventional liquid crystal panel.

FIG. 33 is a schematic view showing a relationship of connection of a pixel to each wiring (a data signal line, a scanning line, or a storage capacitor wiring) in the present liquid crystal display, and a method for driving the present liquid crystal display. FIG. 34 is a timing chart showing one example of the method for driving the present liquid crystal display.

As shown in FIG. 33, the present liquid crystal display includes the data signal lines (15Y and 15X), the scanning signal lines (G1 to G6), and the storage capacitor wirings (Cs1 to Cs6). When a direction in which the scanning signal line extends is referred to as the row direction (horizontal direction in the drawing), pixels enclosed with thin dashed lines are disposed in the row and column directions. Moreover, two pixel electrodes provided on one pixel are connected to the same scanning signal and data signal lines via the switching element and form capacitors with different storage capacitor wirings. One of two pixel electrodes provided on one of two pixels adjacent in the column direction and one of the two pixel electrodes provided on the other of the two pixels form capacitors with the same storage wiring. For example, two pixel electrodes provided on a pixel PX1 are connected to the scanning signal line G1 and the data signal line 15Y via the switching element, and form capacitors with different storage capacitor wirings (Cs1 and Cs2). One of two pixel electrodes provided on one (PX1) of two pixels adjacent in the column direction and one of the two pixel electrodes provided on the other (PX2) of the two pixels form capacitors with the same storage capacitor wiring (Cs2).

Here, two pixel electrodes provided on any pixel in the same pixel array are connected to one or the other of two adjacent data signal lines. In the pixel array, when two (n=2) consecutive pixels are sequentially blocked, for two pixels belonging to the same block and being adjacent in the column direction, the data signal line to which two pixel electrodes provided on one of the pixels are connected is different from the data signal line to which two pixel electrodes provided on the other of the pixels are connected. For two pixels belonging to different blocks and being adjacent in the column direction, the data signal line to which two pixel electrodes provided on one of the pixels are connected is the same as the data signal line to which two pixel electrodes provided on the other of the pixels are connected. For example, two pixel electrodes provided on any of the pixels (PX1 to PX5) in a pixel array PLj are connected to one (15Y) or the other (15X) of two adjacent data signal lines. In the pixel array PLj, when consecutive pixels PX1 and PX2 are blocked and thereafter pixels PX3 and PX4 are blocked, for the two pixels PX1 and PX2 belonging to the same block and being adjacent in the column direction, two pixel electrodes provided on one (PX1) of the pixels are connected to the data signal line 15Y and two pixel electrodes provided on the other (PX2) of the pixels are connected to the data signal line 15x. For the two pixels PX2 and PX3 belonging to different blocks and being adjacent in the column direction, two pixel electrodes provided on one (PX2) of the pixels are connected to the data signal line 15x as mentioned above and two pixel electrodes provided on the other (PX3) of the pixels are also connected to the data signal line 15x.

In the present liquid crystal display, digital data DAT (15Y) corresponding to the data signal line 15Y of FIG. 33, digital data DAT (15X) corresponding to the data signal line 15x of FIG. 33, a signal potential Vs (15Y) to be supplied to the data signal line 15Y of FIG. 33, a Cs signal (storage capacitor wiring signal) Scs1 . . . to be supplied to the storage capacitor wiring Cs1 . . . of FIG. 33 are set as shown in FIG. 34, for example. It should be noted that H in FIG. 34 means a horizontal period (horizontal scanning period). Here, Vs (15Y) and Vs (15X) can be obtained by analog conversion of DAT (15Y) and DAT (15X), respectively.

As shown in FIG. 34, DAT (15Y) and DAT (15X) are generated from (i) DAT (digital data) for pixel arrays PLi and PLj and (ii) DAT (digital data) for pixel arrays PLj and PLk, respectively. For example, for DAT (15Y), data corresponding to pixels PX1, PX4, and PX5 in the pixel array PLj is provided during the first, fourth, and fifth horizontal periods and data corresponding to pixels in the second, third, and sixth rows of the pixel array PLi is provided during the second, third, and sixth horizontal periods. For DAT (15X), data corresponding to pixels PX2 and PX3 in the pixel array PLj is provided during the second and third horizontal periods and data corresponding to the pixels in the first, fourth, and fifth rows of the pixel array PLk is provided during the first, fourth, and fifth horizontal periods.

Furthermore, Vs (15Y) obtained by analog conversion of DAT (15Y) is: equal to or lower than the standard potential (of the negative polarity) during the first and second periods; equal to or higher than the standard potential (of the positive polarity) during the third and fourth periods; and equal to or lower than the standard potential (of the negative polarity) during the fifth and sixth periods. On the other hand, Vs (15X) obtained by analog conversion of DAT (15X) is: equal to or higher than the standard potential (of the positive polarity) during the first and second periods; equal to or lower than the standard potential (of the negative polarity) during the third and fourth periods; and equal to or higher than the standard potential (of the positive polarity) during the fifth and sixth periods. That is, to one data signal line, a signal potential equal to or higher than the standard potential (of the positive polarity) and a signal potential equal to or lower than the standard potential (of the negative polarity) are alternately supplied for every two (n=2) horizontal periods. During the horizontal period in which the signal potential equal to or higher than the standard potential (of the positive polarity), for example, is supplied to one (15X) of two adjacent data signal lines, the signal potential equal to or lower than the standard potential (of the negative polarity) is supplied to the other (15Y) of the two adjacent data signal lines.

Moreover, the Cs signal Scs1 . . . is a signal whose levels (High and Low) are alternated in accordance with a cyclic level shift (basic cycle: 13H). For Cs signals to be supplied to two storage capacitor wirings forming capacitors with two pixel electrodes provided on one pixel, the levels of the Cs signals are alternative to each other when the levels are alternated initially after the scanning signal line to which the two pixel electrodes are connected is scanned. For example, in FIG. 33, for Cs signals Scs1 and Scs2 to be supplied to the two storage capacitor wirings Cs1 and Cs2 forming capacitors with the two pixel electrodes provided on the pixel PX1, the level of the Cs signal Scs1 is alternated in an negative (a fall) direction initially after the scanning signal line G1 to which the two pixel electrodes are connected is scanned, and the level of the Cs signal Scs2 is alternated in a positive (a rise) direction initially after the scanning signal line G1 is scanned.

More specifically, the Cs signals Scs1 and Scs2 are set as follows: The Cs signal Scs1 shifts its level from L to H 11H before the scanning signal line G1 is scanned and maintains substantially the same level until the scanning. The Cs signal Scs1 shifts its level from H to L by synchronization when the third horizontal period which is after the scanning starts. On the other hand, the Cs signal Scs2 shifts its level from H to L 11H before the scanning signal line G1 is scanned and maintains substantially the same level until the scanning. The Cs signal Scs2 shifts its level from L to H by synchronization when the third horizontal period which is after the scanning starts. Here, in view of dull potential waveform of the storage capacitor wiring, the Cs signals Scs1 and Scs2 are set to shift their levels not less than 10H (not less than a predetermined period) before the scanning signal lines G1 and G2 are scanned. It should be noted that odd-numbered Cs signals after Scs1 and even-numbered Cs signals after Scs2 are set so that their phases are sequentially retarded by 2H.

In this way, the present liquid crystal display driven as shown in FIG. 34 makes it possible to inverse polarities (the positive and negative polarities) of signal potentials written on the pixels for each dot (pixel). With this, bright and dark subpixels can be disposed checkwise as shown in FIG. 33 and thus clear display can be realized.

It should be noted that though the above explanation refers to extending directions of a scanning line and a data signal line as row and column directions, respectively, this is just for convenience of explanation. In an active matrix substrate in which a scanning signal line extends in a traverse direction, the traverse direction is to be regarded as the row direction. On the other hand, in an active matrix substrate in which a scanning signal line extends in a longitudinal direction, the longitudinal direction is to be regarded as the row direction.

Figure 24:
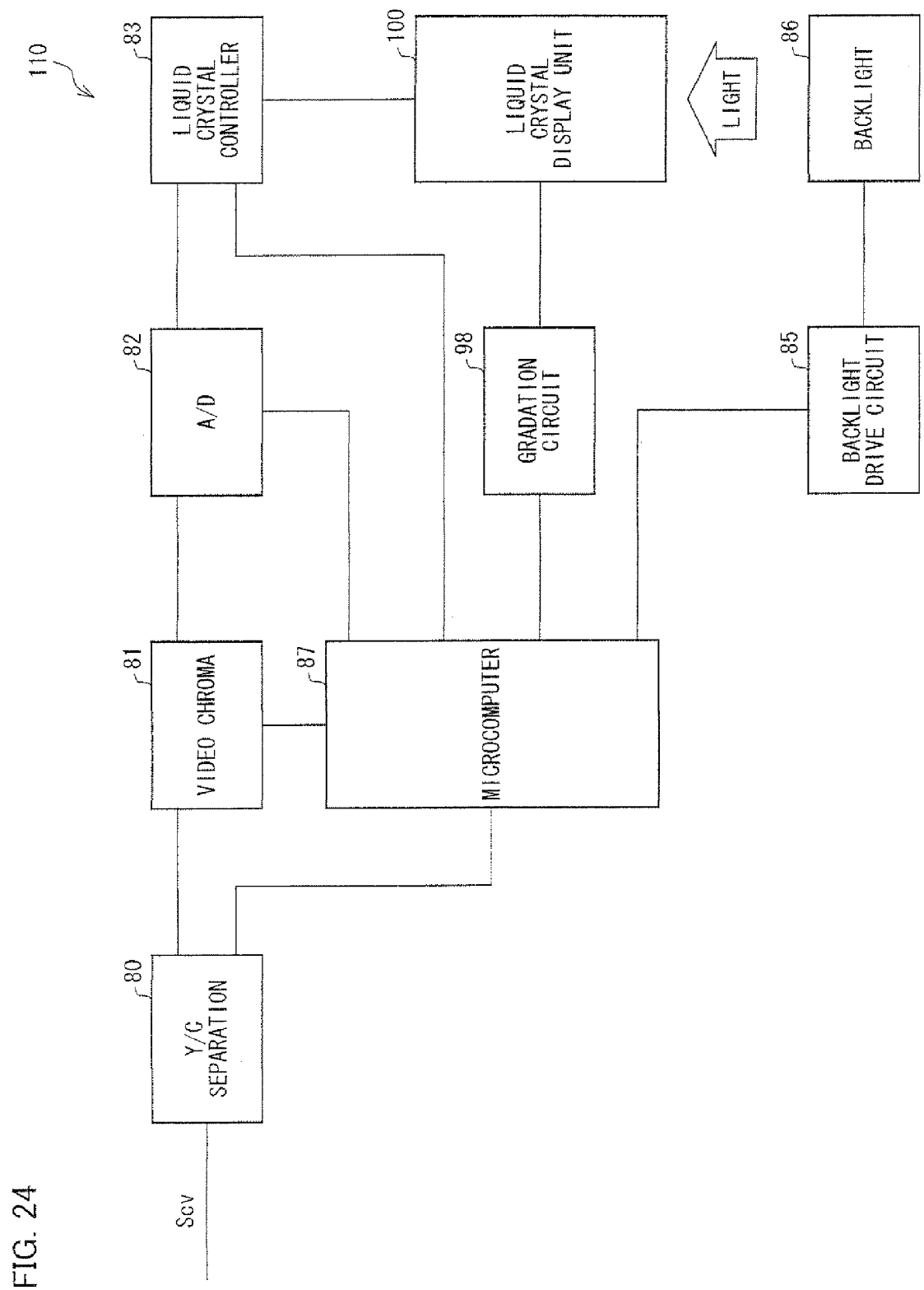
FIG. 24 is a block diagram showing the function of the present liquid crystal display.

Next, the following explains one example of configuration of the present liquid crystal display in applying the liquid crystal display to a television receiver. FIG. 24 is a block diagram showing a configuration of the liquid crystal display 110 for a television receiver. The liquid crystal display 110 includes a liquid crystal display unit 100, a Y/C separation circuit 80, a video chroma circuit 81, an A/D converter 82, a liquid crystal controller 83, a backlight drive circuit 85, a backlight 86, a microcomputer 87, and a gradation circuit 98.

The liquid crystal display unit 100 includes a liquid crystal panel described in the aforementioned embodiments, and source and gate drivers for driving the liquid crystal panel.

In the liquid crystal display 110 of the aforementioned configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted to an analog RGB signal corresponding to three fundamental colors of light in the video chroma circuit 81. Further, the analog ROB signal is converted to a digital RGB signal by the A/D converter 82. The digital RGB signal is inputted to the liquid crystal controller 83. Moreover, in the Y/C separation circuit 80, horizontal and vertical sync signals are extracted from the complex color video signal Scv inputted from the outside. These sync signals are also inputted to the liquid crystal controller 83 via the microcomputer 87.

To the liquid crystal display unit 100, the digital ROB signal is inputted from the liquid crystal controller 83 with a timing signal in accordance with the aforementioned sync signals at a predetermined timing. Furthermore, in the gradation circuit 98, gradation voltages of three fundamental colors R, G, and B of color display are generated and the gradation voltages are also supplied to the liquid crystal display unit 100. In the liquid crystal display unit 100, drive signals (data and scanning signals, and the like) are generated by the source and gate drivers inside the liquid crystal display unit 100 in accordance with the RGB signal, the timing signal, and the gradation voltages. A color image is displayed on a display section inside the liquid crystal display unit 100 in accordance with the drive signals. It should be noted that for displaying an image by the liquid crystal display unit 100, light needs to be irradiated from behind the liquid crystal display unit 100. In the liquid crystal display 110, the backlight drive circuit 85 drives the backlight 86 under control by the microcomputer 87 and thereby light is irradiated on a back side of the present liquid crystal panel.

Control of the whole system, including the aforementioned processes is carried out by the microcomputer 87. For the video signal (complex color video signal) inputted from the outside, not only a video signal in accordance with television broadcast but also a video signal picked up by a camera or supplied via the Internet line is also usable. In the liquid crystal display 110, image display in accordance with various video signals can be performed.

Figure 25:
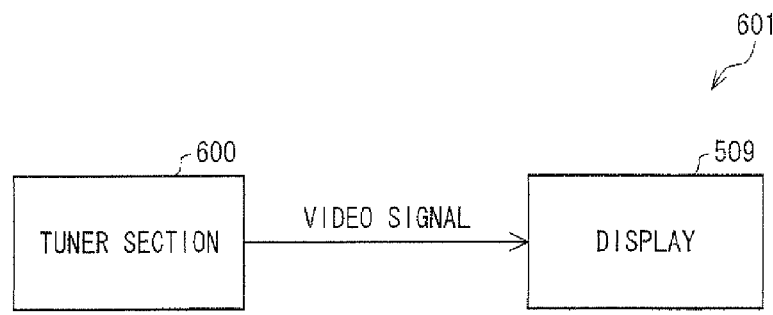
FIG. 25 is a block diagram showing the function of a television receiver of the present invention.

In displaying an image by the liquid crystal display 110 in accordance with television broadcast, a tuner section 90 is connected to the liquid crystal display 110, as shown in FIG. 25. With this, a television receiver 601 of the present invention is arranged. The tuner section 90 extracts, from receiving waves (high-frequency signals) received by an antenna (not illustrated), a channel signal to receive and converts the channel signal to an intermediate frequency signal. The tuner section 90 detects the intermediate frequency signal, thereby extracting the complex color video signal Scv as the television signal. The complex color video signal Scv is inputted to the liquid crystal display 110 as mentioned above and an image is displayed by the liquid crystal display 110 in accordance with the complex color video signal Scv.

Figure 26:
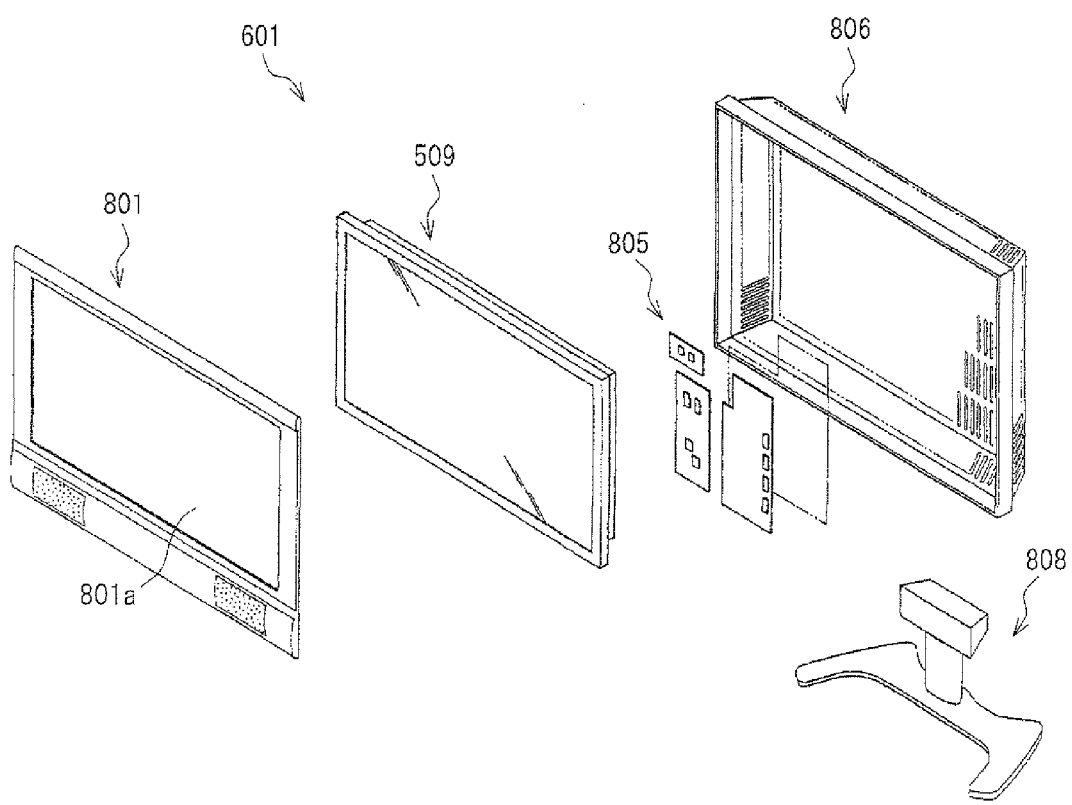
FIG. 26 is an exploded perspective view showing a configuration of the present television receiver.

FIG. 26 is an exploded perspective view showing one example of configuration of the present television receiver. As shown in FIG. 26, the present television receiver 601 includes, as constituent features thereof, first and second housings 801 and 806 in addition to the liquid crystal display 110. The liquid crystal display 110 is arranged such that the first and second housings 801 and 806 hold the liquid crystal display 110 so as to wrap therein the liquid crystal display 110. In the first housing 801, an opening 801a is formed for transmitting an image displayed on a display 800. On the other hand, the second housing 806 covers a back side of the display 800. The second housing 806 is provided with an operating circuit 805 for operating the display 800. The second housing 806 is further provided with a supporting member 808 therebelow.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A liquid crystal panel and a liquid crystal display of the present invention are suitable for a liquid crystal television, for example.

The invention claimed is:

1. An active matrix substrate comprising:
pixel regions;
scanning signal lines extending in a row direction so as to cross the pixel regions corresponding thereto;
data signal lines extending in a column direction;
switching elements which are provided in the vicinity of corresponding intersections of the data signal lines and the scanning signal lines and each of which is connected to the data signal line and the scanning signal line forming the intersection in the vicinity of which the switching element is provided;
storage capacitor wirings each of which is provided so as to correspond to a gap between pixel regions adjacent with each other in the column direction; and
a pair of pixel electrodes in each pixel region, the pair of pixel electrodes forming storage capacitors with different ones of the storage capacitor wirings respectively, wherein:
the pair of pixel electrodes provided in each pixel region adjacent with each other in the column direction is both connected to one of adjacent data signal lines via the switching element provided in the vicinity of an intersection of the one of the data signal lines and the scanning signal line crossing the pixel region, or to the other of the adjacent data signal lines via the switching element provided in the vicinity of an intersection of the other of the data signal lines and the scanning signal line crossing the pixel region;
the intersections of the data signal lines and the scanning signal lines are grouped into A and B groups by alternately grouping intersections of a data signal line and the scanning signal lines into the A and B groups for every n adjacent intersections and grouping intersections adjacent in the row direction into different groups where $n \geq 2$;
assuming that the adjacent data signal lines are referred to as first and second data signal lines; in a given pixel region, each of two pixel electrodes provided in a given pixel region is connected to the first data signal line via the switching element; and a pixel region adjacent to the given pixel region in the column direction is referred to as an adjacent pixel region,
each of two pixel electrodes included in the adjacent pixel region is connected to a second data signal line of the adjacent pixel region via the switching element if (i) an intersection of the scanning signal line crossing the adjacent pixel region and the first data signal line and (ii) an intersection of the scanning signal line crossing the given pixel region and the first data signal line belong to the same one of the groups; and
each of the two pixel electrodes included in the adjacent pixel region is connected to a first data signal line of the adjacent pixel region via the switching element if (i) the intersection of the scanning signal line crossing the adjacent pixel region and the first data signal line and (ii) the intersection of the scanning signal line crossing the given pixel region and the first data signal line belong to different ones of the groups.

2. The active matrix substrate as set forth in claim 1, wherein:
the switching element includes first and second transistors;
the pair of pixel electrodes is referred to as first and second pixel electrodes which are provided on either side of the corresponding scanning signal line;
the storage capacitor wirings are referred to as a first storage capacitor wiring when the storage capacitor wiring superposes the first pixel electrode, meanwhile the storage capacitor wirings are referred to as a second storage capacitor wiring when the storage capacitor wiring superposes the second pixel electrode; and
the first and second pixel electrodes in pair are connected to the same data signal line respectively via the first and second transistors corresponding thereto.

3. A liquid crystal panel comprising:
an active matrix substrate as set forth in claim 1; and
a counter substrate.

4. The liquid crystal panel as set forth in claim 3, wherein:
in each pixel region, first and second subpixel regions are provided so as to sandwich therebetween the corresponding scanning signal line;

one of the pair of pixel electrodes is provided to the first subpixel region and the other of the pair of pixel electrodes is provided to the second subpixel region;

the liquid crystal panel comprises first and second subpixels, (i) the first subpixels each including the first subpixel region and a region on the counter substrate which region corresponds to the first subpixel region and (ii) the second subpixels each including the second subpixel region and a region on the counter substrate which region corresponds to the second subpixel region; and the first and second subpixels include first and second alignment controlling structures, respectively.

5. The liquid crystal panel as set forth in claim 4, wherein each of the first and second alignment controlling structures includes at least one of (i) a rib provided on the counter substrate, (ii) a slit formed on the pixel electrode, and (iii) a slit formed on a common electrode of the counter electrode.

6. The liquid crystal panel as set forth in claim 5, wherein (i) the rib, (ii) the slit formed on the pixel electrode, and (iii) the slit formed on the common electrode are V-shaped when viewed in the row direction.

7. The liquid crystal panel as set forth in claim 4, wherein:
the switching element includes first and second transistors;
the pair of pixel electrodes is referred to as first and second pixel electrodes which are provided on the first and second subpixel regions, respectively;
the storage capacitor wirings are referred to as a first storage capacitor wiring when the storage capacitor wiring forms a capacitor with the first pixel electrode, meanwhile the storage capacitor wirings are referred to as a second storage capacitor wiring when the storage capacitor wiring forms a capacitor with the second pixel electrode; and
the first and second pixel electrodes in pair are connected to the same data signal line respectively via the first and second transistors corresponding thereto.

8. The liquid crystal panel as set forth in claim 4, wherein the first alignment controlling structure provided on each pixel has a shape which is obtained by rotating by 180° the first alignment controlling structure provided on a pixel adjacent to the pixel.

9. The liquid crystal panel as set forth in claim 8, wherein:
the shape of the first alignment controlling structure is such that a projected image of the shape is asymmetrical with respect to a straight line passing a center of the first subpixel region and perpendicular to the scanning signal lines, and is symmetrical with respect to a straight line passing the center of the first subpixel region and parallel to the scanning signal lines, when the projected image is cast on a plane parallel to a surface of the liquid crystal panel and including the scanning signal lines; and
the shape of the second alignment controlling structure is such that a projected image of the shape is asymmetrical with respect to a straight line passing a center of the second subpixel region and perpendicular to the scanning signal lines, and is symmetrical with respect to a straight line passing the center of the second subpixel region and parallel to the scanning signal lines, when the projected image is cast on a plane parallel to the surface of the liquid crystal panel and including the scanning signal lines.

10. The liquid crystal panel as set forth in claim 8, wherein in each pixel, the first and second subpixels correspond to bright and dark pixels at the time of display, respectively.

11. The liquid crystal panel as set forth in claim 8, wherein each pair of the pixels adjacent with each other is identical in color.

12. The liquid crystal panel as set forth in claim 9, wherein in each pixel, the first alignment controlling structure of the pixel is identical in shape with the second alignment controlling structure of the pixel.

13. The liquid crystal panel as set forth in claim 8, wherein the second alignment controlling structure provided on each pixel has a shape which is obtained by rotating by 180° the second alignment controlling structure provided on a pixel adjacent to the pixel.

14. The liquid crystal panel as set forth in claim 8, wherein:
by the first alignment controlling structures provided on each pixel, a plurality of alignments are formable along the scanning signal line in the first subpixel thereof; and by the first alignment controlling structures provided on the pixels adjacent thereto, a plurality of alignments are formable along the scanning signal line in the first subpixel thereof.

15. The liquid crystal panel as set forth in claim 8, wherein in case where each pixel is grouped into pixel groups each consisting of a trio of pixels respectively corresponding to red, green, and blue disposed sequentially along a scanning signal line, the first alignment controlling structure provided on a pixel of a color belonging to one pixel group has a shape which is obtained by rotating by 180° the first alignment controlling structure provided on a pixel of the same color belonging to a pixel group adjacent to the pixel group.

16. The liquid crystal panel as set forth in claim 8, wherein in a case where the direction along the scanning signal lines is referred to as the row direction, the first subpixel region has two end portions along the row direction, and the first alignment controlling structure includes at least one of (i) a V-shaped rib which is provided on the counter substrate and which is superposed on both of the two end portions of the first subpixel region and bent between the end portions in the row direction, (ii) a slit which is formed on the pixel electrode and V-shaped when viewed in the row direction, and (iii) a slit which is formed on the common electrode provided on the counter electrode and which is V-shaped when viewed in the row direction.

17. The liquid crystal panel as set forth in claim 6, wherein in each pixel having the switching element which is provided between adjacent first and second data signal lines and connected to the first data signal line, each of the first and second alignment controlling structures of the pixel includes at least one of (i) the rib which is V-shaped when viewed in the row direction from the second data signal line, (ii) the slit which is formed on the pixel electrode and V-shaped when viewed in the row direction from the second data signal line, and (iii) the slit which is formed on the common electrode and V-shaped when viewed in the row direction from the second data signal line.

18. The liquid crystal panel as set forth in claim 7, wherein:
the first transistor has a drain electrode connected to the first pixel electrode via a first drain drawing wiring and a first contact hole, and the second transistor has a drain electrode connected to the second pixel electrode via a second drain drawing wiring and a second contact hole; and
at least parts of the first and second drain drawing wirings superpose the first and second alignment controlling structures, respectively.

19. The liquid crystal panel as set forth in claim 18, wherein at least parts of the first and second contact holes superpose the first and second alignment controlling structures, respectively.

20. The liquid crystal panel as set forth in claim 7, wherein:
each first storage capacitor wiring has a first storage capacitor wiring extending section and each second storage capacitor wiring has a second storage capacitor wiring extending section, wherein the first storage capacitor wiring extending section is extended to the first pixel electrode to which the first storage capacitor wiring corresponds, and the second storage capacitor wiring extending section is extended to the second pixel electrode to which the second storage capacitor wiring corresponds; and at least parts of the first and second storage capacitor wiring extending sections superpose the first and second alignment controlling structures, respectively.

21. The liquid crystal panel as set forth in claim 20, wherein:

the first transistor has a drain electrode connected to the first pixel electrode via a first drain drawing wiring and a first contact hole, and the second transistor has a drain electrode connected to the second pixel electrode via a second drain drawing wiring and a second contact hole; and each first drain drawing wiring has a first superposition section superposed on the first storage capacitor wiring extending section and each second drain drawing wiring has a second superposition section superposed on the second storage capacitor wiring extending section.

22. The liquid crystal panel as set forth in claim 21, wherein:

the first alignment controlling structure has a slit formed on the first pixel electrode, and the second alignment controlling structure has a slit formed on the second pixel electrode; and the first and second contact holes are formed (i) between the first superposition section and the first drain electrode and (ii) between the second superposition section and the second drain electrode, respectively; and each first drain drawing wiring has a part between the first drain electrode and the first contact hole, which part superposes any of the slits, and each second drain drawing wiring has a part between the second drain electrode and the second contact hole, which part superposes any of the slits.

23. The liquid crystal panel as set forth in claim 7, wherein:

the first transistor has a drain electrode connected to the first pixel electrode via a first drain drawing wiring and one or more contact holes and the second transistor has a drain electrode connected to the second pixel electrode via a second drain drawing wiring and one or more contact holes; and each first drain drawing wiring is hollowed where the first drain drawing wiring intersects with the contact hole and each second drain drawing wiring is hollowed where the second drain drawing wiring intersects with the contact hole.

24. The liquid crystal panel as set forth in claim 23, wherein:

in a case where directions along the data signal line and the scanning signal line are referred to as row and column directions, respectively, each first drain drawing wiring is hollowed by having two hollows corresponding to two of the contact holes, the two hollows being extended in the row and column directions, respectively; and each second drain drawing wiring is hollowed by having two hollows corresponding to two of the contact holes, the two hollows being extended in the row and column directions, respectively.

25. A liquid crystal display unit comprising:
a liquid crystal panel as set forth in claim 3; and
a driver.

26. A liquid crystal display comprising a liquid crystal display unit as set forth in claim 25.

27. The liquid crystal display as set forth in claim 26, wherein the scanning lines and the data signal lines are driven so that during one frame period, a signal potential having the negative polarity with respect to a standard potential is supplied to the switching elements in the vicinity of the intersections belonging to the A group and on the other hand, a signal potential having the positive polarity with respect to the standard potential is supplied to the switching elements in the vicinity of the intersections belonging to the B group.

28. The liquid crystal display as set forth in claim 27, wherein potentials of the first and second storage capacitor wirings are controlled so that phases of potential waveform of the first and second storage capacitor wirings are shifted by 180°.

29. The liquid crystal display as set forth in claim 27, wherein:

each first storage capacitor wiring is controlled in potential such that the potential rises after each of the transistors is switched off and the rise state is maintained until each of the transistors is switched off in the next frame and on the other hand, each second storage capacitor wiring is controlled in potential such that the potential falls after each of the transistors is switched off and the fall state is maintained until each of the transistors is switched off in the next frame; or each first storage capacitor wiring is controlled in potential such that the potential falls after each of the transistors has been switched off and the fall state is maintained until each of the transistors is switched off in the next frame and on the other hand, each second storage capacitor wiring is controlled in potential such that the potential rises after each of the transistors has been switched off and the rise state is maintained until each of the transistors is switched off in the next frame.

30. The liquid crystal display as set forth in claim 26 wherein potential rises of the first storage capacitor wiring and potential falls of the second storage capacitor wiring are shifted by one horizontal period, or potential falls of the first storage capacitor wiring and potential rises of the second storage capacitor wiring are shifted by one horizontal period.

31. An active matrix substrate comprising pixel regions disposed in row and column directions where the row direction is an extending direction of a scanning signal line, each pixel region has a pair of pixel electrodes connected to the same one of the scanning signal lines and to the same one of the data signal lines via a switching element wherein the pixel electrodes form capacitors with storage capacitor wirings in such a manner that pixel electrodes in one pixel region form the capacitors with different ones of the storage capacitor wirings, respectively, and one of two pixel electrodes provided on one pixel region and one of the two pixel electrodes provided on a pixel region adjacent to the pixel region in the column direction, form the capacitors with the same one of the storage capacitor wirings, wherein each of two pixel electrodes provided on each pixel region in the same pixel region array is connected to one or the other of two adjacent data signal lines and n consecutive pixel regions are sequentially grouped into blocks in the same pixel region array where $n \geq 2$, for pixel regions belonging to the same block, the pair of pixel electrodes in one pixel region and the pair of pixel electrodes in a pixel region adjacent to the pixel region in the column direction are connected to different ones of the data signal lines, and for pixel regions belonging to different blocks, the pair of pixel electrode in one pixel region and the pair of pixel electrode in a pixel region adjacent to the pixel region are connected to the same one of the data signal lines.

32. A liquid crystal display comprising:

an active matrix substrate as set forth in claim 31, the data signal lines being supplied alternatively with a signal potential equal to or higher than a standard potential and a signal potential equal to or lower than the standard potential for every n horizontal period in such a manner that one data signal line is supplied with one of the signal potentials in one horizontal period, while a data signal line adjacent to the data signal line is supplied with the other one of the signal potentials in the horizontal period.

33. The liquid crystal display as set forth in claim 32, wherein:

storage capacitor wiring signals whose levels are alternated in accordance with a cyclic level shift are supplied to the storage capacitor wirings in such a manner that two storage capacitor wirings forming the capacitors with the pair of pixel electrodes in one pixel region are supplied respectively with storage capacitor wiring signals which are alternative to each other in terms of the levels initially after a scanning signal line to which the pair of the pixel electrodes is connected is scanned.

34. A television receiver comprising:

a liquid crystal display as set forth in claim 26; and a tuner section for receiving television broadcast.

35. A television receiver comprising:

a liquid crystal display as set forth in claim 32; and a tuner section for receiving television broadcast.

* * * * *